US008113939B2

(12) United States Patent
Cannon

(10) Patent No.: US 8,113,939 B2
(45) Date of Patent: Feb. 14, 2012

(54) GAMING DEVICE AND METHOD PROVIDING RELATIVELY LARGE AWARDS WITH VARIABLE PLAYER PARTICIPATION LEVELS

(75) Inventor: Lee E. Cannon, Bozeman, MT (US)

(73) Assignee: IGT, Reno, NV (US)

( * ) Notice: Subject to any disclaimer, the term of this patent is extended or adjusted under 35 U.S.C. 154(b) by 1311 days.

(21) Appl. No.: 11/530,285

(22) Filed: Sep. 8, 2006

(65) Prior Publication Data

US 2007/0184887 A1 Aug. 9, 2007

Related U.S. Application Data

(60) Provisional application No. 60/715,507, filed on Sep. 9, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ........................................................ 463/18

(58) Field of Classification Search .................. 273/269; 463/17-20, 26, 27

See application file for complete search history.

(56) References Cited

U.S. PATENT DOCUMENTS

| | | | |
|---|---|---|---|
| 3,533,629 | A | 10/1970 | Raven et al. |
| 4,033,588 | A | 7/1977 | Watts |
| 4,157,829 | A | 6/1979 | Goldman et al. |
| 4,335,809 | A | 6/1982 | Wain |
| 4,339,798 | A | 7/1982 | Hedges et al. |
| 4,467,424 | A | 8/1984 | Hedges et al. |
| 4,494,197 | A | 1/1985 | Troy et al. |
| 4,582,324 | A | 4/1986 | Koza et al. |
| 4,652,998 | A | 3/1987 | Koza et al. |
| 4,669,730 | A | 6/1987 | Small |
| 4,689,742 | A | 8/1987 | Troy et al. |
| 4,695,053 | A | 9/1987 | Vazquez et al. |
| 4,756,531 | A | 7/1988 | DiRe et al. |
| 4,775,155 | A | 10/1988 | Lees |
| 4,805,907 | A | 2/1989 | Hagiwara |

(Continued)

FOREIGN PATENT DOCUMENTS

| | | |
|---|---|---|
| AU | 711501 | 10/1999 |

(Continued)

OTHER PUBLICATIONS

Powerball, "How to Play," http://www.powerball.com/powerball/pb_howtoplay.asp accessed Sep. 30, 2010.*

(Continued)

*Primary Examiner* — David L Lewis
*Assistant Examiner* — Reginald Renwick
(74) *Attorney, Agent, or Firm* — K&L Gates LLP

(57) ABSTRACT

An improved number matching game is provided. The game includes a matching game with multiple number sets. A player can win standard Keno paytable awards in addition to relatively large awards. A player's initial set has a minimum size requirement for the player to be eligible for the relatively large award. The gaming machine provides supplemental numbers to the player if the player does not select the minimum quantity of numbers. Any supplemental numbers created for the player cannot be used towards the Keno paytable awards. In one embodiment, odds of winning the relatively large awards are kept proportionate with the player's wager level.

61 Claims, 38 Drawing Sheets

U.S. PATENT DOCUMENTS

| | | | | |
|---|---|---|---|---|
| 4,815,741 | A | 3/1989 | Small | |
| 4,817,951 | A | 4/1989 | Crouch et al. | |
| 4,836,546 | A | 6/1989 | DiRe | |
| 4,836,548 | A | 6/1989 | Chittenden | |
| 4,842,278 | A | 6/1989 | Markowicz | |
| 4,856,787 | A | 8/1989 | Itkis | |
| 4,982,337 | A | 1/1991 | Burr et al. | |
| 4,991,848 | A | 2/1991 | Greenwood et al. | |
| 5,042,809 | A | 8/1991 | Richardson | |
| 5,046,737 | A | 9/1991 | Fienberg | |
| 5,092,598 | A | 3/1992 | Kamille | |
| 5,100,139 | A | 3/1992 | Di Bella | |
| 5,116,049 | A | 5/1992 | Sludikoff et al. | |
| 5,116,055 | A | 5/1992 | Tracy | |
| 5,158,293 | A | 10/1992 | Mullins | |
| 5,242,163 | A | 9/1993 | Fulton | |
| 5,265,874 | A | 11/1993 | Dickinson et al. | |
| 5,275,400 | A | 1/1994 | Weingardt et al. | |
| 5,276,312 | A | 1/1994 | McCarthy | |
| 5,280,909 | A | 1/1994 | Tracy | |
| 5,282,620 | A | 2/1994 | Keesee | |
| 5,324,035 | A | 6/1994 | Morris et al. | |
| 5,342,047 | A | 8/1994 | Heidel et al. | |
| 5,344,144 | A | 9/1994 | Canon | |
| 5,393,057 | A | 2/1995 | Marnell, II | |
| 5,398,932 | A | 3/1995 | Eberhardt et al. | |
| 5,401,024 | A | 3/1995 | Simunek | |
| 5,407,199 | A | 4/1995 | Gumina | |
| 5,476,259 | A | 12/1995 | Weingardt | |
| 5,536,016 | A | 7/1996 | Thompson | |
| 5,586,937 | A | 12/1996 | Menashe | |
| 5,611,730 | A | 3/1997 | Weiss | |
| 5,628,684 | A | 5/1997 | Bouedec | |
| 5,639,089 | A | 6/1997 | Matsumoto et al. | |
| 5,645,486 | A | 7/1997 | Nagao et al. | |
| 5,647,798 | A | 7/1997 | Falciglia | |
| 5,651,735 | A | 7/1997 | Baba | |
| 5,655,961 | A | 8/1997 | Acres | |
| 5,664,998 | A | 9/1997 | Thomas et al. | |
| 5,674,128 | A | 10/1997 | Holch et al. | |
| 5,702,304 | A | 12/1997 | Acres | |
| 5,718,631 | A | 2/1998 | Invencion | |
| 5,720,483 | A | 2/1998 | Trinh | |
| 5,741,183 | A | 4/1998 | Acres | |
| 5,752,882 | A | 5/1998 | Acres | |
| 5,755,619 | A | 5/1998 | Matsumoto et al. | |
| 5,766,076 | A | 6/1998 | Pease et al. | |
| 5,779,545 | A | 7/1998 | Berg et al. | |
| 5,788,573 | A | 8/1998 | Baerlocher et al. | |
| 5,800,269 | A | 9/1998 | Holch et al. | |
| 5,820,459 | A | 10/1998 | Acres | |
| 5,833,537 | A | 11/1998 | Barrie | |
| 5,836,817 | A | 11/1998 | Acres | |
| 5,851,148 | A | 12/1998 | Brune et al. | |
| 5,855,515 | A | 1/1999 | Pease et al. | |
| 5,871,398 | A | 2/1999 | Schneier et al. | |
| 5,876,284 | A | 3/1999 | Acres | |
| 5,882,261 | A | 3/1999 | Adams | |
| 5,885,158 | A | 3/1999 | Torango et al. | |
| 5,902,184 | A | 5/1999 | Bennett et al. | |
| 5,909,875 | A * | 6/1999 | Weingardt | 273/269 |
| 5,935,002 | A | 8/1999 | Falciglia | |
| 5,944,606 | A | 8/1999 | Gerow | |
| 5,947,820 | A | 9/1999 | Morro et al. | |
| 5,949,042 | A | 9/1999 | Dietz, II et al. | |
| 5,954,582 | A | 9/1999 | Zach | |
| 5,970,143 | A | 10/1999 | Schneier et al. | |
| 5,971,849 | A | 10/1999 | Falciglia | |
| 5,980,384 | A | 11/1999 | Barrie | |
| 5,997,400 | A | 12/1999 | Seelig et al. | |
| 5,997,401 | A | 12/1999 | Crawford | |
| 6,004,207 | A | 12/1999 | Wilson, Jr. et al. | |
| 6,012,982 | A | 1/2000 | Piechowiak et al. | |
| 6,015,346 | A | 1/2000 | Bennett | |
| 6,017,032 | A | 1/2000 | Grippo et al. | |
| 6,024,640 | A | 2/2000 | Walker et al. | |
| 6,033,306 | A | 3/2000 | DeSouza | |
| 6,056,642 | A | 5/2000 | Bennett | |
| 6,059,289 | A | 5/2000 | Vancura | |
| 6,062,981 | A | 5/2000 | Luciano, Jr. | |
| 6,079,711 | A | 6/2000 | Wei et al. | |
| 6,089,976 | A | 7/2000 | Schneider et al. | |
| 6,089,978 | A | 7/2000 | Adams | |
| 6,089,982 | A | 7/2000 | Holch et al. | |
| 6,099,408 | A | 8/2000 | Schneir et al. | |
| 6,102,400 | A | 8/2000 | Scott et al. | |
| 6,110,043 | A | 8/2000 | Olsen | |
| 6,117,009 | A | 9/2000 | Yoseloff | |
| 6,126,542 | A | 10/2000 | Fier | |
| 6,129,632 | A | 10/2000 | Luciano | |
| 6,146,272 | A | 11/2000 | Walker et al. | |
| 6,146,273 | A | 11/2000 | Olsen | |
| 6,155,925 | A | 12/2000 | Giobbi et al. | |
| 6,159,098 | A | 12/2000 | Slomiany et al. | |
| 6,162,121 | A | 12/2000 | Morro et al. | |
| 6,162,122 | A | 12/2000 | Acres | |
| 6,168,520 | B1 | 1/2001 | Baerlocher et al. | |
| 6,168,521 | B1 * | 1/2001 | Luciano et al. | 463/18 |
| 6,183,361 | B1 | 2/2001 | Cummings et al. | |
| 6,203,010 | B1 | 3/2001 | Jorasch et al. | |
| 6,203,428 | B1 | 3/2001 | Giobbi et al. | |
| 6,210,275 | B1 | 4/2001 | Olsen | |
| 6,210,276 | B1 | 4/2001 | Mullins | |
| 6,210,279 | B1 | 4/2001 | Dickinson | |
| 6,217,448 | B1 | 4/2001 | Olsen | |
| 6,220,961 | B1 | 4/2001 | Keane et al. | |
| 6,224,482 | B1 | 5/2001 | Bennett | |
| 6,224,484 | B1 | 5/2001 | Okuda et al. | |
| 6,231,445 | B1 | 5/2001 | Acres | |
| 6,234,897 | B1 | 5/2001 | Frohm et al. | |
| 6,241,606 | B1 | 6/2001 | Riendeau et al. | |
| 6,244,958 | B1 | 6/2001 | Acres | |
| 6,250,685 | B1 | 6/2001 | Walker et al. | |
| 6,254,480 | B1 | 7/2001 | Zach | |
| 6,254,483 | B1 | 7/2001 | Acres | |
| 6,257,981 | B1 | 7/2001 | Acres | |
| 6,273,820 | B1 | 8/2001 | Haste, III | |
| 6,280,328 | B1 | 8/2001 | Holch et al. | |
| 6,283,855 | B1 | 9/2001 | Bingham | |
| 6,309,298 | B1 | 10/2001 | Gerow | |
| 6,309,299 | B1 | 10/2001 | Weiss | |
| 6,311,976 | B1 | 11/2001 | Yoseloff et al. | |
| 6,312,333 | B1 | 11/2001 | Acres | |
| 6,312,334 | B1 | 11/2001 | Yoseloff | |
| 6,315,291 | B1 | 11/2001 | Moody | |
| 6,319,125 | B1 | 11/2001 | Acres | |
| 6,325,716 | B1 | 12/2001 | Walker et al. | |
| 6,334,814 | B1 | 1/2002 | Adams | |
| 6,336,862 | B1 | 1/2002 | Byrne | |
| 6,346,043 | B1 | 2/2002 | Colin et al. | |
| 6,358,151 | B1 | 3/2002 | Enzminger et al. | |
| 6,364,313 | B1 * | 4/2002 | Moody | 273/138.1 |
| 6,364,768 | B1 | 4/2002 | Acres | |
| 6,368,212 | B1 | 4/2002 | Moody | |
| 6,368,213 | B1 | 4/2002 | McNabola | |
| 6,368,214 | B1 | 4/2002 | Luciano | |
| 6,368,218 | B2 | 4/2002 | Angell, Jr. | |
| 6,371,852 | B1 | 4/2002 | Acres | |
| 6,375,567 | B1 | 4/2002 | Acres | |
| 6,386,977 | B1 | 5/2002 | Hole | |
| 6,398,218 | B1 | 6/2002 | Vancura | |
| 6,398,644 | B1 | 6/2002 | Perrie et al. | |
| 6,398,645 | B1 | 6/2002 | Yoseloff | |
| 6,402,614 | B1 | 6/2002 | Schneier et al. | |
| 6,419,583 | B1 | 7/2002 | Crumby et al. | |
| 6,425,823 | B1 | 7/2002 | Byrne | |
| 6,428,412 | B1 | 8/2002 | Anderson et al. | |
| 6,431,983 | B2 | 8/2002 | Acres | |
| 6,443,837 | B1 | 9/2002 | Jaffe et al. | |
| 6,450,885 | B2 | 9/2002 | Schneier et al. | |
| 6,454,648 | B1 | 9/2002 | Kelly et al. | |
| 6,454,651 | B1 | 9/2002 | Yoseloff | |
| RE37,885 | E | 10/2002 | Acres | |
| 6,461,241 | B1 | 10/2002 | Webb et al. | |
| 6,464,582 | B1 | 10/2002 | Baerlocher et al. | |
| 6,471,591 | B1 | 10/2002 | Crumby | |
| 6,475,086 | B2 | 11/2002 | Zach | |

| | | | | |
|---|---|---|---|---|
| 6,478,677 | B1 | 11/2002 | Moody | |
| 6,481,713 | B2 | 11/2002 | Perrie et al. | |
| 6,508,711 | B1 | 1/2003 | Ono | |
| 6,514,144 | B2 | 2/2003 | Riendeau et al. | |
| 6,524,184 | B1 | 2/2003 | Lind et al. | |
| 6,527,638 | B1 | 3/2003 | Walker et al. | |
| 6,533,660 | B2 | 3/2003 | Seelig et al. | |
| 6,533,664 | B1 | 3/2003 | Crumby | |
| 6,537,150 | B1 | 3/2003 | Luciano et al. | |
| 6,565,434 | B1 | 5/2003 | Acres | |
| 6,599,193 | B2 | 7/2003 | Baerlocher et al. | |
| 6,607,441 | B1 | 8/2003 | Acres | |
| 6,609,973 | B1 | 8/2003 | Weiss | |
| 6,645,071 | B2 | 11/2003 | Perrie et al. | |
| 6,656,044 | B1 | 12/2003 | Lewis | |
| 6,702,699 | B2 | 3/2004 | Touhey et al. | |
| 6,712,697 | B2 | 3/2004 | Acres | |
| 6,729,961 | B1 | 5/2004 | Millerschone | |
| 6,739,970 | B2 | 5/2004 | Luciano | |
| 6,749,500 | B1 | 6/2004 | Nelson et al. | |
| 6,764,397 | B1 | 7/2004 | Robb | |
| 6,800,030 | B2 | 10/2004 | Acres | |
| 6,824,465 | B2 | 11/2004 | Luciano, Jr. | |
| 6,832,958 | B2 | 12/2004 | Acres | |
| 6,855,055 | B2 | 2/2005 | Perrie et al. | |
| 6,910,964 | B2 | 6/2005 | Acres | |
| RE38,812 | E | 10/2005 | Acres | |
| 7,179,167 | B2 | 2/2007 | deKeller | |
| 7,291,068 | B2 | 11/2007 | Bryant et al. | |
| 7,318,774 | B2 | 1/2008 | Bryant et al. | |
| 2002/0010013 | A1 | 1/2002 | Walker et al. | |
| 2002/0058545 | A1 | 5/2002 | Luciano | |
| 2002/0072404 | A1 | 6/2002 | Gerow | |
| 2002/0082070 | A1 | 6/2002 | Macke et al. | |
| 2002/0098882 | A1 | 7/2002 | Lind et al. | |
| 2002/0098883 | A1 | 7/2002 | Packes, Jr. et al. | |
| 2002/0111214 | A1 | 8/2002 | Lind et al. | |
| 2002/0113369 | A1 | 8/2002 | Weingardt | |
| 2002/0169018 | A1 | 11/2002 | Schneier et al. | |
| 2003/0181231 | A1 | 9/2003 | Vancura et al. | |
| 2003/0181234 | A1 | 9/2003 | Falciglia, Sr. | |
| 2003/0193136 | A1 | 10/2003 | Walker et al. | |
| 2003/0211884 | A1 | 11/2003 | Gauselmann | |
| 2003/0236116 | A1 | 12/2003 | Marks et al. | |
| 2004/0048644 | A1 | 3/2004 | Gerrard et al. | |
| 2004/0053668 | A1* | 3/2004 | Baerlocher | 463/18 |
| 2004/0106445 | A1 | 6/2004 | Perrie et al. | |
| 2004/0266514 | A1* | 12/2004 | Penrice | 463/18 |
| 2005/0014553 | A1 | 1/2005 | Byrne | |
| 2005/0037832 | A1 | 2/2005 | Cannon | |
| 2005/0119047 | A1 | 6/2005 | Olive | |
| 2005/0143168 | A1 | 6/2005 | Torango | |
| 2005/0176488 | A1 | 8/2005 | Olive | |
| 2005/0209004 | A1 | 9/2005 | Torango | |
| 2005/0227753 | A1 | 10/2005 | Luciano, Jr. | |
| 2005/0239542 | A1 | 10/2005 | Olsen | |
| 2006/0040723 | A1 | 2/2006 | Baerlocher et al. | |
| 2006/0040732 | A1 | 2/2006 | Baerlocher et al. | |
| 2006/0040733 | A1 | 2/2006 | Baerlocher et al. | |
| 2006/0040734 | A1 | 2/2006 | Baerlocher et al. | |
| 2006/0040736 | A1 | 2/2006 | Baerlocher et al. | |
| 2007/0060271 | A1 | 3/2007 | Cregan et al. | |

FOREIGN PATENT DOCUMENTS

| | | | |
|---|---|---|---|
| GB | 2137392 | | 10/1984 |
| GB | 2374294 | A | 10/2002 |
| WO | WO 98/35309 | | 8/1998 |
| WO | WO 00/12186 | | 3/2000 |
| WO | WO 00/67424 | | 11/2000 |
| WO | WO 02/097749 | A2 | 12/2002 |
| WO | WO 2004/014502 | A2 | 2/2004 |
| WO | WO 2005/083599 | A1 | 9/2005 |
| WO | WO 2005/099425 | A2 | 10/2005 |

OTHER PUBLICATIONS

Powerball, "9 Ways to Win" http://www.powerball.com/powerball/pb_prizes.asp accessed Sep. 30, 2010.*

Alley Cat Keno Game Description, written by IGT, available prior to Sep. 2006.

Big Top Keno Advertisement, written by Aristocrat, published Oct. 2000.

Bingo Advertisement, written by Casino Data Systems, published 1998.

Bingo/Keno Advertisement, written by WMS Gaming, Inc., available prior to Sep. 2006.

Bingo Brasil Advertisement, written by Unidesa Gaming, available prior to Sep. 2006.

Bingo Game Station Advertisement, written by Cole Gaming Technologies, available prior to Sep. 2006.

Bingo Party Advertisement, written by Amatic Industries, published 2001.

Bingo Slot Advertisement, written by Unidesa Gaming, available prior to Sep. 2006.

Bingo Slots Advertisement, written by Odds on Gaming, available prior to Sep. 2006.

Bingo Wizard Advertisement, written by Applied Concepts, published 2002.

Bonus Bingo Advertisement, written by Unidesa Gaming, available prior to Sep. 2006.

Canadian Bingo Advertisement, written by Unidesa Gaming, available prior to Sep. 2006.

Cash Keno Advertisement, written by IGT, available prior to Sep. 2006.

D.C. Lottery Hot Lotto: How to Play, written by D.C. Lottery and Charitable Game Control Board, published in 2004.

Dual Screen Keno Machine Picture, written by Acres Gaming, Inc., available prior to Sep. 2006.

Five Card Instant Bingo Advertisement, written by IGT, published 2000.

Four Card Keno Game Screen, written by IGT, available prior to Sep. 2006.

Free Game Keno, written by Keno-Info.com (website: www.keno-info.com/free_keno_game.html), website published 2002, printed on Aug. 11, 2002.

Instant Bingo Video Slots Advertisement, written by IGT, published 2002.

Keno Guide, written by Flamingo Reno, available prior to Sep. 2006.

Party Time Bingo Advertisement, written by Astra Games Limited, available prior to Sep. 2006.

Pot O' Gold Advertisement, written by Vision Gaming & Technology, available prior to Sep. 2006.

Power Ball: How to Play, written by Multi-State Lottery Association, published in 2007 and available prior to Sep. 2006.

Reel Bingo Advertisement, written by B Soft, available prior to Sep. 2006.

Star Spangled Keno Advertisement, written by Silicon Gaming, published 2001.

Triple Diamond Keno Advertisement, written by IGT, available prior to Sep. 2006.

Virginia Lottery Mega Millions: How to Play, written by Virginia Lottery, published in 2007 and available prior to Sep. 2006.

Virginia Lottery Pick 4: How to Play, written by Virginia Lottery, published in 2007 and available prior to Sep. 2006.

* cited by examiner

FIG. 7A

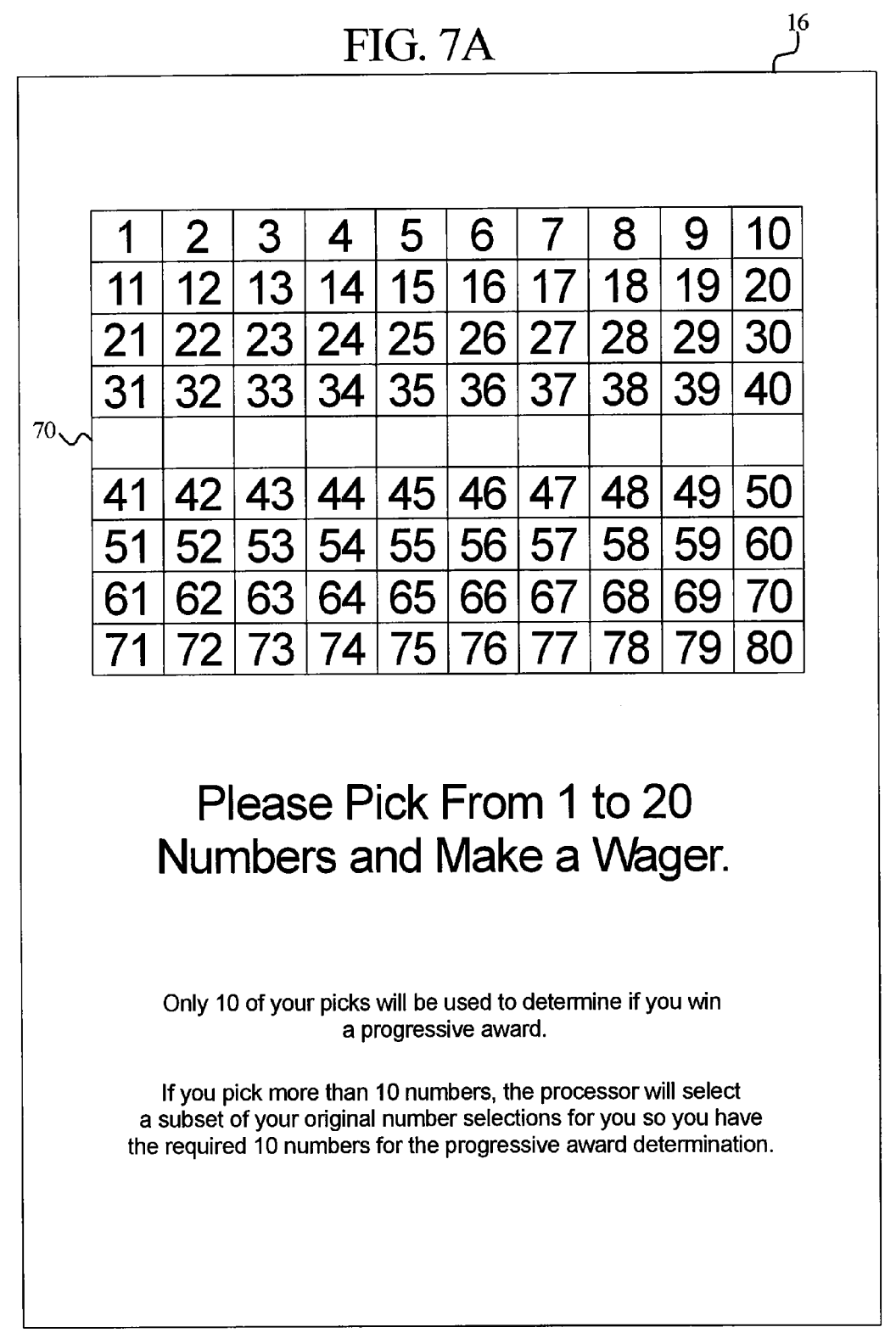

16

70

| | | | | | | | | | |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| | | | | | | | | | |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |

Please Pick From 1 to 20 Numbers and Make a Wager.

Only 10 of your picks will be used to determine if you win a progressive award.

If you pick more than 10 numbers, the processor will select a subset of your original number selections for you so you have the required 10 numbers for the progressive award determination.

GAMING DEVICE AND METHOD PROVIDING RELATIVELY LARGE AWARDS WITH VARIABLE PLAYER PARTICIPATION LEVELS

PRIORITY CLAIM

This application is a non-provisional application of, claims priority to and the benefit of U.S. Provisional Patent Application Ser. No. 60/715,507, filed on Sep. 9, 2005, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Although the present disclosure is applicable to Keno, Lotto, Bingo, Spinning Reel, and Card games, for ease of illustration, the disclosure is described mainly in connection with a Keno game and in particular, gaming devices having video keno games.

Early versions of American Keno used characters on the Keno ticket, rather than the numbers used today. The American game dropped the number of characters to the more familiar eighty. When gambling was legalized Nevada in 1931, the Chinese lottery game was referred to as Horse Race Keno, capturing the idea that the numbers are horses and the player wants the wagered horse to win, place or show. Over time the name has been shortened to simply Keno. Keno is similar to a lottery game. The goal is to choose a winning number or numbers from a plurality of numbers. Most current versions of Keno have eighty numbers including the numbers one to eighty. The player can bet on any number or numbers, up to fifteen numbers, which the player does by marking or picking the selected numbers. Typically, the player can pick 2 to 10 numbers for video keno or 2 to 15 for paper Keno.

In older Keno games the numbers were generated using ping-pong type balls. In more modern Keno, numbers are generated via computers using random number generators. When a number is chosen, the number is shown electronically on Keno boards throughout the casino or on a video monitor of a Keno gaming device.

In live Keno, a number of Keno outlets and Keno monitors are placed in various places around a casino or gaming establishment. The player plays using a ticket and returns a winning ticket to the Keno ticket writer to redeem the win. In video keno, the game keeps track of wins and losses via a credit display as with other types of wagering gaming machines.

Certain variations of Keno have expected returns that are dependent on a number of factors. In general, the highest award for matching all picked numbers increases as the amount of numbers the player plays increases. The frequency of winning depends for example on how few matches are needed to obtain any award. The gaming device manufacturers create a paytable for varying amounts of matches to produce a desired average expected value.

Keno has been embodied in various types of gaming devices. While Keno is relatively popular, a need exists to provide variations of Keno to players to make the play of both the video and casino versions of Keno more enjoyable, fun and exciting.

Some ways gaming device manufacturers have added enjoyment and excitement to gaming devices is through larger payouts or special awards. However, due to the typical 80 number Keno game odds, it is difficult to provide large awards in such Keno games for at least the reasons described below.

One known way to provide large payouts in other wagering games such as slot games has been with progressive gaming. The odds in slot games can be configured to easily accommodate large progressive awards. Progressive games, which have existed at least since the mid-1980's, have become very popular. For instance, known progressive slot machines contain progressive awards that increase every time a player places a wager on a play of a primary game of the slot machine. Progressive awards can involve one or more gaming machines. For example, an individual progressive slot machine can have a self contained progressive award, wherein the jackpot grows with every play of that machine. A linked progressive includes two or more slot machines at the same or different locations connected to a common progressive award, each of which individually contribute to the progressive award. Each machine usually takes a percentage of the player's wager, such as two percent, and adds it to the progressive award. The progressive awards can reach sizeable amounts, such as multi-million dollar jackpots, before a player hits or wins the progressive award.

Such sizeable progressive awards become very attractive to players. As the progressive award grows, so does the game's average expected payout percentage because the game pays out more (by way of the progressive award) while the likelihood of receiving the progressive award remains constant.

Known methods of incorporating progressive awards or other relatively large awards or prizes in a variable wager level game such as Keno suffer from the problem of fixed odds of winning awards. The likelihood of receiving a progressive award or other relatively large award is generally not proportionate to a player's wager level. This encourages certain players to wager at a minimum level because a minimum or maximum wager will give the player the same odds of winning a progressive award or other relatively large award. A partial solution to this problem is to require a player to match a specific or minimum wager level to qualify for the progressive awards or other relatively large award. However, the player may not have an incentive to wager more than the required minimum and up to the maximum allowed by the game.

Keno further complicates the wagering process because a player is typically given a variable number of selections (i.e., in the conventional video keno game, the player can pick from 2 to 10 numbers as mentioned above). This variable number of selections causes the outcome odds to vary radically according to the number of player selections. However, certain casino operators like to offer one or more progressive awards or other relatively large awards in video keno games regardless of the number of player selections. A potential solution to this problem is to only offer such progressive awards or other relatively large awards if a player makes a minimum specific number of selections such as 10 of 10 or 9 of 10. This potential solution makes the progressive awards or other relatively large awards unavailable to a player that may want to select only 4 of 10 numbers to play the Keno game.

A need therefore exists to provide a player an improved ability to win progressive awards or other relatively large awards in games such as Keno, where there is a variable wager level and a variable number of player selections.

SUMMARY

The present disclosure provides gaming devices and methods for implementing designated awards such as top awards or jackpots, relatively large awards and progressive awards in games with a variable number of player selections and variable wager levels.

One embodiment provides a gaming device and method providing a selection game where the gaming device supplements a player's selection of one or more symbols with one or more supplemental symbols so that the player is eligible to win a designated award regardless of the number of symbols selected by the player to play the game. In one such embodiment, the gaming device displays a plurality of symbols. The gaming device enables the player to select up to a designated number of the plurality of displayed symbols to form an initial player set. After the player forms the initial player set, the gaming device determines if the player selected a predetermined minimum number of symbols. If the player did not select the predetermined minimum number of symbols, the gaming device's processor randomly selects one or more supplemental symbols from the plurality of displayed symbols for the player. The processor selected supplemental symbol(s) form a supplemental player set. The initial player set and the supplemental player set form a total player set. In such case, the number of symbols in the total player set at least equals the predetermined minimum number of symbols to be eligible for the large designated award such as a progressive award.

In this embodiment, the gaming device processor (or alternatively a separate processor) also randomly selects or draws a predetermined number of symbols from the plurality of displayed symbols to form a processor selected set. The processor compares the total player set to the processor selected set. The player wins the designated award if a predetermined number of symbols in the total player set match the symbols in the processor selected set. If the player does not win the designated award, the processor determines if the player wins any additional awards. The processor determines the additional awards based on a comparison of the initial player set to the processor selected set to determine if any matches exist. The player may win a base award based on the number of matches between the initial player set and the processor selected set. Thus, in one embodiment, the matches needed to win the base award cannot come from the supplemental player set. In an alternative embodiment, one or more of the supplemental selections can be used to determine the base award. In another embodiment, if the player wins the designated award, the player can also win a base award.

Prior to offering a relatively large award to the player regardless of the number of symbols the player selected, the player was not eligible to win the relatively large award without selecting a predetermined minimum number of symbols (such as 10 of 10 symbols). By supplementing the player's symbol selections, the player's odds of winning the relatively large award are greater than zero. Furthermore, the player is no longer required to make unwanted selections to be eligible for the designated award (i.e., relatively large awards such as the top award or a progressive award). Since the supplemental symbols are not used to provide base awards in the main embodiments disclosed herein, the odds of winning the designated award can be adjusted to be proportional to the designated award using the supplemental numbers.

It should be appreciated that the designated award can be any suitable award and the present gaming device and method accommodate providing awards (e.g., a fixed award such as a car or a million dollars, or a jackpot or progressive award) that are typically not suitable or intended to be provided in games, such as Keno, in proportion to the wager placed on such games. It should also be appreciated that the present gaming device and method also contemplates providing multiple designated awards to players such as different designated awards based on different outcomes or different numbers of matches (e.g., a first progressive award for a designated number of matches and a second progressive award for one less than the designated number of matches).

In one embodiment, the gaming machine will implement this feature of the supplemental player set and thus provide the player a chance to win the relatively large award upon the occurrence of a triggering condition or triggering event. One such embodiment includes the triggering condition or event based at least in part on whether the player made a wager at a predetermined level. For example, if the player wagers three or more credits up to the maximum wager level, the player is eligible to receive a supplemental player set and thus can win the designated award. In another example, the predetermined level for the triggering event is a maximum wager amount. In another embodiment, the triggering condition is a side bet made by the player to trigger this feature. In another embodiment, the triggering event or condition is based in part upon the player's status such as maintained by a player tracking system or by a series of recent plays. For instance, the triggering event or condition may occur if the player has achieved a certain status by wagering a predetermined amount of credits over a predetermined time period. Alternatively, the player's status is determined by other suitable events such as whether the player lost a predetermined amount of games or credits, or whether the player won a predetermined amount of games or credits. It should be appreciated that one or more of these types of triggering conditions or events may be implemented in any of the embodiments of the present disclosure.

It should also be appreciated that the base award is variable in certain embodiments because the base award is based on the number of matches created between the initial player set and the processor selected set. Generally, the greater the number of matches, the greater the payout will be. For example, if three matches are created, the gaming machine can pay the player back at a multiple of the player's wager such as 2× the player's wager. Likewise, if four matches are created, the payout may be increased to 4× the player's wager. It should thus be appreciated that the base awards can be determined according to a suitable Keno paytable or other suitable paytables.

In one Keno example embodiment with a progressive award, the gaming device displays eighty numbers for the player to select. The gaming device enables the player to select up to ten numbers from the eighty numbers to form an initial player set. The player must match ten numbers to be eligible for the progressive award. If the player selects six numbers to form the initial player set, the player is missing four numbers. The processor selects four additional numbers from the eighty numbers for the player. The four additional numbers form the supplemental player set. The initial player set and the supplemental player set form the total player set.

The gaming machine processor also randomly selects or draws twenty numbers from the eighty numbers to form a processor selected set. The processor compares the total player set to the processor selected set. The player wins the progressive award if all ten numbers in the total player set match ten of the numbers in the processor selected set. The player does not win the progressive award if the player does not have the ten matches. If the player did not win the progressive award, the processor determines any awards based on a comparison of the initial player set and the processor selected set to determine if any matches exist. This can be a new comparison or can use the previous comparison. The player may win a base award from a Keno paytable based on the number of matches between the initial player set and the processor selected set. The matches needed to win this base award do not come from the supplemental player set in one embodiment.

It should also be appreciated that the base awards would in one embodiment includes standard Keno awards. In this application, the embodiments are described as such that if the designated award is provided to the player, the base award is not provided to the player. It should be appreciated that in alternative embodiments, the base award may be provided in addition to the designated award.

It should thus be appreciated that the above described embodiment provides odds of winning the designated award (such as the top, progressive or jackpot award) to be consistent regardless the number of player picks. The above described embodiment is accomplished by using a fixed size set of numbers which, if a sufficient quantity (e.g., all) are hit by the draw, causes the designated award to be provided to the player. To establish this fixed sized set of numbers, this above embodiment employs the player's picked numbers to the extent or degree possible. If the player picks fewer numbers than the fixed sized set, the processor fills in the shortfall (e.g., randomly selecting from the unpicked numbers).

It should also be appreciated that in one alternative embodiment, if the player selects more numbers than required for the fixed set, a subset of the player selected numbers is used (i.e., any suitable subset could be used). For instance, if the player selects ten numbers and only nine are needed to win the designated award, the gaming device selects a subset of nine numbers (such as the first nine numbers picked by the player) from the player selected ten numbers to determine the number of matches and if the player wins the designated award. Thus, it should be appreciated that the above described embodiment focuses on the situation of the player picking fewer numbers, and not on the player picking more numbers than needed and the processor using a subset to determine if the designated award should be provided to the player.

It should thus be appreciated that while the preferred approach has the fixed set coming from the player picked number(s) and augmented, if necessary, by the processor, the present disclosure also contemplates any suitable manner for establishing the augmentation or for generation of the entire fixed set selection, whether by the player or by the processor or both. It should thus be appreciated that alternatively the player can pick the supplemental set in any suitable manner.

In other embodiments, the present disclosure accommodates variable wager amounts where the odds of winning the designated award (such as the top award, progressive award, or jackpot award) are proportionate to the player's wager. In one such embodiment, the gaming device displays a plurality of symbols. The gaming device enables the player to select at least one symbol, up to a fixed quantity of symbols, of the plurality of displayed symbols to form a player set. In this embodiment, the size of or number of symbols the player may select in the player set is predetermined regardless of the wager amount. Alternatively, either the player, the gaming device processor, or a combination of both can select the symbols which form the player set.

In this embodiment, the gaming device processor (or alternatively a separate processor) also randomly selects or draws a predetermined number of symbols from the plurality of displayed symbols to form a first processor selected set (i.e., the processor selected set described above). In this embodiment, from either this first processor selected set or the plurality of displayed symbols (i.e., the remaining symbols not included in the first processor selected set), the gaming device processor also selects zero, one or more symbols to form a second processor selected set. The gaming device processor classifies, designates or otherwise categories each symbol in the second processor selected set as a designated symbol. In one such embodiment, the number of designated symbols in the second processor selected set is variable and based on the player's wager level. That is, the number or quantity of symbols in the second processor selected set is kept proportionate to the player's wager level. In one such embodiment, for each drawn symbol from the first processor selected set, the gaming device determines, based on a percentage related to the current wager divided by the total wager, whether to classify that symbol as a designated symbol in the second processor selected set. In another such embodiment, the gaming device classifies a fixed portion of the symbols from the first processor selected set as designated symbols in the second processor selected set, wherein the number of symbols from the first processor selected set which are designated is based on the player's wager. In another such embodiment, the gaming device classifies a fixed portion of the displayed symbols as designated symbols in the second processor selected set, wherein the number of symbols from the total set of displayed symbols which are designated is based on the player's wager.

In this embodiment, after all of the sets are created, the processor compares one of the symbols in the player set to the designated symbols in the second processor selected set. The player wins the designated award if a specific one of symbols in the player set matches one of designated symbols in the second processor selected set. That is, to provide the player the designated award, a specific one of the symbols in the player selected set (such as the player's first symbol picked or the player's last symbol picked) must match one of the designated symbols in the second processor selected set. In another embodiment, the player wins the designated award if a specific one of symbols in the player set matches one of the designated symbols in the second processor selected set and zero, one or more symbols in the player selected set match zero, one or more symbols in the first processor selected set. In another embodiment, if a specific one of symbols in the player set matches one of the designated symbols in the second processor selected set (and zero, one or more symbols in the player selected set match zero, one or more symbols in the first processor selected set), the player wins the designated award and a base award. It should be appreciated that although this described embodiment includes a specific one of the symbols in the player selected set matching one of the designated symbols in the second processor selected set, in an alternative embodiment, any elected symbols (i.e., a symbol separate from the symbols in the player selected set) must match one of the designated symbols in the second processor selected set for the player to win the designated award.

In one embodiment, if the player did not win the designated award, the processor compares the symbols in the player set to the symbols in the first processor selected set to determine if any matches exist. The player wins a base award if the comparison between the symbols in the player set and the symbols in the first processor selected set result in a predetermined quantity of matches. In another embodiment, even if the player wins the designated award, the processor compares the symbols in the player set to the symbols in the first processor selected set to determine if any matches exist. In this embodiment, the player wins a base award if the comparison between the symbols in the player set and the symbols in the first processor selected set result in a predetermined quantity of matches.

In accordance with the above embodiment, the player's wager level is associated with the odds of winning the designated award by maintaining a fixed number of symbols in the player selected set and causing the number of designated symbols in the second processor selected set to vary according to a player's wager level. That is, an increase in player's wager level provides more designated symbols in the second processor selected set and thus the player's odds of matching a specific symbol in the player set (such as the player's first picked symbol or the player's second picked symbol) to a designated symbol in the second processor selected set increase. In one example, a first wager of two credits provides two designated symbols in the second processor selected set and a second wager of five credits provides five designated symbols in the second processor selected set. In this example, if in a play of the game, a player selects ten symbols to form the player selected set (regardless of the wager amount) and to win a progressive award a player must match a specific symbol in the player selected set with one designated symbol in the second processor selected set, then a player who wagers five credits (and is provided five designated symbols in the second processor selected set) has a greater probability of winning the progressive award than a player who wagers two credits (and is provided two designated symbols in the second processor selected set).

In another embodiment, the gaming device forms a player selected subset or second player set which includes a variable number of the plurality of symbols of the player selected set (i.e., the displayed symbols the player picked). In this embodiment, the gaming device determines the subset size or the number of symbols in the player selected subset based on the player's wager level. That is, the number of symbols in the player selected subset (or second player set) is proportionate to the player's wager level. In one embodiment, for each credit the player wagers, the gaming device enables the player to select one symbol to include in the player subset. Alternatively, either the player, the gaming device processor, or a combination of both can select the symbols for the player subset. It should be appreciated that the formed player subset may include all or a portion of the symbols in the player selected set.

In this embodiment, the gaming device processor (or alternatively a separate processor) randomly selects or draws a predetermined number of symbols from the plurality of displayed symbols to form a first processor selected set. Before, during, or after the first processor selected set is formed and independent of the player's wager, the gaming device processor classifies, designates or otherwise categories one symbol as a designated symbol. The designated symbol is typically drawn from the first processor selected set (such as the first drawn number in the first processor selected set or the last drawn number in the first processor selected set). The processor compares the symbols in the player subset (or second player set) to the designated symbol to determine if the player wins a designated award. In this embodiment, the player wins the designated award if one symbol in the player subset matches the designated symbol (and zero, one or more symbols in the player selected set match zero, one or more symbols in the first processor selected set). That is, to provide the player the designated award, one of the symbols in the player selected subset must match the specific designated symbol. Alternatively, the player wins the designated award and a base award if one symbol in the player subset matches the designated symbol (and zero, one or more symbols in the player selected set match zero, one or more symbols in the first processor selected set).

In one embodiment, if the player did not win the designated award, the processor compares the symbols in the player set to the symbols in the first processor selected set to determine if any matches exist. The player wins a base award if the comparison between the symbols in the player set and the symbols in the first processor selected set result in a predetermined quantity of matches. In another embodiment, even if the player wins the designated award, the processor compares the symbols in the player set to the symbols in the first processor selected set to determine if any matches exist. In this embodiment, the player wins a base award if the comparison between the symbols in the player set and the symbols in the first processor selected set result in a predetermined quantity of matches.

In accordance with the above embodiment, the player's wager level is associated with the odds of winning the designated award by maintaining a fixed number of designated symbols and causing the number of symbols in the player selected subset to vary according to a player's wager level. That is, an increase in a player's wager level provides more symbols in the player selected subset and thus the player's odds of matching one of the symbols in the player selected subset to the designated symbol increase. In one example, a first wager of two credits provides two symbols in the player selected subset and a second wager of five credits provides five symbols in the player selected subset. In this example, if in a play of the game, to win a progressive award a player must match a specific symbol in the player selected subset with the designated symbol, then a player who wagers five credits (and is provided five symbols in the player selected subset) has a greater probability of winning the progressive award than a player who wagers two credits (and is provided two symbols in the player selected subset).

In further embodiments that accommodate variable wager amounts, the gaming device or method enables the selection of a second set of symbols for both a player and a processor. In this embodiment, the processor initiates game play at a gaming terminal where the gaming device displays a plurality of symbols. The gaming device enables the player to pick a predetermined quantity of the displayed plurality of symbols to form a first player set.

The processor or the player selects one additional symbol from the plurality of displayed symbols (i.e., any of the plurality of displayed symbols or the remaining unselected symbols) or from the first player set to form a second player set.

The processor also randomly generates or draws a predetermined quantity of symbols from the same plurality of displayed symbols to form a first processor selected set. Before, during, or after the first processor selected set is formed, the processor also draws a zero, one or more of the symbols from the first processor selected set to form a second processor selected set based on the player's wager level. The second processor selected set symbol(s) are alternatively determined using algorithms including: fixed odds for each draw, a fixed portion of the draw, or a fixed portion of the selectable numbers.

After the game sets are drawn, the processor marks the symbols from both game sets on a hit or match area. The processor determines if the player wins any awards by comparing the first processor selected set with the first player set and comparing the second processor selected set with the second player set. The player wins a designated award if the processor determines that a predetermined quantity of matching symbols is created. Alternatively, if the predetermined quantity of matching symbols is created, the player wins the designated award and a base award.

If the player did not win the designated award, the processor compares the first player set to the first processor selected set to determine if any matches exist. The player wins the base award if the comparison between the first player set and the first processor selected set produce a predetermined quantity of matches.

In another embodiment that accommodates variable wager amounts, the second processor selected set size is predetermined while the second player set is variable. In this embodiment, the processor initiates game play at a gaming terminal where the gaming device displays a plurality of symbols. The gaming device enables the player to pick a plurality of the displayed plurality of symbols to form a first player set.

The processor or the player also selects additional symbols from the plurality of displayed symbols (i.e., any of the plurality of displayed symbols or the remaining unselected plurality of displayed symbols) or from the first player set to form a second player set. The gaming device determines the quantity of additional symbols for the second player set (i.e., the set size) from the player's wager level. The second player set size is proportionate to the player's wager level. In one embodiment, for each credit the player wagers, the gaming device enables one symbol to be selected for the player set. It should be appreciated that the second player set can also be calculated using various different algorithms.

The processor also randomly generates or draws twenty symbols from the same plurality of displayed symbols to form a first processor selected set. After the first processor selected set is formed, the processor randomly draws one of symbols from the first processor selected set to form a second processor selected set. The quantity of symbols in the second processor selected set is predetermined. In one embodiment, the processor draws the last selected symbol of the first processor selected set to form the second processor selected set.

After the game sets are drawn, the processor marks the symbols from both game sets on a hit or match area. The processor determines if the player wins any awards by comparing the first processor selected set with the first player set and comparing the second processor selected set with the second player set. The player wins a designated award if the processor determines that a predetermined quantity of matching symbols is created between the sets. Alternatively, if the predetermined quantity of matching symbols is created between the sets, the player wins the designated award and a base award.

If the player did not win the designated award, the processor compares the first player set to the first processor selected set to determine if any matches exist. The player wins a base award if the comparison between the first player set and the first processor selected set produce a predetermined quantity of matches. In one embodiment, the base award includes, but is not limited to, a typical Keno award that relates the quantity of player matches to the award amount.

In the various embodiments discussed above, the player's wager level was associated with a variably sized set (whether a player set or a processor selected set). After symbols were accumulated in the various sets, the symbols in the variably sized set were compared against the symbol(s) in a fixed sized set. Since the symbols in both sets originate from the same plurality of symbols, increasing the quantity of symbols in the variably sized set increases the odds for matching the symbol (s) in the fixed sized set. Thus, when a player's wager increases or decreases and the variably sized set respectively increases or decrease in size, the odds of winning the designated award are associated to the player's wager.

Another alternative embodiment combines the previously mentioned concepts of supplementing a player's symbol selections and enabling a player's odds of winning a designated award to be proportionate to the player's wager. In one such embodiment, the gaming device displays a plurality of symbols. The gaming device enables the player to select up to a designated number of the plurality of displayed symbols to form an initial player symbol set. After the player forms the initial player set, the gaming device determines if the player selected a predetermined minimum number of symbols. If the player did not select the predetermined minimum number of symbols, the processor selects one or more supplemental symbols from the plurality of displayed symbols for the player. The processor selected supplemental symbols form a supplemental player set. Together, the initial player set and the supplemental player set form a total player set. The number of symbols in the total player set equals the predetermined minimum number of symbols necessary to be eligible for the designated award.

It should also be appreciated that in one alternative embodiment, if the player selects more numbers than required for the initial player set, a subset of the player selected numbers is used (i.e., any suitable subset could be used).

At some time before or after the total player set is formed, the processor or player selects an additional symbol from the plurality of displayed symbols or from the total player set to form a second player set. The level of the player's wager determines the number of symbols in the second player set. Generally, if a player's wager level increases, the number of symbols in the second player set also increases and thus, the player's odds of winning will increase proportionately with the player's wager.

The processor also randomly selects or draws a predetermined number of symbols from the same plurality of displayed symbols to form a first processor selected set. After the first processor selected set is formed, the processor randomly selects or draws one symbol from the first processor selected set to form a second processor selected set.

The processor determines if the player wins any awards after all of the player sets are selected and all of the processor selected sets are drawn. The player wins a designated award if the processor determines that a predetermined number of matching symbols is created by comparing first processor selected set with the total player set and comparing the second processor selected set with the second player set (i.e., the sum of both comparisons). If the player did not win the designated award, the processor uses the result of the comparison of the initial player set to the first processor selected set to determine any awards. The player wins a base award if the comparison between the initial player set and the first processor selected set produce a predetermined number of matches. The matches needed to win the base award cannot come from the supplemental player set in one embodiment.

With the combined embodiments, the game is able to provide the player with the relatively large awards regardless of number of player selections and keep the odds of winning the designated award such as the top award proportionate to the player's wager.

The present disclosure alternatively includes multiple progressive awards, multiple relatively large awards, or a combination of the two. Individual progressive awards and relatively large awards could have one or more of each type of award associated with their own symbol or draw sets, specially designated symbol, or symbol sets. The different award types could also be associated with a predetermined symbol that must be drawn or a predetermined number player matches.

The apparatus and method disclosed herein thus enables players to be eligible for progressive awards or other relatively large awards regardless of the number of player selections and in various embodiments provides players with odds of winnings that are proportionate to a player's wager level.

Depending on the configuration, the game of the present disclosure can be suitably played as either the primary or secondary game.

Additional features and advantages of the present disclosure are described in, and will be apparent from, the following Detailed Description and the Figures.

BRIEF DESCRIPTION OF THE FIGURES

FIGS. 7A, 7B, 7C and 7D illustrate various screens of a display device for one embodiment of the present disclosure having a designated award with a variable amount of player selections described in connection with FIG. 4B. In this embodiment, the player has selected more than a required minimum number of selections.

DETAILED DESCRIPTION

Figure 1:
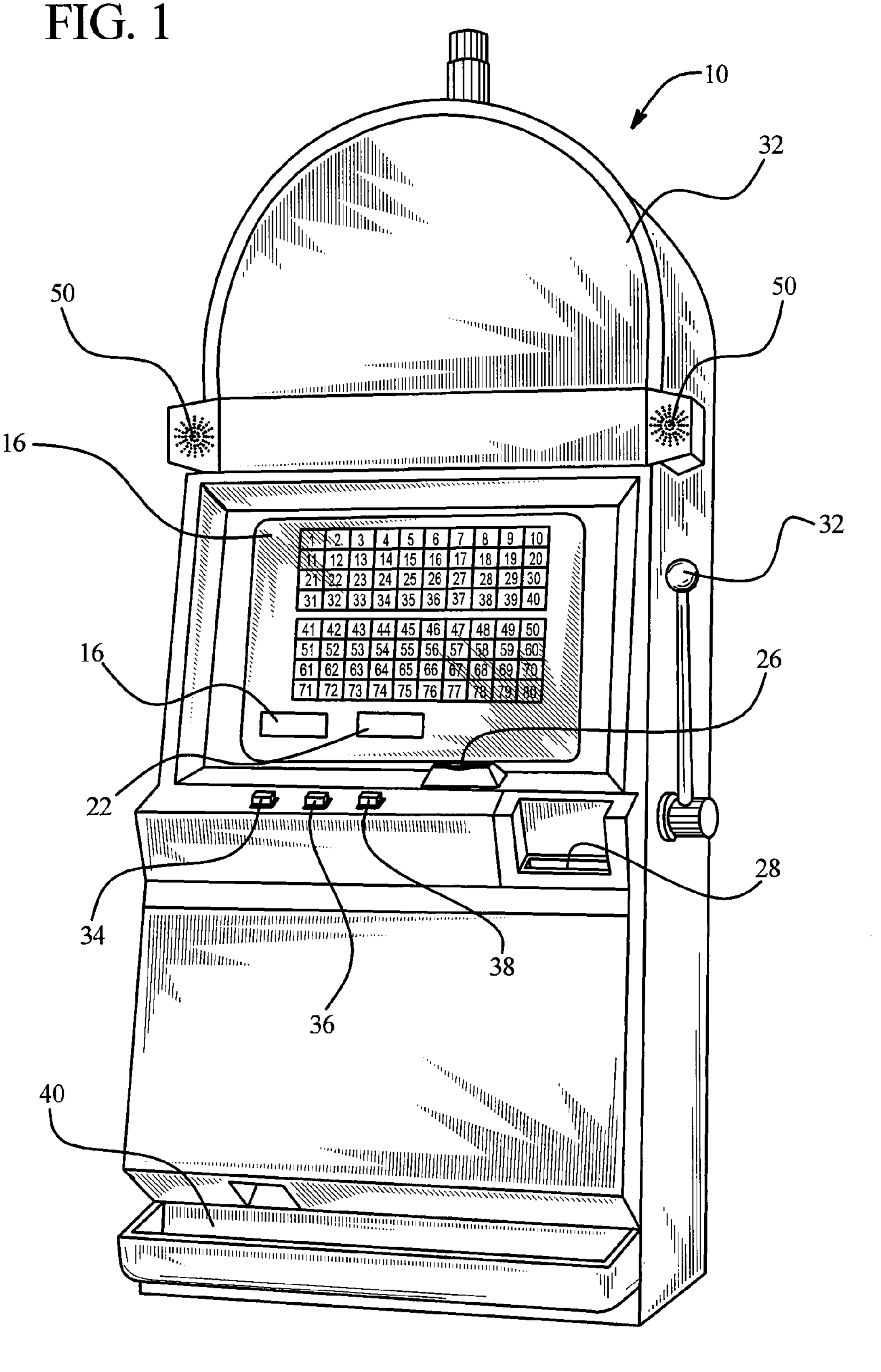
FIG. 1 is a perspective view of a gaming device incorporating one embodiment of the present disclosure.

Referring now to the drawings, one embodiment of the gaming device is illustrated in FIG. 1 as gaming device 10.

In one embodiment, as illustrated in FIG. 1, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIG. 1, the gaming device may have varying cabinet and display configurations.

Figure 2A:
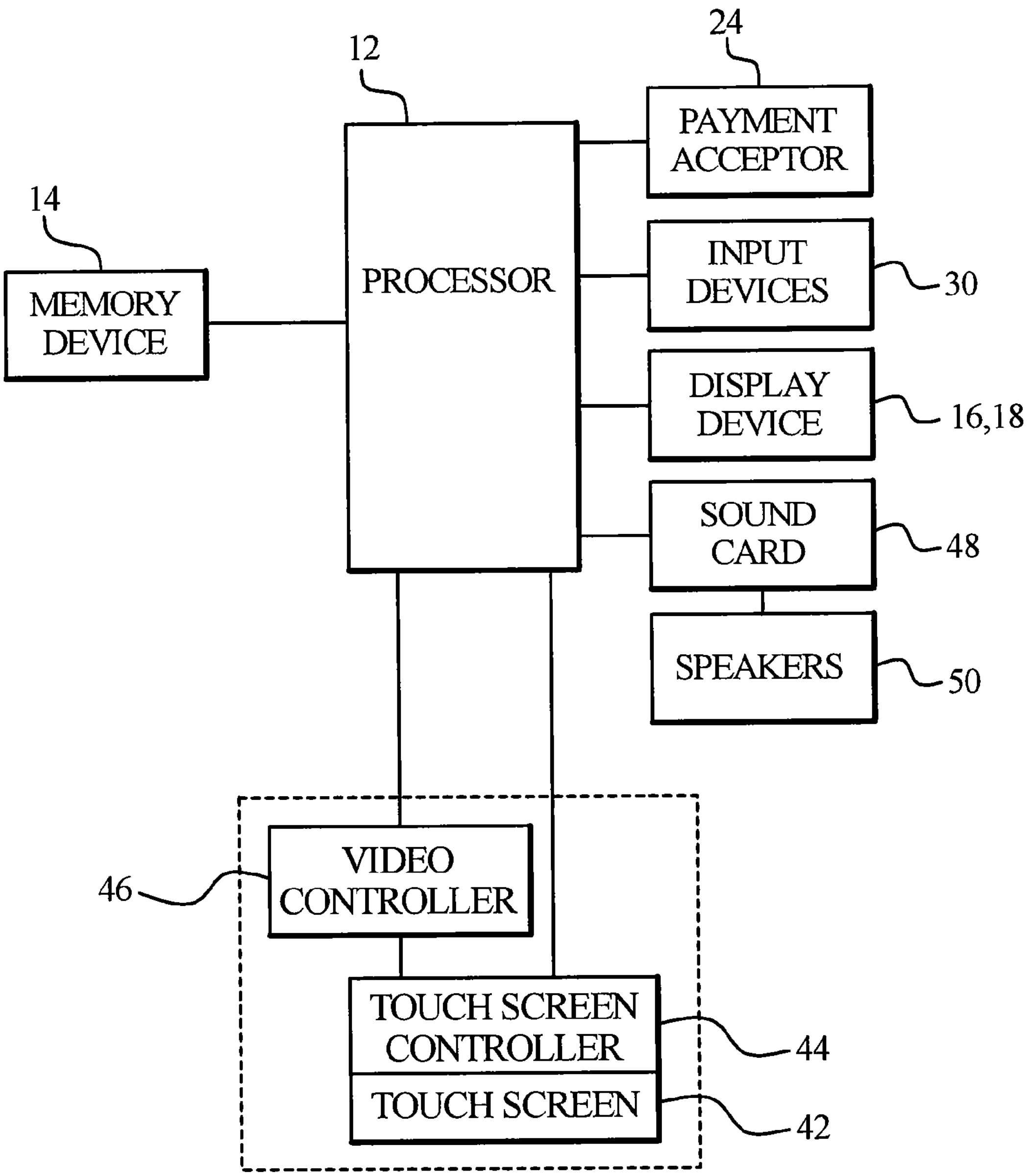
FIGS. 2A and 2B are electrical schematics for different embodiments of the gaming device of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a computer or controller.

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player in the form of game of the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1 includes a central display device 16 which displays a primary game. This display device may also display any secondary game associated with the primary game as well as information relating to the primary or secondary game. In another embodiment, at least one display device may be a mobile display device, such as a PDA or tablet PC, that enables play of at least a portion of the primary or secondary game at a location remote from the gaming device. As seen in FIG. 1, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

As illustrated in FIG. 2A, in one embodiment, the gaming device includes at least one payment acceptor 24 in communication with the processor. As seen in FIG. 1, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1 and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIG. 1, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor)

that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a bonus meter programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple buy in by the player if, for example, the player has been unsuccessful at qualifying through other specified activities.

Figure 2B:
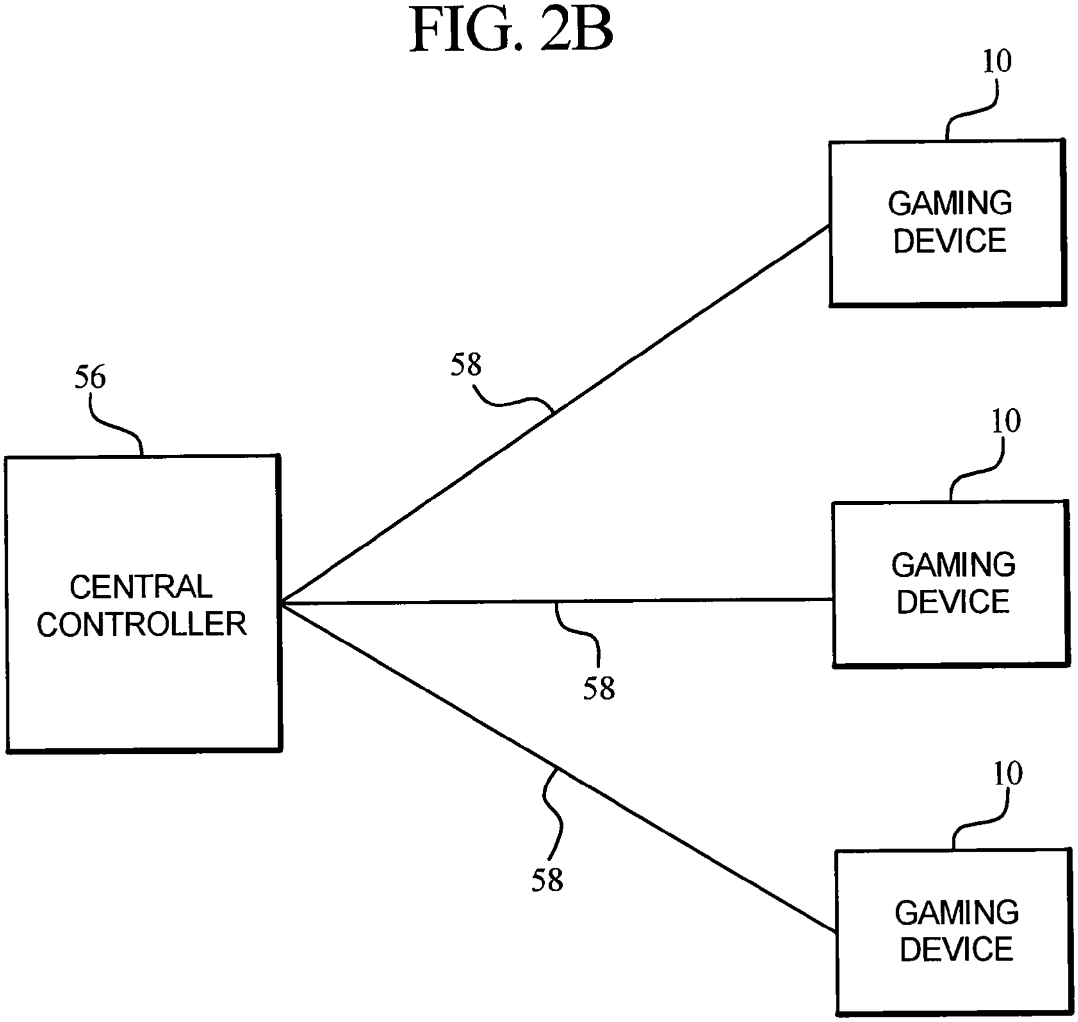

In one embodiment, as illustrated in FIG. 2B, one or more of the gaming devices 10 may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a chip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive awards. All participating gaming sites report to, and receive information from, the host site computer. Each central server computer is responsible for all data communication between the gaming device hardware and software and the host site computer. In one embodiment, an individual gaming machine may trigger a progressive win, for example through a game play event such as a symbol-driven trigger. In one embodiment, the central server or other central controller determines when a progressive win is triggered. In one embodiment, a central controller and an individual gaming machine work in conjunction with each other to determine when a progressive win is triggered, for example through an individual gaming machine meeting a predetermined requirement established by the central controller.

General Keno Game Operation

Figure 3A:
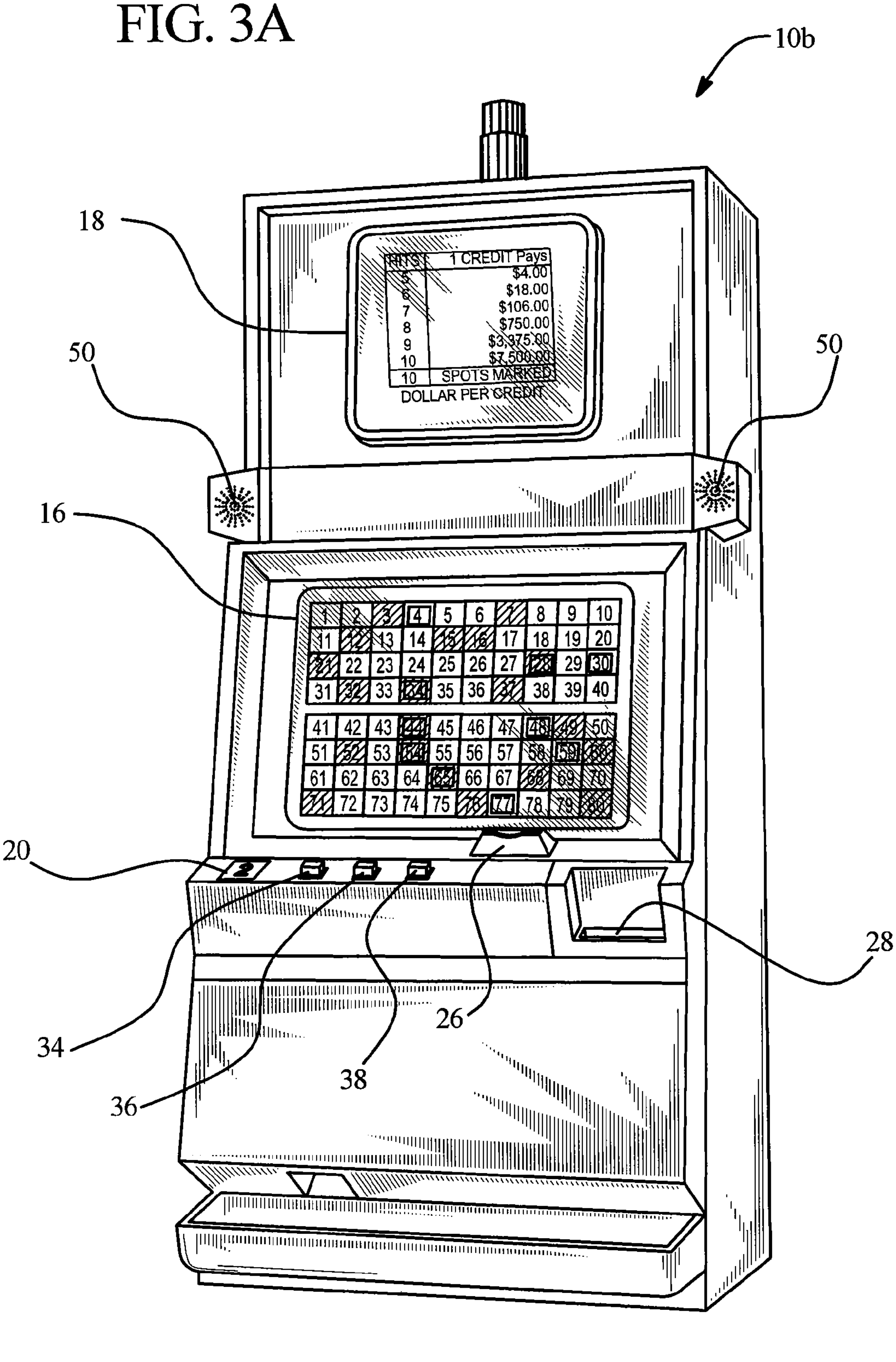
FIGS. 3A and 3B are perspective views of a gaming device with known game displays.
Figure 3B:
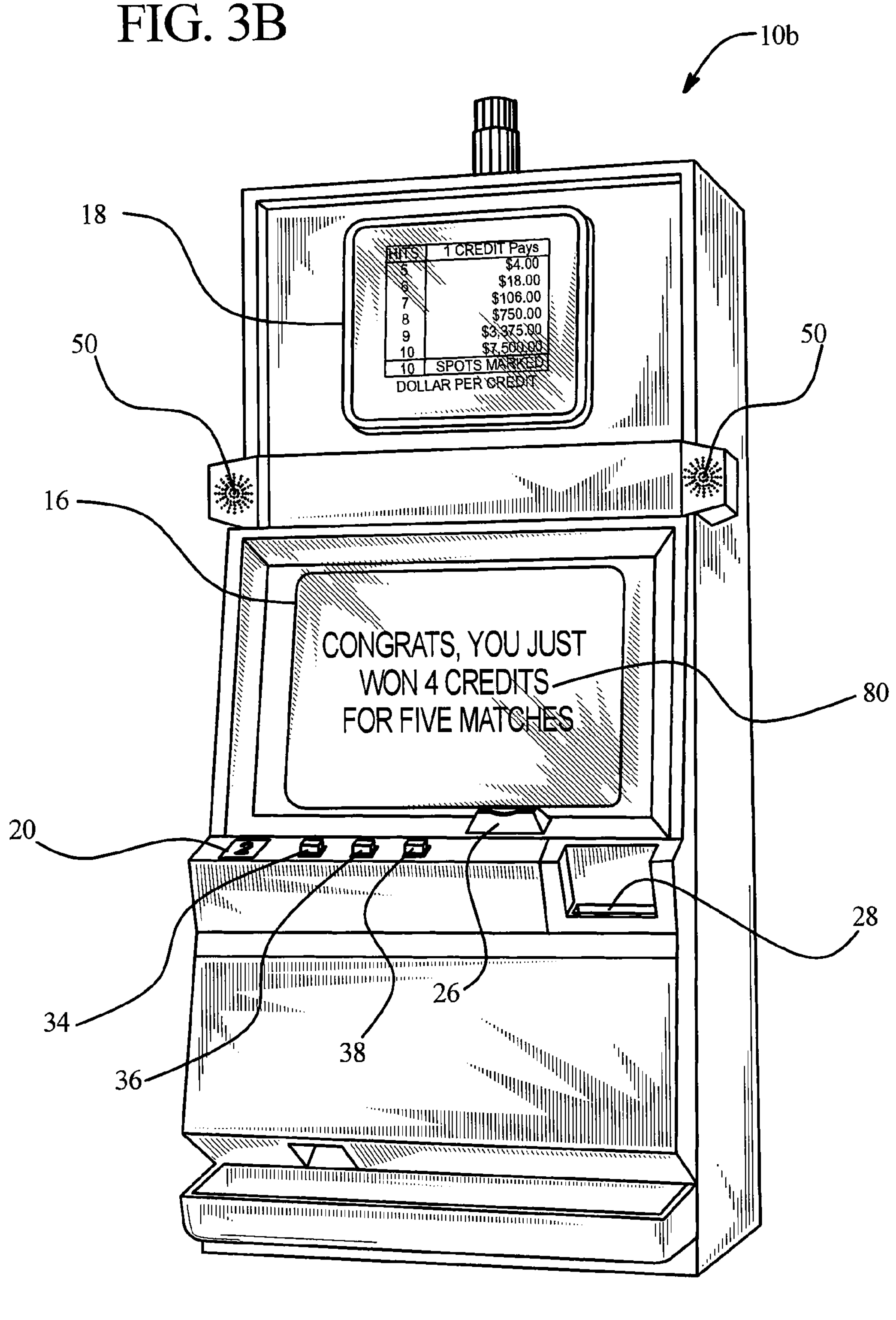

FIGS. 3A and 3B illustrate an operation of a known Keno game. FIG. 3A illustrates a screen on the second video monitor 16 with eighty numbers and a complete Keno game. In this example, the player has pressed one of the electromechanical pushbuttons 34 or has touched the touch screen 42 that operates with display device 16 to select or pick ten numbers 4, 28, 30, 34, 44, 48, 54, 59, 65 and 77. Alternatively, the player presses an input that causes an automatic pick of the numbers for the player. The player's picks are shown in FIG. 3A as bolded and bordered. In the example illustrated, gaming device 10*b* has randomly generated or drawn twenty numbers 3, 7, 12, 15, 16, 21, 28, 32, 34, 37, 44, 49, 52, 54, 60, 65, 68, 71, 76 and 80. The drawn numbers are indicated by at least an additional marking such as a diagonal line through the number.

There are five matches shown in FIG. 3A, namely, numbers 28, 34, 44, 54 and 65 (bearing both markings). According to the paytable displayed in display device 18, gaming device 10*b* pays $4.00 on a one dollar bet for five matches or hits, in this case for ten player picks. Keno payouts can vary. For example, if the player picks five numbers, the Keno game can require that the random generation device draw two of those five numbers for the player to receive any award or three of those five numbers for the player to receive any award. If the Keno game draws for example three matches, the Keno game can pay the player back at three to one, 2.5 to one, 3.5 to one, etc.

In known Keno, an equal weight is assigned to each number picked by the player and each number drawn by the Keno game. The number of matches determines the player's award independent of which numbers are matched. The award, if any, depends on the percentage of the player's picks that are also generated randomly by gaming device 10*b* or the house. For example, the player starts with three credits as seen in credit meter 20 (not shown). The game costs one dollar to play. FIG. 3A illustrates that the player has played one game, decreasing the player's credits to two as seen in credit meter 20.

FIG. 3B illustrates via message 80 and credit meter 20 that gaming device 10 in known Keno has paid the player four credits for obtaining five matches, increasing the total to six. Likewise in known casino play, if the player has enough matches to claim a winning ticket, which depends on how many numbers the player has selected, the player returns to the Keno clerk to redeem the winning ticket.

Specific Keno Operation

Figure 4A:
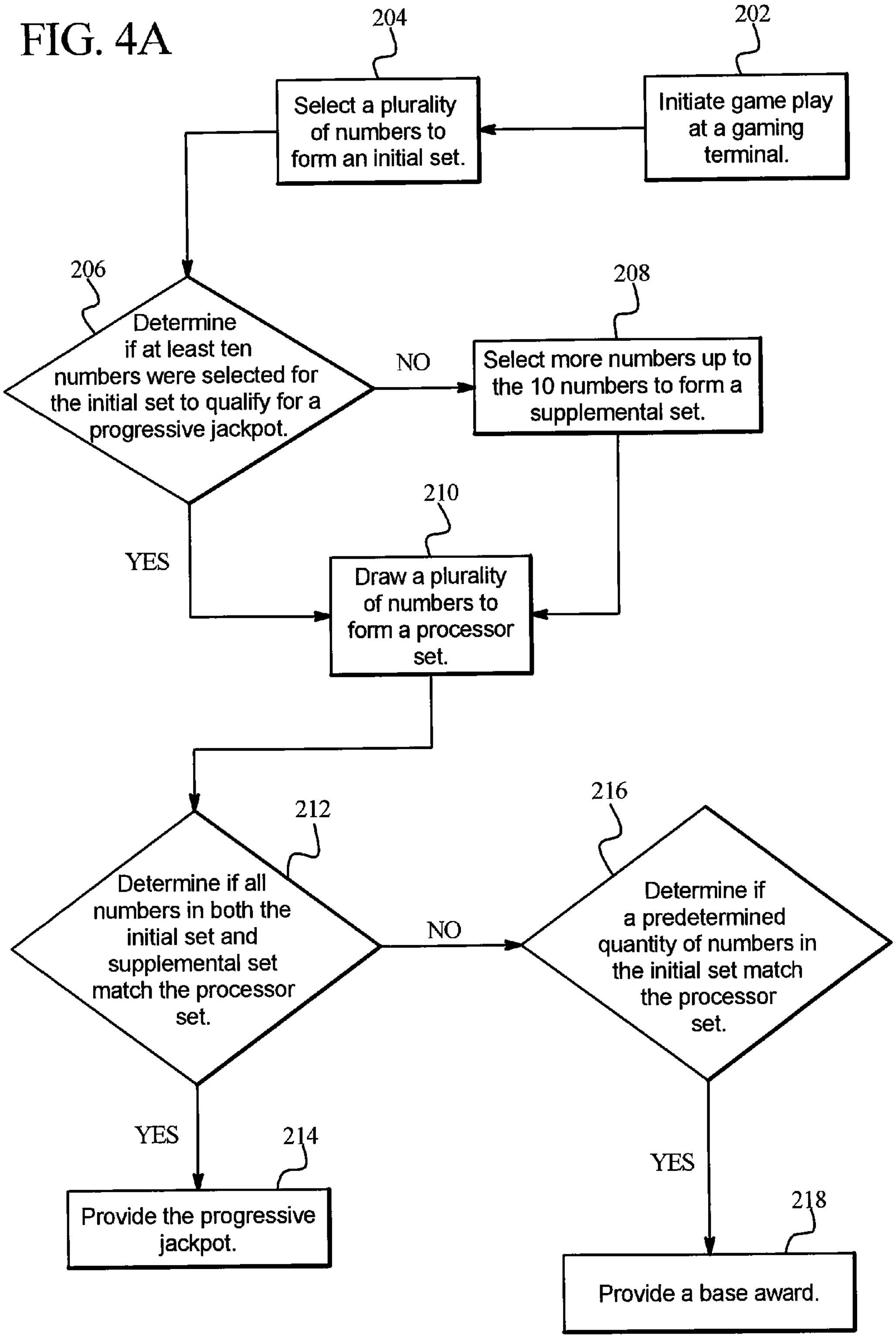
FIGS. 4A and 4B are flow diagrams for two embodiments of the present disclosure that can provide a designated award regardless of number of player selections.

One embodiment of the present disclosure with a designated award such as a progressive award is illustrated in the flow chart of FIG. 4A. The processor initiates game play at a gaming terminal where the gaming device displays eighty numbers as indicated by block 202. An example of the eighty numbers is illustrated in FIG. 3A in the form of a Keno game board. The gaming device enables the player to pick a plurality of the displayed numbers to form an initial player set as indicated by block 204. Gaming machine determines if the player selected a predetermined minimum quantity of ten numbers, as indicated by decision diamond 206. If the player did not select the ten numbers, the processor selects or causes the selection of one or more supplemental numbers from the eighty numbers for the player as indicated by block 208. The selected supplemental numbers form a supplemental player set. The initial player set and the supplemental player set form a total player set. The quantity of numbers in the total player set must reach the predetermined minimum quantity of numbers to be eligible for the progressive award.

The processor also randomly generates or draws twenty numbers from the eighty numbers to form a processor selected set as indicated by block 210. After the processor selected set is formed, the processor indicates the numbers on a hit or match area by at least an additional marking such as a diagonal line through each of the numbers. The processor compares the total player set to the processor selected set after both sets are formed to determine if any winning conditions occurred as indicated by decision diamond 212. The player wins the progressive award if all ten numbers in the total player set match ten of the numbers in the processor selected set as indicated by block 214. Alternatively, the player wins both the progressive award and a base award.

The player does not win the progressive award if the player does not have the ten matches. If the player does not have the ten matches, the processor compares the initial player set to the processor selected set to determine if any matches exist as indicated by decision diamond 216. The player wins the base award based on a suitable Keno paytable if the comparison between the initial player set and the processor selected set produce a predetermined quantity of matches as indicated by block 218. In one embodiment, the matches needed to win the base award cannot come from the supplemental player set. This embodiment thus enables the player to win a progressive award regardless of the number of initial player selections. It should be appreciated that in this embodiment and the other embodiments discussed herein the numbers of player picks, the number of processor picks, the designated number, and any other numbers may vary.

Figure 4B:
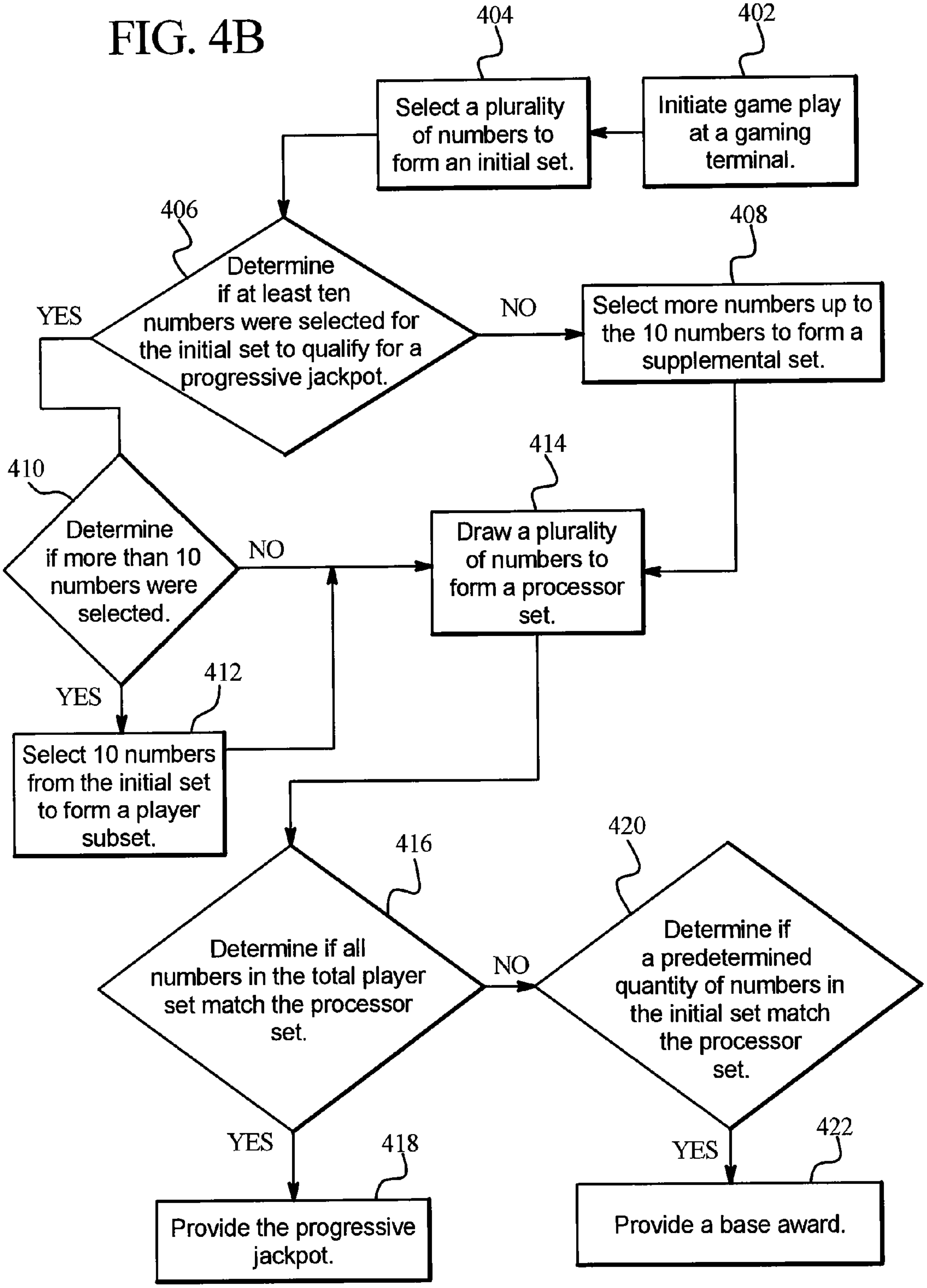

Another embodiment with a designated award such as a progressive award is illustrated in the flow chart of FIG. 4B. The processor initiates game play at a gaming terminal where the gaming device displays eighty numbers as indicated by block 402. An example of the eighty numbers is illustrated in FIG. 3A in the form of a Keno game board. The gaming device enables the player to pick a plurality of the displayed numbers to form an initial player set as indicated by block 404. The gaming machine determines if the player selected a predetermined minimum quantity of ten numbers, as indicated by decision diamond 406. If the player did not select the ten numbers, the processor selects or causes the selection of one or more supplemental numbers from the eighty numbers for the player as indicated by block 408. The selected supplemental numbers form a supplemental player set. The initial player set and the supplemental player set form a total player set. The quantity of numbers in the total player set must reach the predetermined minimum quantity of numbers to be eligible for the progressive award.

However, if the gaming machine determines that the player selected at least ten numbers, the gaming machine determines whether more than ten numbers were selected by the player as indicated by decision diamond 410. If the player selected more than ten numbers, the processor selects or causes the selection of a subset of ten numbers from the initial player set as indicated by block 412. The subset of ten numbers form a subset player set. The subset player set forms the total player set. The numbers in the total player set are used to determine eligibility for the progressive award. Alternatively, the player or the processor can select from the eighty numbers to form the subset player set.

The processor also randomly generates or draws twenty numbers from the eighty numbers to form a processor selected set as indicated by block 414. After the processor selected set is formed, the processor indicates the numbers on a hit or match area by at least an additional marking such as a diagonal line through each of the numbers. The processor compares the total player set to the processor selected set after both sets are formed to determine if any winning conditions occurred as indicated by decision diamond 416. The player wins the progressive award if all ten numbers in the total player set match ten of the numbers in the processor selected set as indicated by block 418. Alternatively, the player wins both the progressive award and a base award.

The player does not win the progressive award if the player does not have the ten matches. If the player does not have the ten matches, the processor compares the initial player set to the processor selected set to determine if any matches exist as indicated by decision diamond 420. The player wins the base award based on a suitable Keno paytable if the comparison between the initial player set and the processor selected set produce a predetermined quantity of matches as indicated by block 422. This embodiment also enables the player to win a progressive award regardless of the number of initial player selections. It should be appreciated that in this embodiment and the other embodiments discussed herein, the numbers of player picks, the number of processor picks, the designated number, and any other numbers may vary.

Figure 5A:
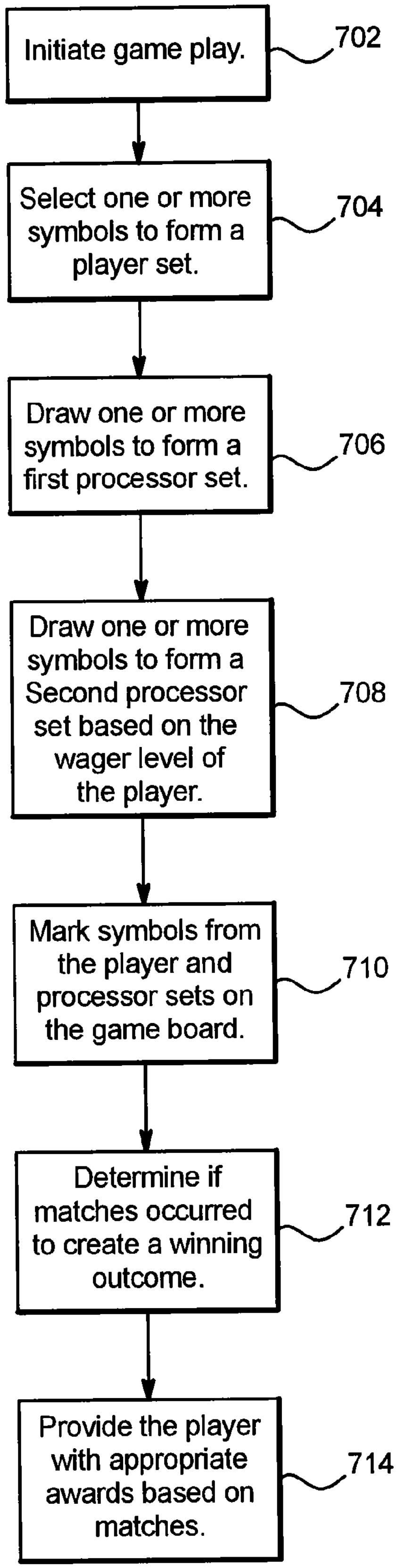
FIGS. 5A, 5B, 5C, 5D, and 5E are flow diagrams for other embodiments of the present disclosure that keep the player's odds of winning the designated award proportionate to the player's wager level and also provide a designated award regardless of number of player selections.

Referring now to the flow chart in FIG. 5A, an embodiment with a designated award such as a progressive award is illustrated. The processor initiates game play at a gaming terminal where the gaming device displays a plurality of symbols as indicated by block 702. The gaming device enables the player to select at least one symbol, up to a fixed quantity of symbols, of the plurality of displayed symbols to form a player set as indicated by block 704. In this embodiment, the size of the player set is predetermined and independent of the wager amount. Alternatively, the player, the gaming device processor, or a combination of both can select the symbols for the player set.

As indicated by block 706, the gaming device processor (or alternatively a separate processor) randomly selects or draws a predetermined number of symbols from the plurality of displayed symbols to form a first processor selected set. The gaming device processor also selects a second processor selected set from either the plurality of displayed symbols or the first processor selected set as illustrated by block 708. The second processor selected set includes zero, one or more symbols, wherein the quantity of symbols (i.e., the set size) in the second processor selected set is based on the player's wager level. That is, the quantity of symbols in the second processor selected set is proportionate to the player's wager level. The gaming device processor classifies, designates or otherwise categories each symbol in the second processor selected set as a designated symbol.

In one embodiment, when a symbol is drawn for the first processor selected set, the symbol is designated for the second processor selected set based on a probability equal or related to the current wager divided by the maximum wager. In another embodiment, if the wager is n credits, n of the symbols drawn for the first processor selected set are designated for the second processor selected set. In alternative embodiments, the second processor selected set is the first n, the last n, a designated subset of n, or a random subset of n of the symbols drawn. In another embodiment, if the wager is n credits, then a portion of the symbols might be randomly assigned for the second processor selected set. For example, if the wager is n and the game includes 80 symbols, then (4×n) are randomly assigned for the second processor selected set. In one alternative embodiment, the second player set may be formed at the start of the game play. Thus, the choice of symbols drawn for the second processor selected set are non-random, such as the first (4×n) symbols selected for the player set.

After the game sets are drawn, the processor marks the numbers from the game sets on a hit or match area as indicated by block 710. The processor compares the player set to the second processor selected set once all of the sets are created as indicated by block 712. As indicated by block 714, if a specific one of the symbols in the player set matches one of the designated symbols in the second processor selected set, the player is provided the designated award. That is, to provide the player the designated award, a specific one of the symbols in the player selected set (such as the player's first symbol picked or the player's last symbol picked) must match one of the designated symbols in the second processor selected set. In another embodiment, the player wins the designated award if a specific one of symbols in the player set matches one of the designated symbols in the second processor selected set and zero, one or more symbols in the player selected set match zero, one or more symbols in the first processor selected set. In another embodiment, if a specific one of symbols in the player set matches one of the designated symbols in the second processor selected set (and zero, one or more symbols in the player selected set match zero, one or more symbols in the first processor selected set), the player wins the designated award and a base award. It should be appreciated that although this described embodiment includes a specific one of the symbols in the player selected set matching one of the designated symbols in the second processor selected set, in an alternative embodiment, any elected symbols (i.e., a symbol separate from the symbols in the player selected set) must match one of the designated symbols in the second processor selected set for the player to win the designated award.

In accordance with the above embodiment, the player's wager level is associated with the odds of winning the designated award by enabling the size of the second processor selected set to vary according to a player's wager level. An increase in the player's wager level provides more second processor selected symbols and thus the player's odds of matching a specific one of the symbols in the player set increases.

In one embodiment, if the player did not win the designated award, the processor compares the player set to the first processor selected set to determine if any matches exist. The player wins a base award if the comparison between the player set and the first processor selected set produce a predetermined quantity of matches. In another embodiment, even if the player wins the designated award, the processor compares the symbols in the player set to the symbols in the first processor selected set to determine if any matches exist. In this embodiment, the player wins a base award if the comparison between the symbols in the player set and the symbols in the first processor selected set result in a predetermined quantity of matches. In these embodiments, the base award includes, but is not limited to, a typical Keno award that relates the quantity of player matches to the award amount as shown in video screen 18 of FIG. 3A.

Figure 5B:
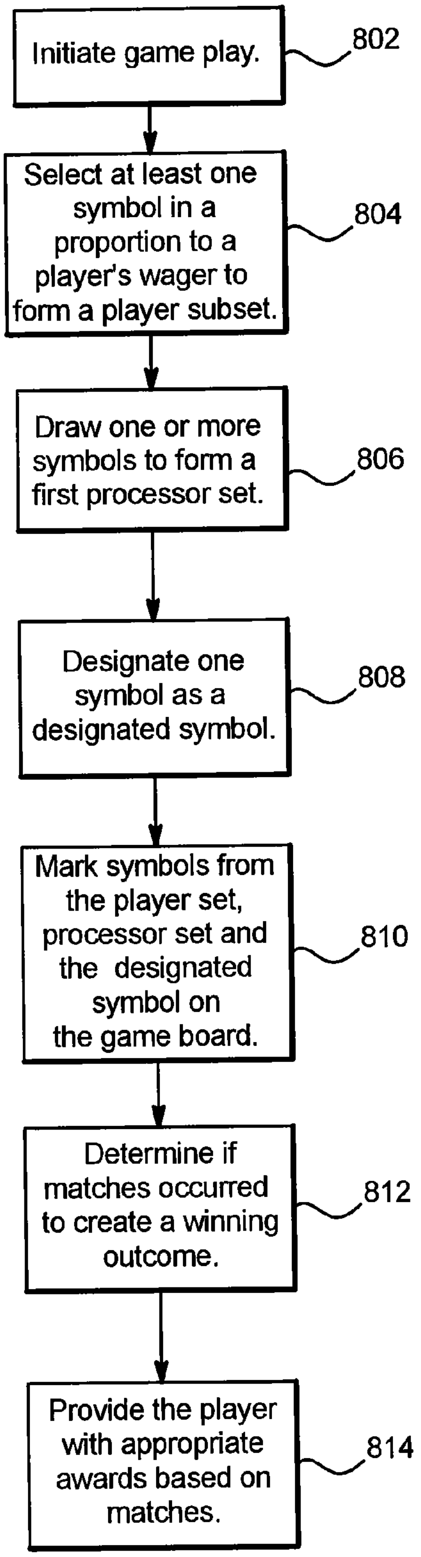

Referring now to the flow chart in FIG. 5B, another embodiment with a designated award such as a progressive award is illustrated. The processor initiates game play at a gaming terminal where the gaming device displays a plurality of symbols as indicated by block 802. The gaming device enables a player to pick a plurality of the displayed symbols to form a first player selected set (not shown). In this embodiment, as indicated by block 804, the gaming device forms a second player set or a player selected subset which includes a variable number of the plurality of symbols of the player selected set (i.e., the displayed symbols the player picked). In this embodiment, the gaming device determines the subset size or the number of symbols in the player selected subset based on the player's wager level. That is, the number of symbols in the second player set or player selected subset is proportionate to the player's wager level. In one embodiment, for each credit the player wagers, the gaming device enables the player to select one symbol to include in the player subset. Alternatively, either the player, the gaming device processor, or a combination of both can select the symbols for the player subset. It should be appreciated that the formed player subset may include all or a portion of the symbols in the player selected set.

It should be further appreciated that the player subset can also be calculated using various different algorithms. In one embodiment, all of the numbers in the player subset must be from player selections. Other alternative embodiments employ a completely random selection of the plurality of symbols before or after the start of the game play. In another embodiment, the processor creates the player subset from a randomly selected cluster, group or pattern of symbols. Alternatively, the player subset is derived from a suitable sequence or game play such as an interactive selection game where the cluster or pattern avoids the player's symbol selections (i.e., intentionally does not match the player's symbol selections). Another embodiment might designate the player subset from a predetermined set of symbols. It should thus be appreciated that the player set selection may be determined in any suitable manner.

The gaming device processor (or alternatively a separate processor) randomly selects or draws a predetermined number of symbols from the plurality of displayed symbols to form a first processor selected set as illustrated by block 806. Before, during, or after the first processor selected set is formed and independent of the player's wager, as indicated in block 808, the gaming device processor classifies, designates or otherwise categories one symbol as a designated symbol. The designated symbol is typically drawn from the first processor selected set (such as the first drawn number in the first processor selected set or the last drawn number in the first processor selected set).

After the game sets are drawn, the processor marks the numbers from the game sets on a hit or match area as indicated by block 810. The processor determines if the player wins any awards by comparing the player subset to the designated symbol once all of the sets are created as indicated by block 812. According to block 814, the player wins the designated award if the designated symbol matches one of the symbols in the player subset (and zero, one or more symbols in the player selected set match zero, one or more symbols in the first processor selected set). That is, to provide the player the designated award, a specific one of the symbols in the player selected subset (such as the player's first symbol picked or the player's last symbol picked) must match the designated symbol. Alternatively, if the designated symbol matches one of the symbols in the player subset (and zero, one or more symbols in the player selected set match zero, one or more symbols in the first processor selected set), the player wins the designated award and a base award.

In one embodiment, if the player did not win the designated award, the processor compares the player set to the first processor selected set to determine if any matches exist. The player wins a base award if the comparison between the player set and the first processor selected set produce a predetermined quantity of matches. In another embodiment, even if the player wins the designated award, the processor compares the symbols in the player set to the symbols in the first processor selected set to determine if any matches exist. In this embodiment, the player wins a base award if the comparison between the symbols in the player set and the symbols in the first processor selected set result in a predetermined quantity of matches. In these embodiments, the base award includes, but is not limited to, a typical Keno award that relates the quantity of player matches to the award amount as shown in video screen 18 of FIG. 3A.

Figure 5C:
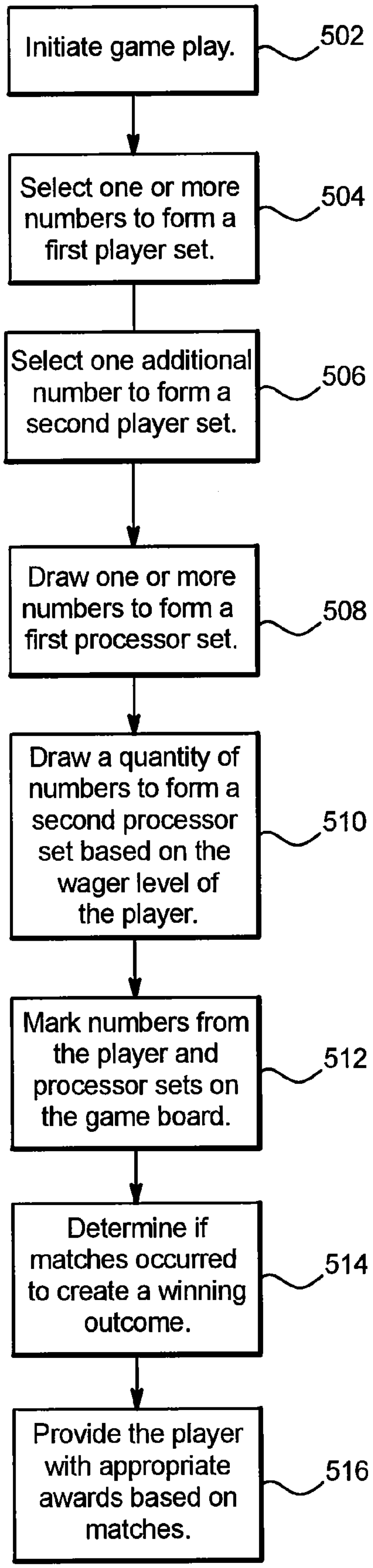

Referring now to the flow chart in FIG. 5C, another embodiment with a designated award such as a progressive award is illustrated. The processor initiates game play at a gaming terminal where the gaming device displays eighty numbers as indicated by block 502. The gaming device enables the player to pick a plurality of the displayed eighty numbers to form a first player set as indicated by block 504.

As indicated by block 506, the processor or the player selects one additional number from the eighty displayed numbers (i.e., any of the eighty displayed numbers or the remaining unselected eighty numbers) or from the first player set to form a second player set.

The processor also randomly generates or draws twenty selections from the same eighty displayed numbers to form a first processor selected set as illustrated by block 508. After the first processor selected set is formed, the processor also draws a quantity of numbers from the first processor selected set to form a second processor selected set based on the player's wager level, as indicated by block 510. The second processor selected set number or numbers are alternatively determined using algorithms including: fixed odds for each draw, a fixed portion of the draw, or a fixed portion of the selectable numbers.

For fixed odds of each draw, when a number is drawn for the first processor selected set, in one embodiment the number is designated for the second processor selected set based on a probability equal or related to the current wager divided by the maximum wager.

For a fixed portion of the draw, in one embodiment if the wager is n credits, n of the numbers drawn for the first processor selected set are designated for the second processor selected set. The second processor selected set in alternative embodiments can be the first n, the last n, a designated subset of n, or a random subset of n of the numbers drawn.

For a fixed portion of the field, in one embodiment if the wager is n credits, (4×n) of the field of typically eighty numbers might be randomly assigned for the second processor selected set. In one alternative embodiment, the second player set may be formed at the start of the game play. Thus, the choice of numbers drawn for the second processor selected set are non-random, such as the first (4×n) numbers selected for the total player set.

After the game sets are drawn, the processor marks the numbers from both game sets on a hit or match area as indicated by block 512. The processor determines if the player wins any awards by comparing the first processor selected set with the first player set and comparing the second processor selected set with the second player set as indicated by block 514. According to block 516, the player wins the progressive award if the processor determines that a predetermined quantity of matching numbers is created between the sets. Alternatively, if the predetermined quantity of matching numbers is created, the player wins the progressive award and a base award.

If the player did not win the progressive award, the processor compares the first player set to the first processor selected set to determine if any matches exist. The player wins the base award if the comparison between the first player set and the first processor selected set produce a predetermined quantity of matches. In one embodiment, the base award includes, but is not limited to, a typical Keno award that relates the quantity of player matches to the award amount as shown in video screen 18 of FIG. 3A.

Figure 5D:
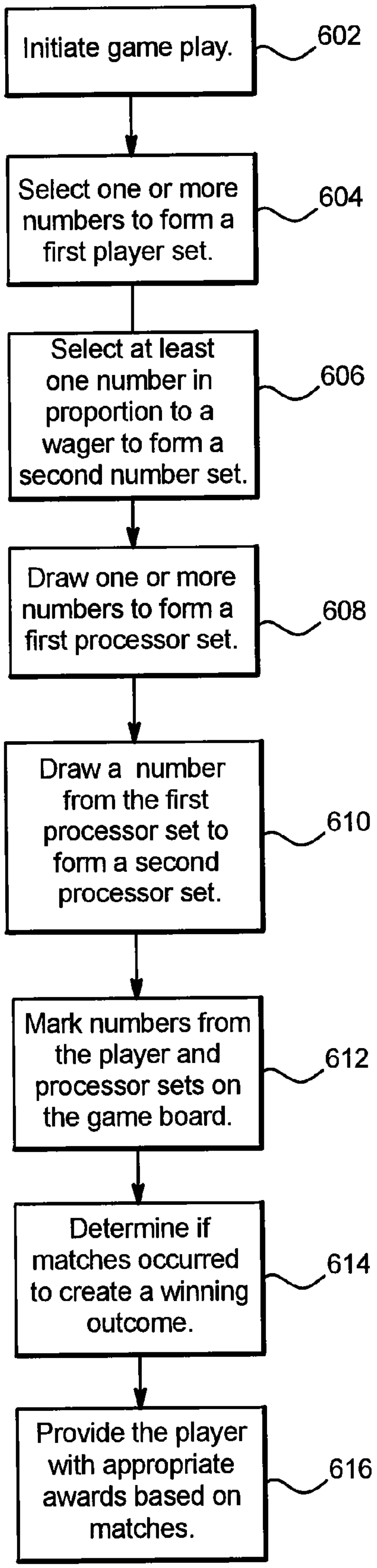

Referring now to the flow chart in FIG. 5D, another embodiment with a designated award such as a progressive award is illustrated. The processor initiates game play at a gaming terminal where the gaming device displays eighty numbers as indicated by block 602. The gaming device enables the player to pick a plurality of the displayed eighty numbers to form a first player set as indicated by block 604.

As indicated by block 606, the processor or the player selects additional numbers from the eighty displayed numbers (i.e., any of the eighty displayed numbers or the remaining unselected eighty numbers) or from the first player set to form a second player set. One contemplated method for creating the second player set is to designate the first x numbers in the initial player set as the second player set, where x is a predetermined value in proportion to the player's wager. Thus, if the player's wager level increases, the quantity of numbers in the second player set also increases.

It should be appreciated that the second player set can also be calculated using various different algorithms. In addition to the first x numbers as described above, the last x numbers in the first player set can be designated as the second player set. In one embodiment, the processor selects one number for the second player set for each credit wagered. In another embodiment, all of the numbers in the second player set must be from player selections. Other alternative embodiments employ a completely random selection of the eighty numbers before or after the start of the game play. In another embodiment, the processor creates the second player set from a randomly selected cluster, group or pattern of numbers. Alternatively, the second player set is derived from a suitable sequence or game play such as an interactive selection game where the cluster or pattern avoids the player's number selections (i.e., intentionally does not match the player's number selections). Another embodiment might designate the second player set from a predetermined set of numbers. It should thus be appreciated that the supplemental selection may be determined in any suitable manner.

The processor also randomly generates or draws twenty selections from the same eighty displayed numbers to form a first processor selected set as illustrated by block 608. After the first processor selected set is formed, the processor also randomly draws one number from the first processor selected set to form a second processor selected set, as indicated by block 610. The quantity of numbers in the second processor selected set is predetermined. In one embodiment, the processor draws the last selected number of the first processor selected set to form the second processor selected set.

After the game sets are drawn, the processor marks the numbers from both game sets on a hit or match area as indicated by block 612. The processor determines if the player wins any awards by comparing the first processor selected set with the first player set and comparing the second processor selected set with the second player set as indicated by block 614. According to block 616, the player wins the progressive award if the processor determines that a predetermined quantity of matching numbers is created between the sets. In one such embodiment, the player wins the progressive award if the processor determines that the one designated number in the second processor selected set matches one of the numbers in the player set. Alternatively, if the predetermined quantity of matching numbers is created, the player wins the progressive award and a base award.

If the player did not win the progressive award, the processor compares the first player set to the first processor selected set to determine if any matches exist. The player wins a base award if the comparison between the first player set and the first processor selected set produce a predetermined quantity of matches. In one embodiment, the base award includes, but is not limited to, a typical Keno award that relates the quantity of player matches to the award amount as shown in video screen 18 of FIG. 3A.

Figure 5E:
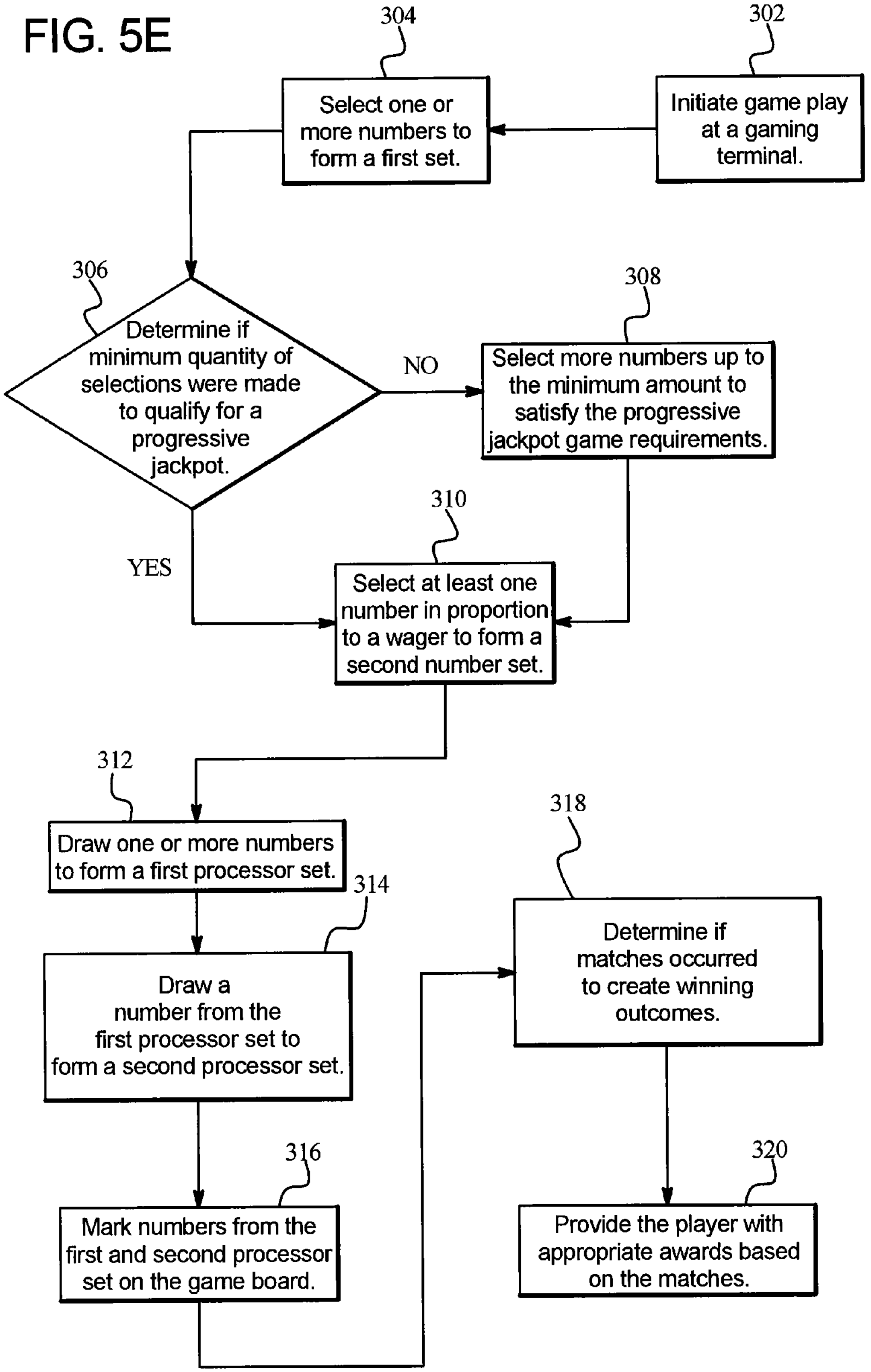

Referring now to the flow chart in FIG. 5E, another embodiment with a designated award such as a progressive award is illustrated. The processor initiates game play at a gaming terminal where the gaming device displays eighty numbers as indicated by block 302. The gaming device enables the player to pick a plurality of the displayed eighty numbers to form an initial player set as indicated by block 304. The processor determines if the player selected a predetermined minimum quantity of ten numbers as indicated by decision diamond 306. If the player did not select the ten numbers, the processor selects one or more supplemental numbers from the eighty displayed numbers as indicated by block 308. The processor selected supplemental numbers form a supplemental player set. The initial player set and the supplemental player set form a total player set. The quantity of numbers in the total player set must reach the predetermined minimum quantity of numbers to be eligible for the progressive award.

As indicated by block 310, at some time before or after the total player set is formed, the processor or the player selects additional numbers from the eighty displayed numbers (i.e., any of the eighty displayed numbers or the remaining unselected eighty numbers) or from the total player set to form a second player set. One contemplated method for creating the second player set is to designate the first x numbers in the initial player set as the second player set, where x is a predetermined value. In one embodiment, the level of the player's wager determines the quantity of numbers in the second player set. From game to game, if the player's wager level increases, the quantity of numbers in the second player set also increases. In one embodiment, the processor selects one number for the second player set for each credit wagered.

The processor also randomly generates or draws twenty selections from the same eighty displayed numbers to form a first processor selected set as illustrated by block 312. After the first processor selected set is formed, the processor also randomly draws a number from the first processor selected set to form a second processor selected set, as indicated by block 314. The quantity of numbers in the second processor selected set is predetermined. In one embodiment, the processor draws the last selected number of the first processor selected set to form the second processor selected set.

After both game sets are drawn, the processor marks the numbers from both game sets on a hit or match area as indicated by block 316. The processor determines if the player wins any awards by comparing the first processor selected set with the total player set and comparing the second processor selected set with the second player set as indicated by block 318. According to block 320, the player wins the progressive award if the processor determines that a predetermined number of matching symbols is created. If the player did not win the progressive award, the processor compares the initial player set to the first processor selected set to determine if any matches exist. The player wins a base award if the comparison between the initial player set and the processor selected set produce a predetermined number of matches. The matches needed to win the base award cannot come from the supplemental player set in one embodiment. In one embodiment, the base award includes, but is not limited to, a typical Keno award that relates the quantity of player matches to the award amount as shown in video screen 18 of FIG. 3A.

As indicated in FIG. 5E, the player does not need to personally make all of the required selections to be eligible for the progressive award. The processor provides random supplemental selections to fill in the short fall. However, if the processor provides one or more supplemental numbers for the supplemental player set, the supplemental numbers are not used to determine the standard Keno award. A combination of the numbers from the initial player set and supplemental player set can be used to win the progressive award. Thus, the game enables a player to win a progressive award regardless of the quantity of player selections.

It should be appreciated that the second player set can also be calculated using various different algorithms. In addition to the first x numbers as described above, the last x numbers in the first player set can be designated as the second player set. In another embodiment, all of the numbers in the second player set must be from player selections. Other alternative embodiments employ a completely random selection of the eighty numbers before or after the start of the game play. In another embodiment, the processor creates the second player set from a randomly selected cluster, group or pattern of numbers. Alternatively, the second player set is derived from a suitable sequence or game play such as an interactive selection game where the cluster or pattern avoids the player's number selections (i.e., intentionally does not match the player's number selections). Another embodiment might designate the second player set from a predetermined set of numbers. It should thus be appreciated that the supplemental selection may be determined in any suitable manner.

In one embodiment, the number in the second processor selected set is created from the first processor selected set as indicated in block 314. The size of the second processor selected set is fixed if the second player set is variable. However, if the second player set has a fixed size, the second processor selected set size is variable. If the second processor selected set size is variable, the second processor selected set number(s) are alternatively determined using algorithms including: fixed odds for each draw, a fixed portion of the draw, or a fixed portion of the selectable numbers.

For fixed odds of each draw, when a number is drawn for the first processor selected set, in one embodiment the number is designated for the second processor selected set based on a probability equal or related to the current wager divided by the maximum wager.

For a fixed portion of the draw, in one embodiment if the wager is n credits, n of the numbers drawn for the first processor selected set are designated for the second processor selected set. The second processor selected set in alternative embodiments can be the first n, the last n, a designated subset of n, or a random subset of n of the numbers drawn.

For a fixed portion of the field, in one embodiment if the wager is n credits, (4×n) of the field of typically eighty numbers might be randomly assigned for the second processor selected set. In one alternative embodiment, the second player set may be formed at the start of the game play. Thus, the choice of numbers drawn for the second processor selected set are non-random, such as the first (4×n) numbers selected for the total player set.

Multiple designated awards such as relatively large or progressive awards can also be implemented using the above mentioned embodiments. In one embodiment, multiple designated awards such as different progressive awards or top awards could be provided based upon a specifically selected number set or drawn processor selected set. In another embodiment, the different designated awards are each associated with a specifically drawn number. Another embodiment associates the different relatively large awards with different matching combinations in the first player set, such as matching five of six selections versus six out of six selections.

Figure 6A:
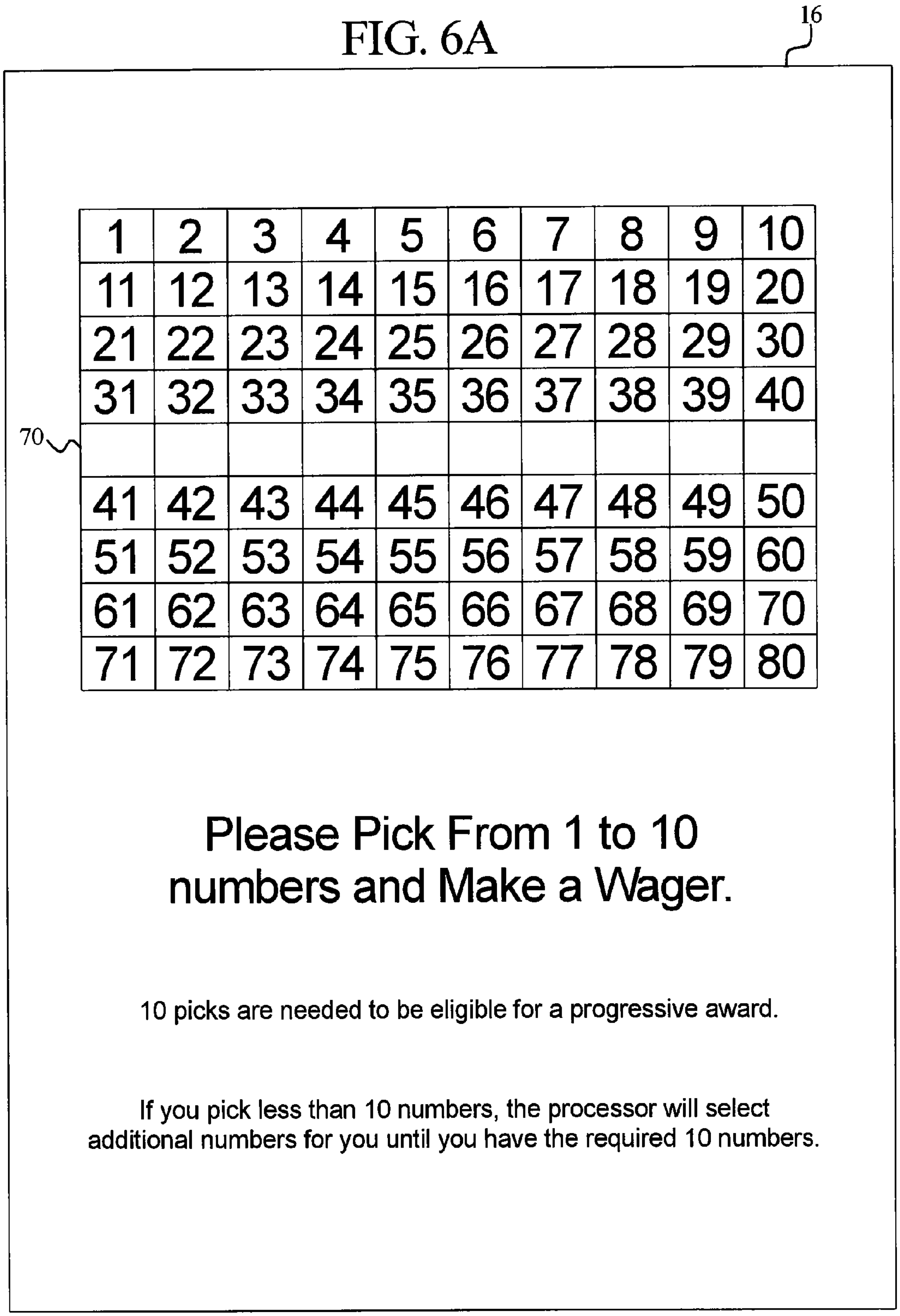
FIGS. 6A, 6B, 6C and 6D illustrate various screens of a display device for one embodiment of the present disclosure having a designated award with a variable amount of player selections described in connection with FIG. 4A. In this embodiment, the player has selected less than a required minimum number of selections.

FIGS. 6A to 6D illustrate an enlarged view of screen 16 with one embodiment for the matching type game disclosed herein. In this illustrated embodiment, the gaming device supplements the player's selection of symbols with a plurality of supplemental symbols so that the player is eligible to win a designated award regardless of the number of symbols selected by the player. In this example, the gaming device displays the eighty symbols 70 as illustrated in FIG. 6A. The gaming device enables the player to select up to ten of the displayed symbols to form an initial player set.

Figure 6B:
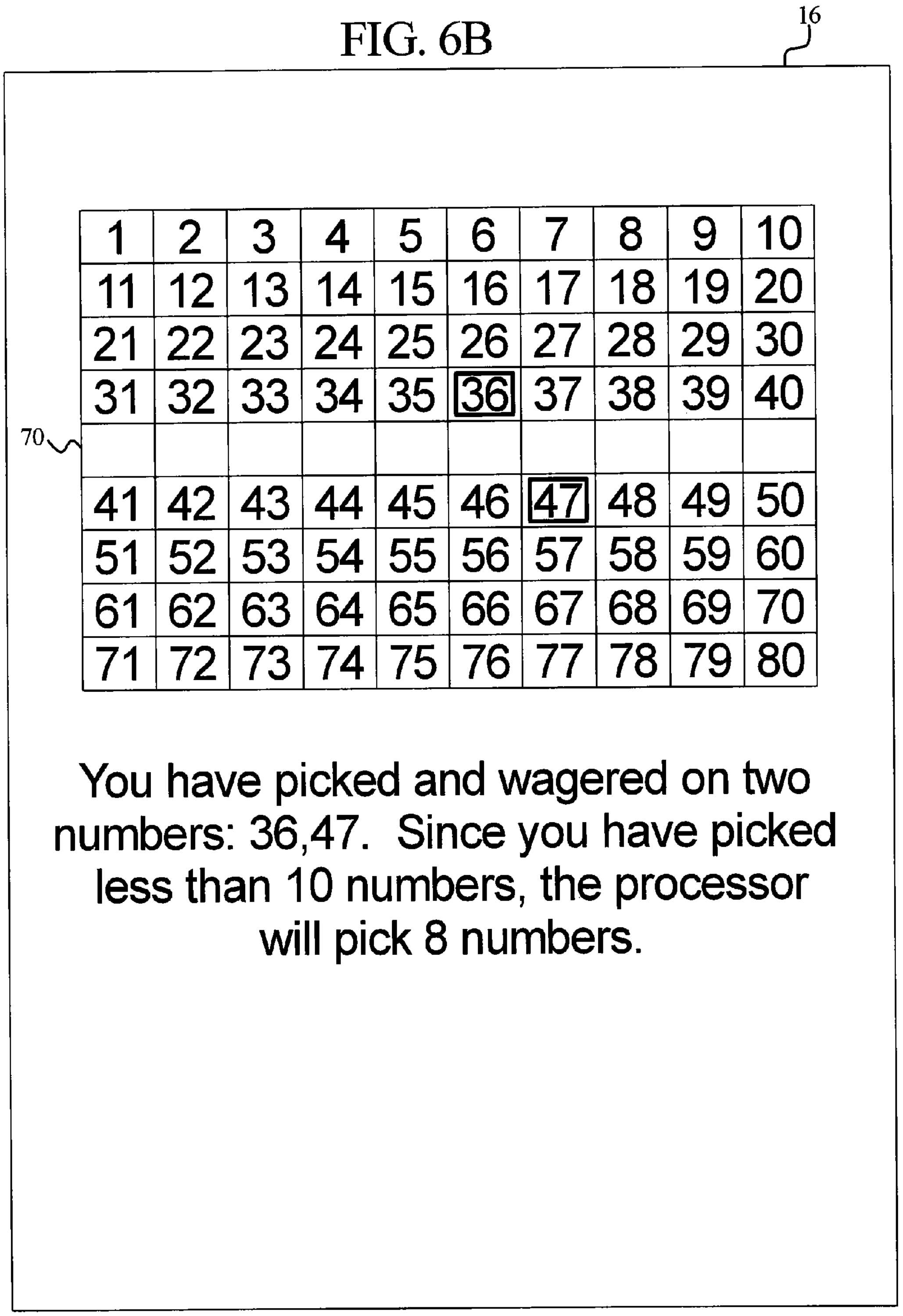
Figure 6C:
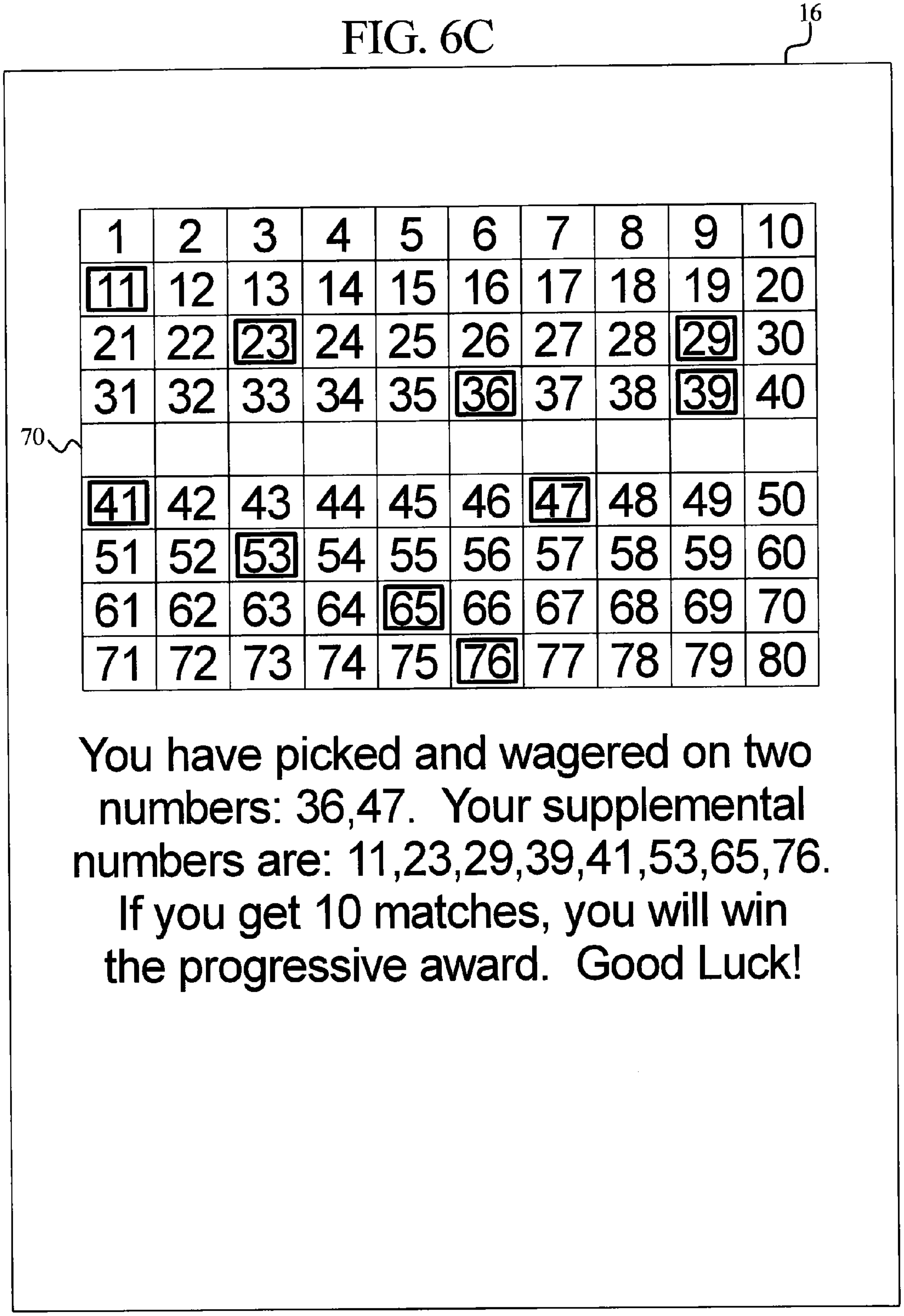

After the player picks the initial player set as illustrated in FIG. 6B, the gaming device determines if the player selected ten numbers. Since in this example the player did not select the minimum ten numbers, the processor selects eight supplemental numbers from the plurality of displayed numbers for the player as illustrated in FIG. 6C. The processor selected supplemental numbers form a supplemental player set as illustrated in FIG. 6C. The initial player set and the supplemental player set form a total player set of ten numbers. For the player to win the progressive award in this example, the player must obtain ten matches. The supplemental numbers can be indicated in the same or in one or more different manners than the numbers in the initial player set.

Figure 6D:

The processor randomly generates or draws twenty numbers to form the processor selected set as illustrated in FIG. 6D. The processor compares the total player set to the processor selected set after both sets are formed. As illustrated in FIG. 6D, the player wins the progressive award because the numbers in the total player set match the numbers in the processor selected set. The player wins the progressive award of $11,256 in this example.

If the player had not won the progressive award, the processor would have compared the initial player set to the processor selected set to determine if any matches exist. The player would have won a base award if this comparison produced a predetermined number of matches. In one embodiment, the base award may be variable because it is based on the number of matches created between the initial player set and the processor selected set. Generally, the greater the number of matches, the greater the payout will be. For example, if three matches are created, the gaming device can pay the player back at a multiple of the player's wager such as 2× the player's wager. Likewise, if four matches are created, the payout may be increased to 4× the player's wager.

Figure 7B:
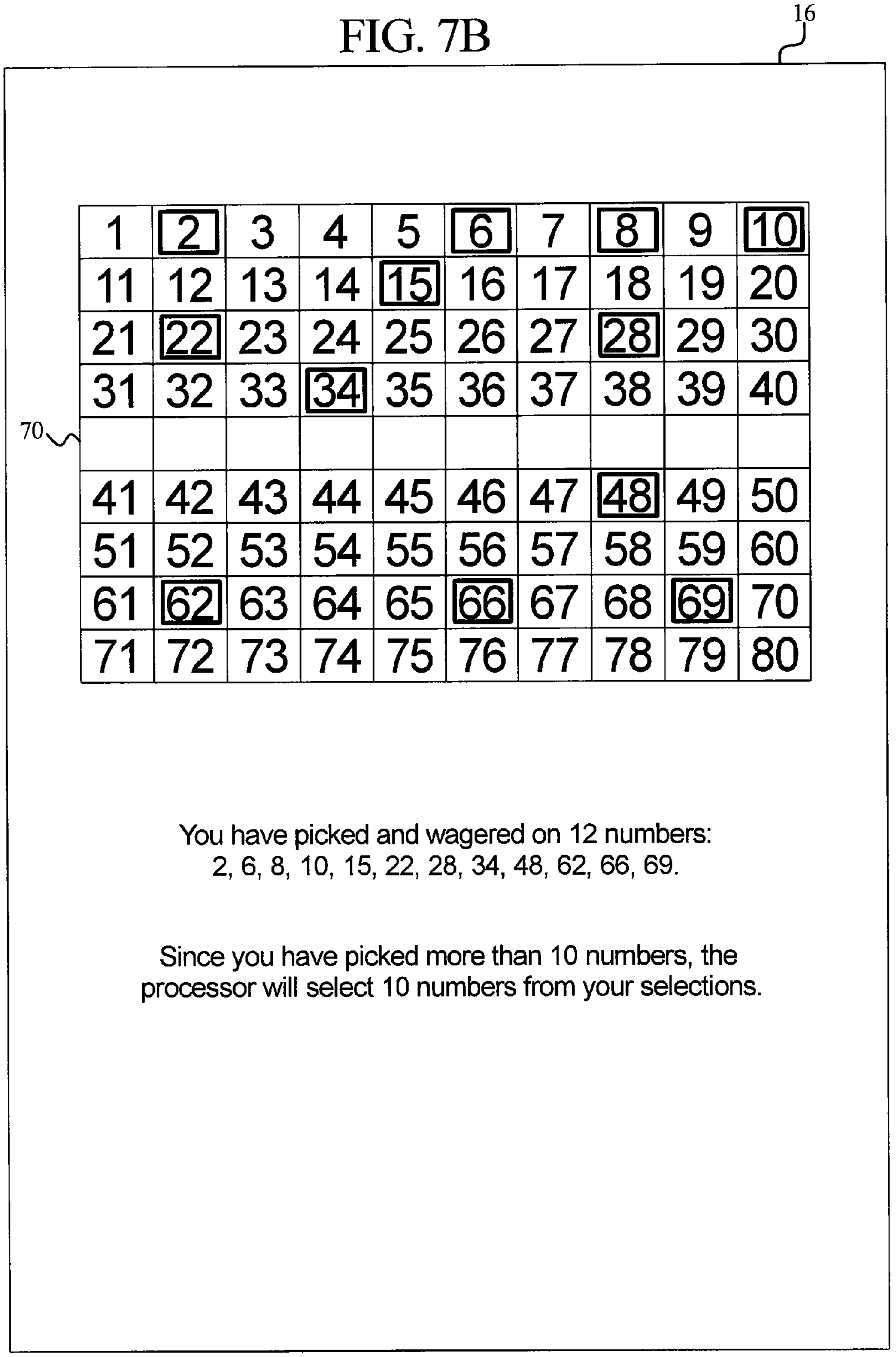

FIGS. 7A to 7D illustrate an enlarged view of screen 16 with one embodiment for the matching type game disclosed herein. In this illustrated embodiment, the gaming device supplements the player's selection of symbols with a plurality of supplemental symbols so that the player is eligible to win a designated award regardless of the number of symbols selected by the player. If the player has selected more than a predetermined minimum number of symbols, the gaming device or player will select a subset of symbols that will be used to determine the player's eligibility to win the designated award. In this example, the gaming device displays the eighty symbols 70 as illustrated in FIG. 7A. The gaming device enables the player to select up to twenty of the displayed symbols to form an initial player set.

Figure 7C:
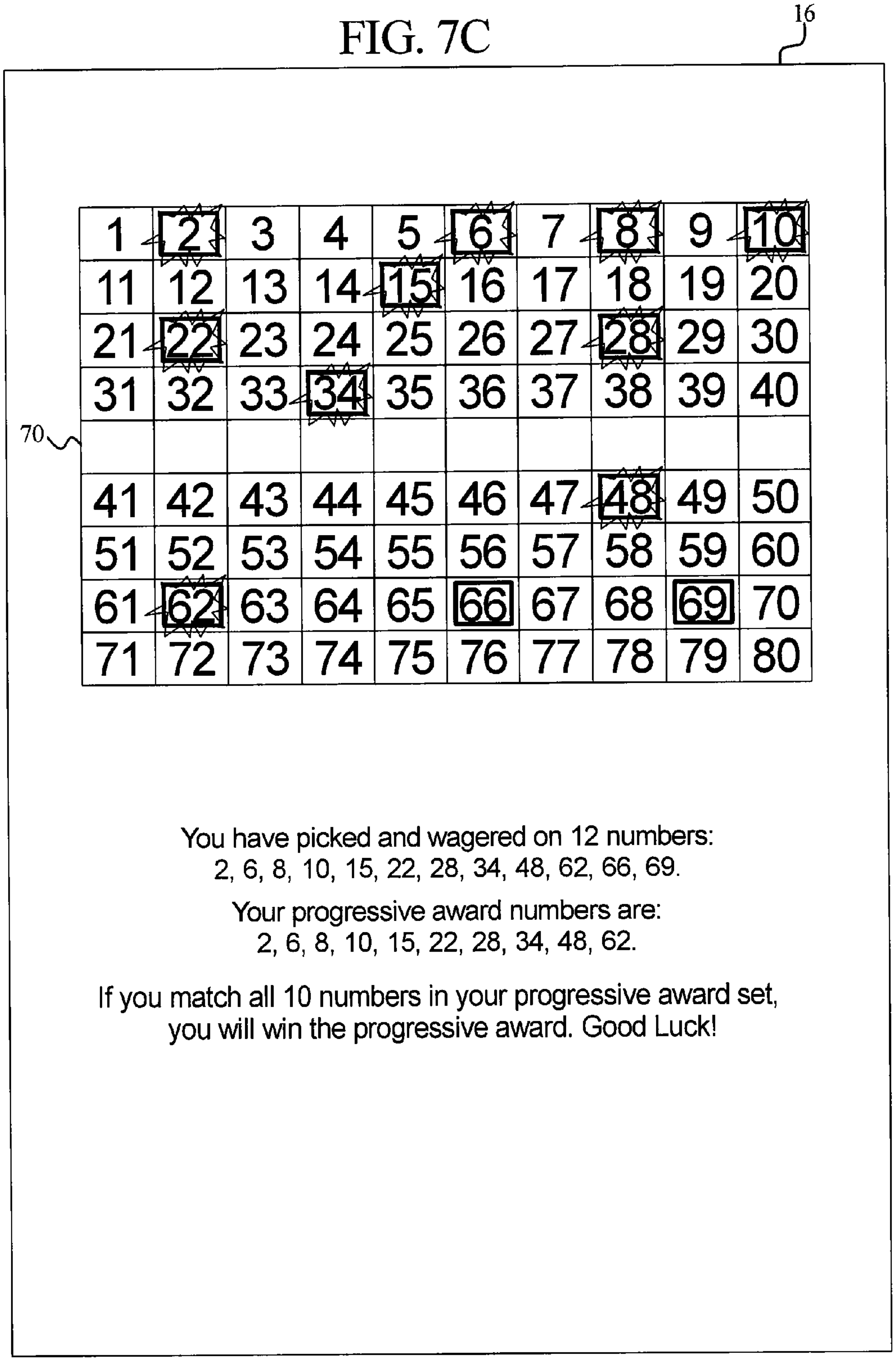

After the player picks the initial player set as illustrated in FIG. 7B, the gaming device determines if the player selected at least ten numbers. The player selected twelve numbers. Since in this example the player selected more than the minimum ten numbers, the processor selects a subset of ten numbers from the plurality of displayed numbers for the player as illustrated in FIG. 7C. The processor selected subset of numbers form a progressive player set as illustrated in FIG. 7C. For the player to win the progressive award in this example, the player must obtain ten matches with the progressive player set. The progressive player numbers can be indicated in the same or in one or more different manners than the numbers in the initial player set.

Figure 7D:
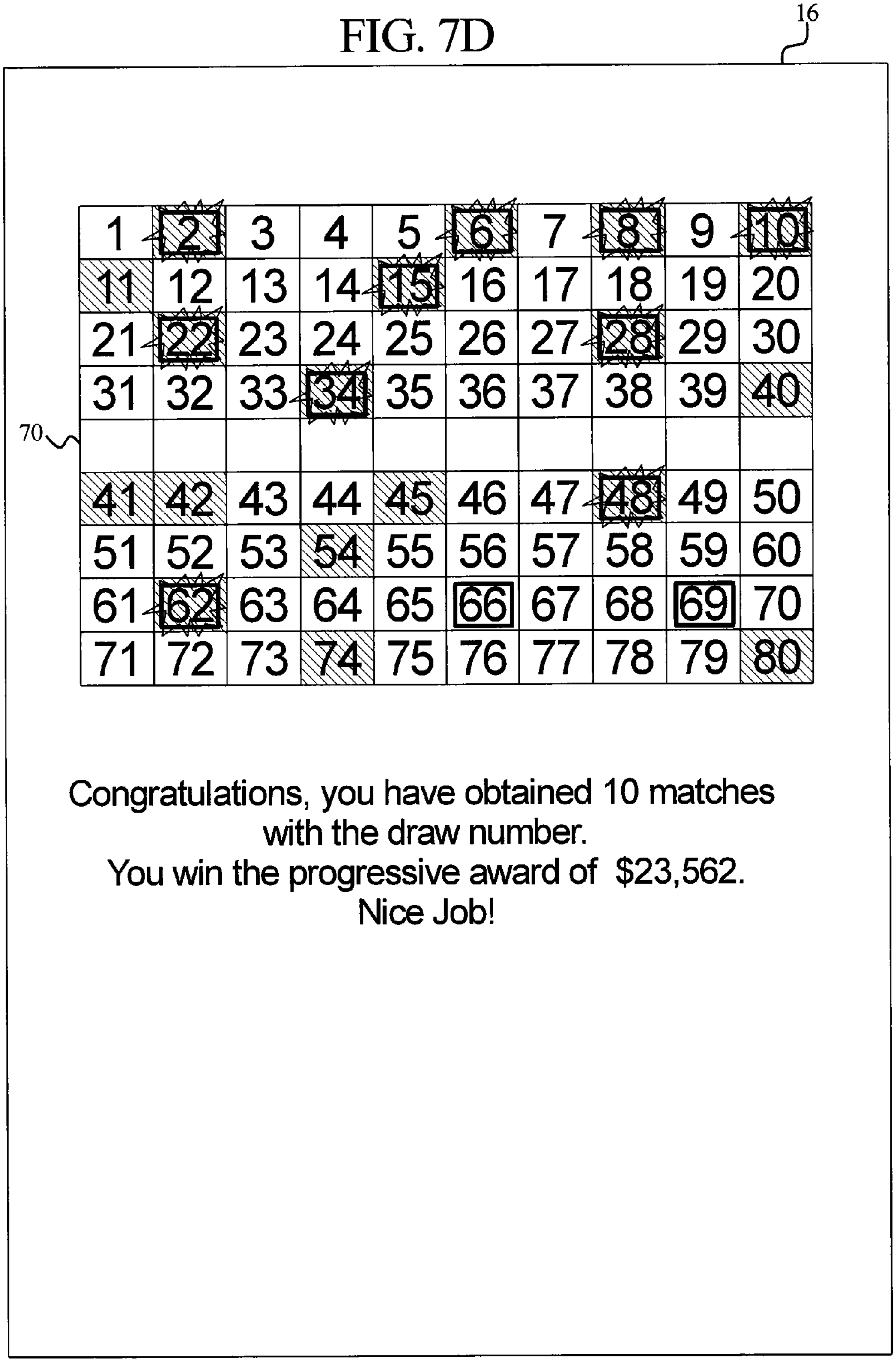

The processor randomly generates or draws twenty numbers to form the processor selected set as illustrated in FIG. 7D. The processor compares the progressive player set to the processor selected set after both sets are formed. As illustrated in FIG. 7D, the player wins the progressive award because the numbers in the progressive player set match the numbers in the processor selected set. The player wins the progressive award of $23,562 in this example. Alternatively, the player wins both the progressive award and a base award.

If the player had not won the progressive award, the processor would have compared the initial player set to the processor selected set to determine if any matches exist. The player would have won a base award if this comparison produced a predetermined number of matches. In one embodiment, the base award may be variable because it is based on the number of matches created between the initial player set and the processor selected set. In one embodiment, the base award includes, but is not limited to, a typical Keno award that relates the quantity of player matches to the award amount as shown in video screen 18 of FIG. 3A. It should be appreciated that the embodiments of FIGS. 6A to 6D and 7A to 7D can be employed together. It should also be appreciated that where appropriate, various different embodiments disclosed herein can be employed together.

Figure 8A:
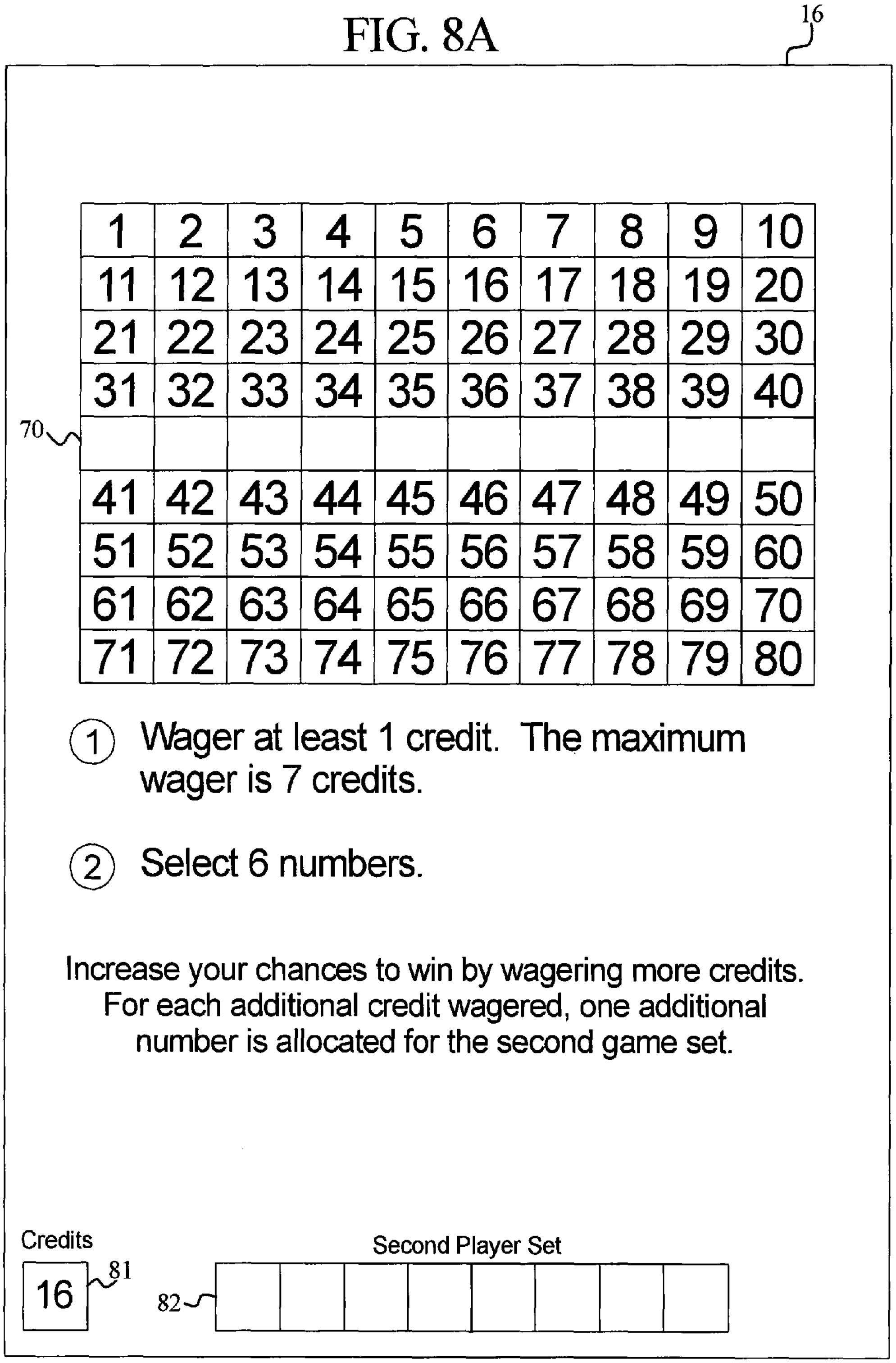
FIGS. 8A, 8B, and 8C illustrate various screens of a display device for one embodiment of the present disclosure having a designated award with a variable wager level described in connection with FIG. 5A.
Figure 8B:
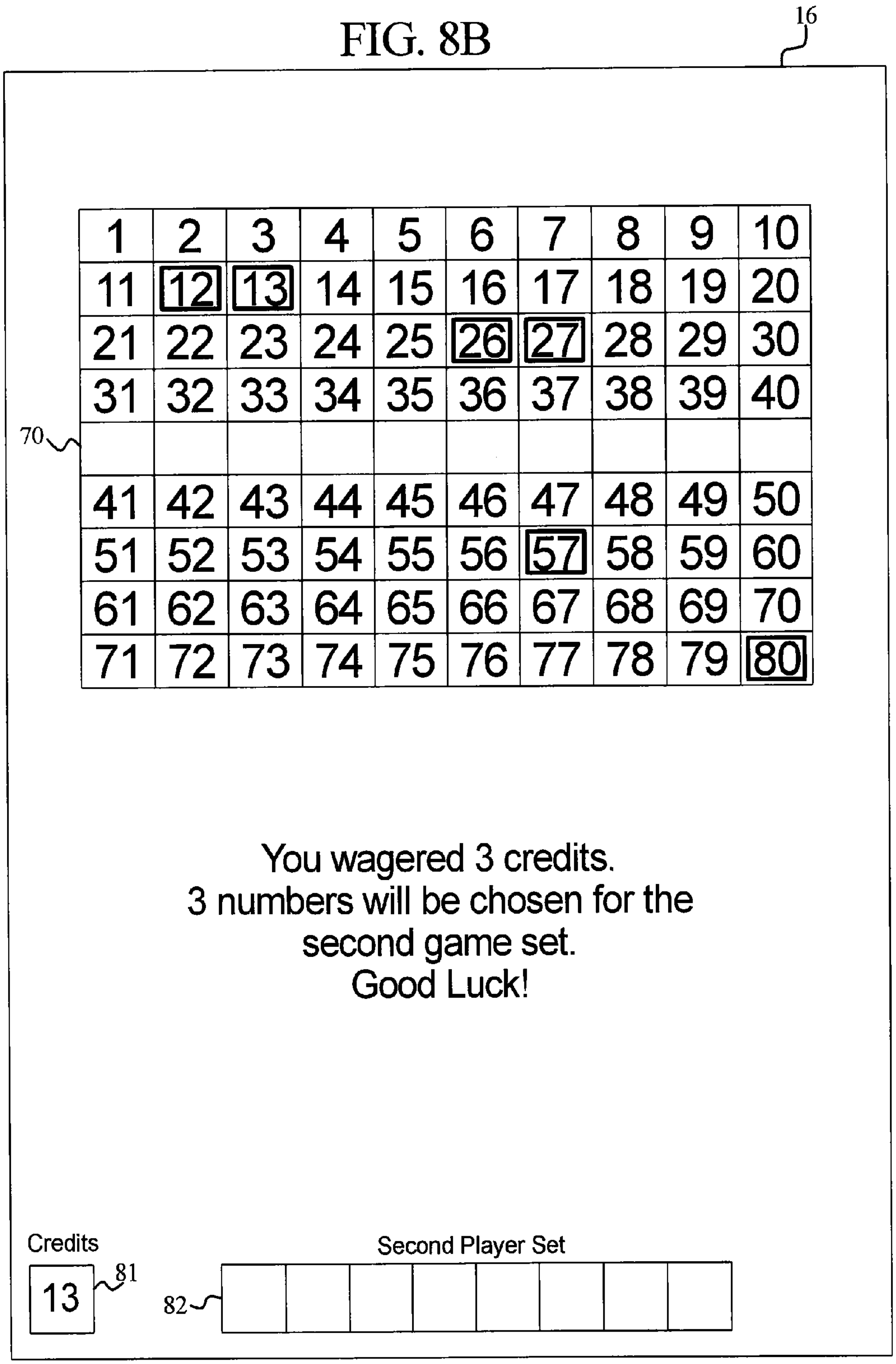
Figure 8C:
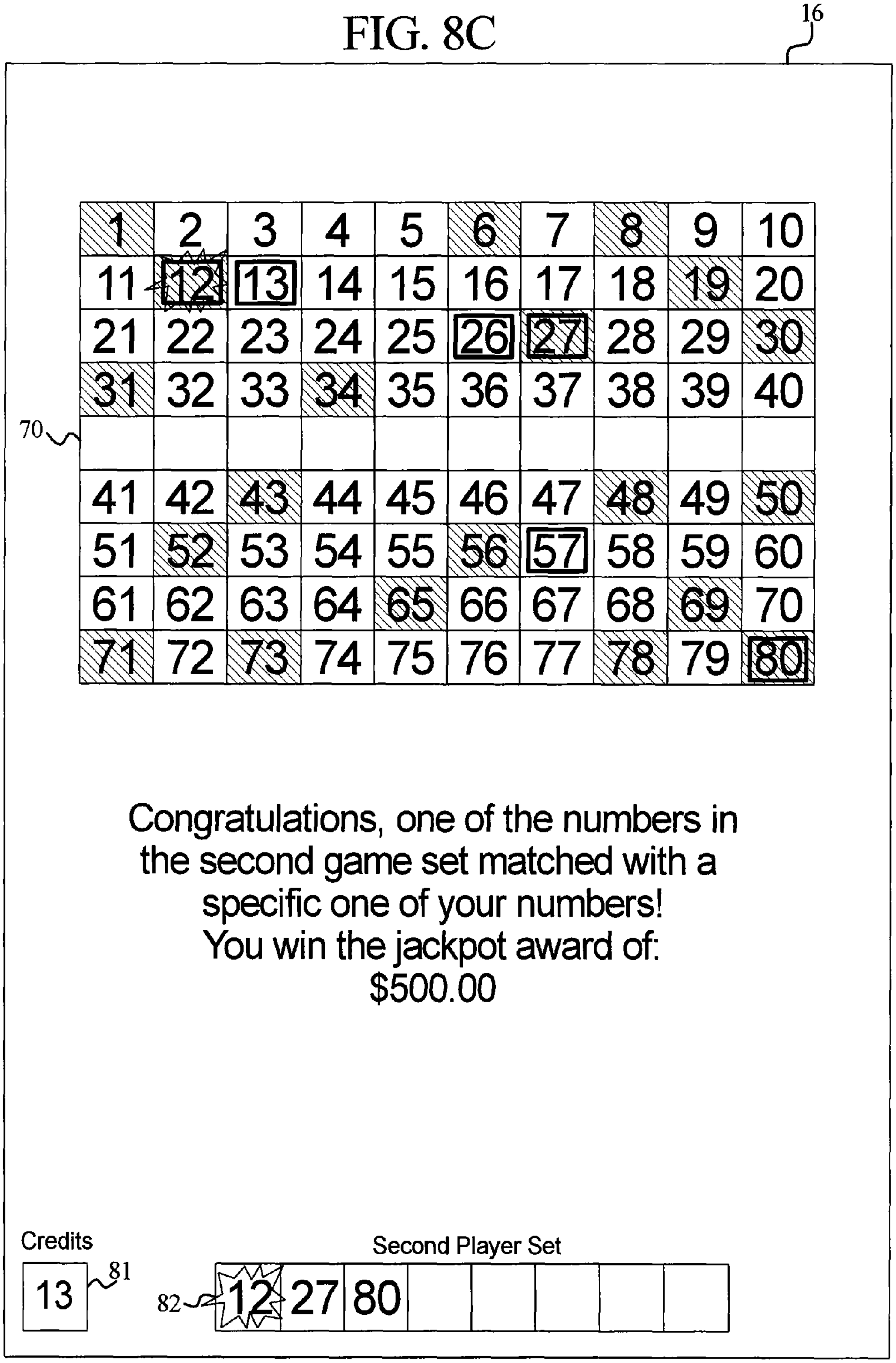

FIGS. 8A to 8C illustrate an enlarged view of screen 16 with another embodiment for the matching type game disclosed herein. This matching game provides a jackpot award and/or a base award for creating a predetermined number of matches between a player set and processor selected sets. A player and/or processor selects from eighty numbers to form a player set. The processor draws twenty numbers from the same eighty numbers to form the processor selected set. The player's set is compared to the processor selected sets. The player wins at least one award if a predetermined quantity of specific matches are created between the player set and the processor selected sets. It should be appreciated that while the game described below is readily implemented in connection with a Keno, Lotto, Bingo, or other matching-type game, the game is compatible with any suitable secondary or base game that employs a variable number of player selections and a variable wager level.

More specifically, FIG. 8A illustrates a fresh screen on video monitor 16 including player instructions and game progress indicators. FIG. 8B illustrates the same screen 16 with player selections and modified progress indicators. FIG. 8C illustrates the same screen 16 with a completed Keno game and an award message.

In this example beginning in FIG. 8A, the screen 16 instructs the player to wager at least one credit and that the maximum wager is seven credits. Screen 16 also instructs the player to select six numbers from the Keno game board 70. All of the player selections form the player set. The numbers in the initial player set are displayed as bolded and bordered numbers on the Keno game board 70 as indicated in FIG. 8B. Screen 16 also displays current game progress indicators such as credit meter 81 and a second game set indicator 82. Credit meter 81 displays the player's available credits for wagering. The player set size is predetermined and does not vary in relation to the player's wager level. In this embodiment the player set size is six numbers. Alternatively, the player set could be any size as long as the size is fixed at the start of the game.

FIG. 8B illustrates the screen 16, wherein the player has made selections for the player set. The player set is shown as bolded and bordered numbers on the Keno board 70. The player selected six numbers. The player wagered three credits for his game selections, thus credit meter 81 has been decremented by three credits.

FIG. 8C illustrates the screen 16 with the completed Keno game. The processor randomly generated or drew twenty numbers to form a processor selected set. The drawn numbers are depicted with shading. The processor also designated a random subset of the numbers in the processor selected set as the second game set. The values in the second game set are depicted in the second game set indicator 82. The quantity of n numbers in the second game set is variable, based on the amount of credits the player wagered. In the illustrated embodiment, the player wagered three credits, so n equals three. If the player had wagered more credits, the quantity of second game set numbers would have equaled the player's wager. Alternatively, the values and/or quantity of numbers in the second game set could be drawn based on other suitable algorithms such as those described in connection with FIG. 5A.

In one embodiment, the processor determines if the player wins the jackpot award by comparing the second processor selected set with a specific number in the player set. The player wins the jackpot award if processor determines that one of the numbers in the second processor selected set matches with a specific number in the player set. In this illustrated embodiment, a specific one of the player's numbers (in this case the player's first picked number of 12) matched one of the numbers in the second processor selected set and thus the player won the jackpot award and a base award. The gaming machine displays the number in the second game set and the specific player number that matches with additional indicators or markings as depicted in FIG. 8C.

If the player had not won the jackpot award, the processor would have compared the player set to the processor selected set to determine if any matches exist. The player would have won a base award if the comparison between the player set and the processor selected set produced a predetermined number of matches. In one embodiment, the base award includes, but is not limited to, a typical Keno award that relates the quantity of player matches to the award amount as shown in video screen 18 of FIG. 3A.

Figure 9A:
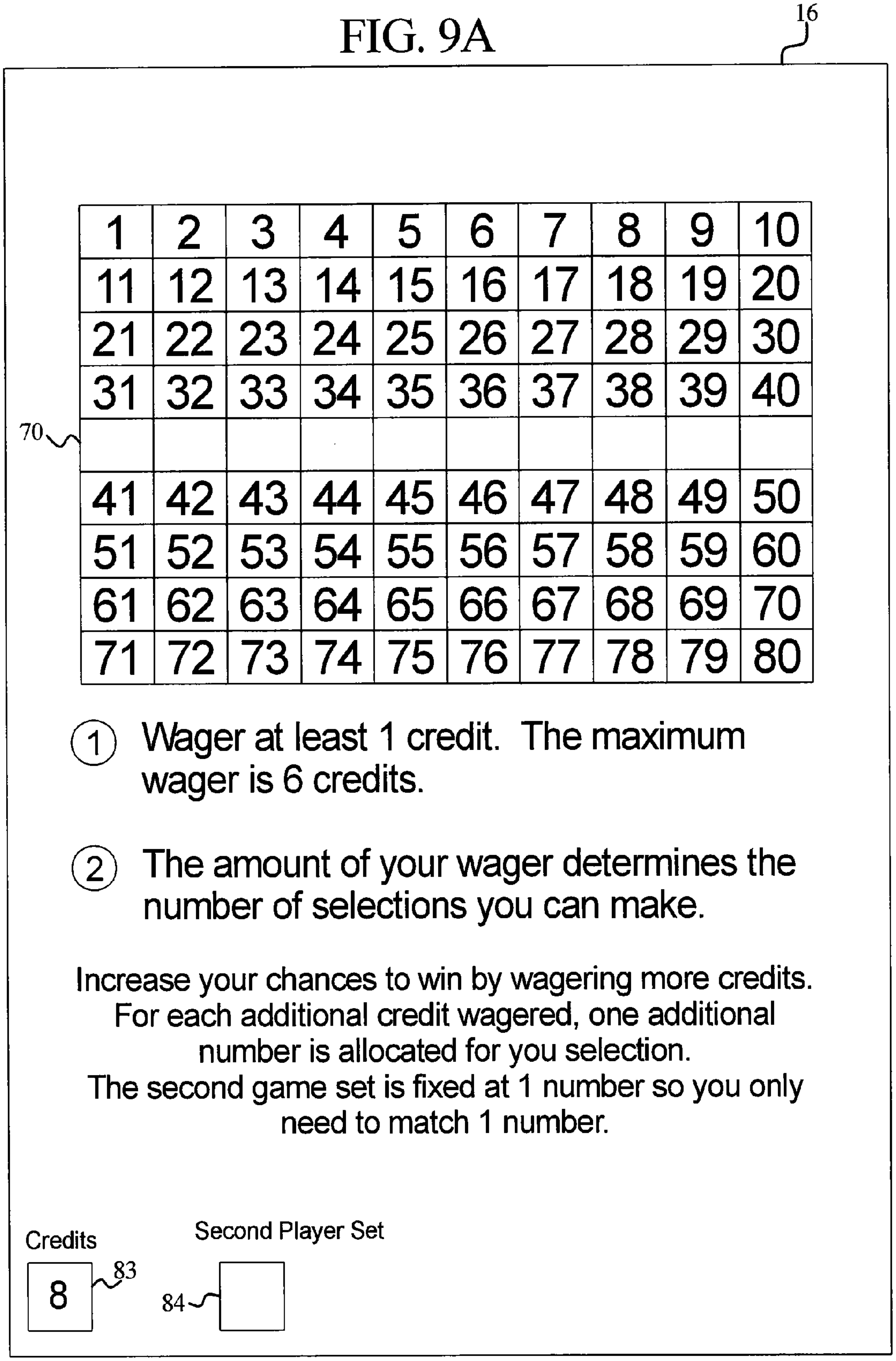
FIGS. 9A, 9B, and 9C illustrate various screens of a display device for one embodiment of the present disclosure having a designated award with a variable wager level described in connection with FIG. 5B.
Figure 9B:
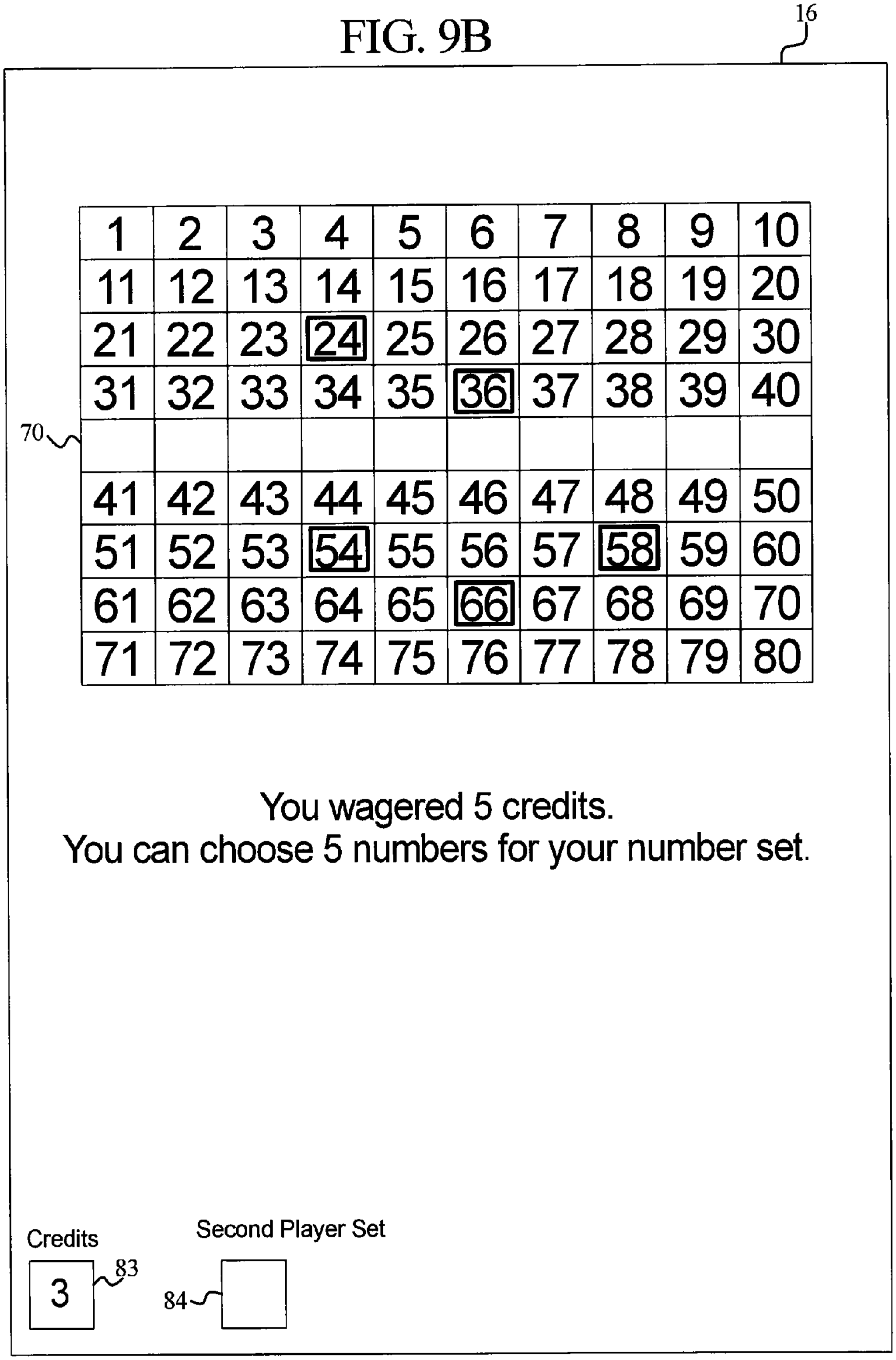
Figure 9C:
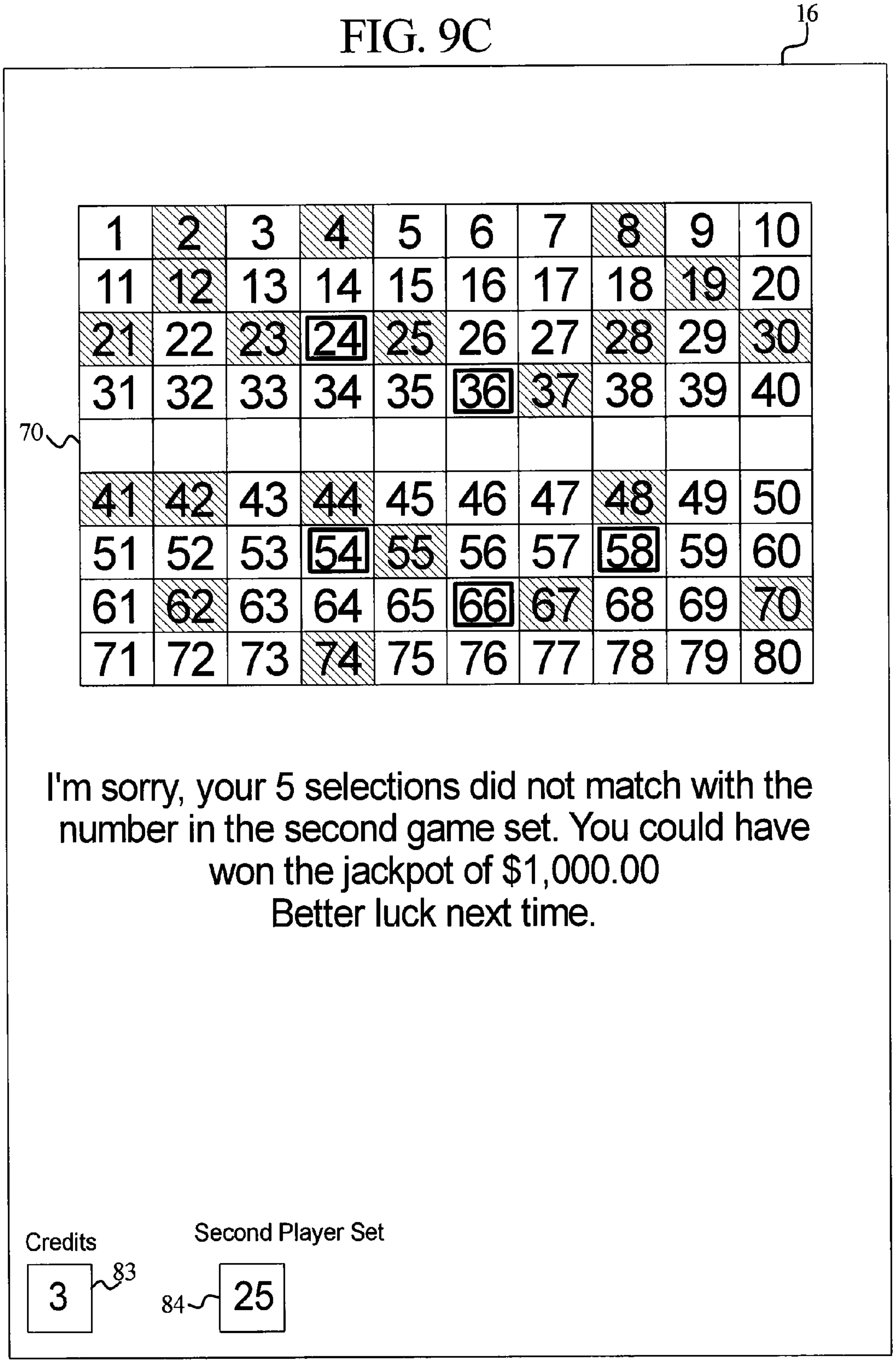

FIGS. 9A to 9C illustrate an enlarged view of screen 16 with another embodiment for the matching type game of the present disclosure.

In one embodiment, FIG. 9A illustrates a fresh screen on video monitor 16 including player instructions and game progress indicators. FIG. 9B illustrates the same screen 16 with player selections and modified game progress indicators. FIG. 9C illustrates the same screen 16 with a completed Keno game and an award message.

Beginning in FIG. 9A, screen 16 instructs a player to make a wager of at least one credit up to the maximum wager of six credits. Screen 16 also instructs the player that the amount of the player's wager determines the number of selections available to the player from the Keno game board 70. The player selections are used to form the player set. Screen 16 also displays current game progress indicators such as credit meter 83, and the second game set indicator 84. Credit meter 83 depicts the number of remaining credits a player has for wagering. The gaming machine randomly selects a number for the second player set from any of the eighty Keno game board numbers. As described above, the quantity of numbers selected for the player set is based on the level of the player's wager. In the illustrated embodiment, the quantity of numbers in the player set is equal to the number of credits wagered by the player. The second game set indicator 84 displays the number selected for the second game set. The second game set must remain fixed at the beginning of the game. As such, in this embodiment, the second game set size is predetermined and does not vary in relation to the player's wager level.

FIG. 9B illustrates the screen 16 wherein the player made a number of selections shown as bolded and bordered numbers on Keno game board 70. Screen 16 also shows that credit meter 83 has been decremented by five credits because the player made a five credit wager for his game selections. Based on the five credit wager, the gaming machine enabled the player to select five numbers for the player set from the eighty numbers. It should be appreciated that the player set can also be calculated using various different algorithms as described in FIG. 5D.

FIG. 9C also illustrates the screen 16 with the completed Keno game. The processor has randomly generated or drawn twenty game numbers to form a first processor selected set. The numbers in the first processor set are indicated by at least an additional marking such as shading or a diagonal line through each of the numbers on Keno game board 70.

After the first processor selected set is drawn, the processor draws one second game set number from the first processor selected set. For illustration purposes, the second game set number is the last number drawn for the first processor selected set and is shown in bonus number indicator 80.

The processor determines if the player wins the jackpot award by comparing the second processor selected set with the player set. The player wins the jackpot award if the processor determines that the number in the second game set matches with one of the numbers in the player set. The gaming machine displays the number in the second player set that matches the bonus number with additional markings or illumination (not shown). In the illustrated embodiment, the player did not have the required match, and thus the player did not win the $1000.00 jackpot award. Alternatively, if the player had the winning match, the player could have won both the jackpot award and a base award.

The player did not win the jackpot award, so the processor also compared the player set to the first processor selected set to determine if any matches exist. The player did not have any matches between the first processor selected set and the player set. The player could have won a base award if the comparison between the player set and the first processor selected set produced a predetermined number of matches. The base award includes, but is not limited to, an award based on a Keno paytable.

Figure 10A:
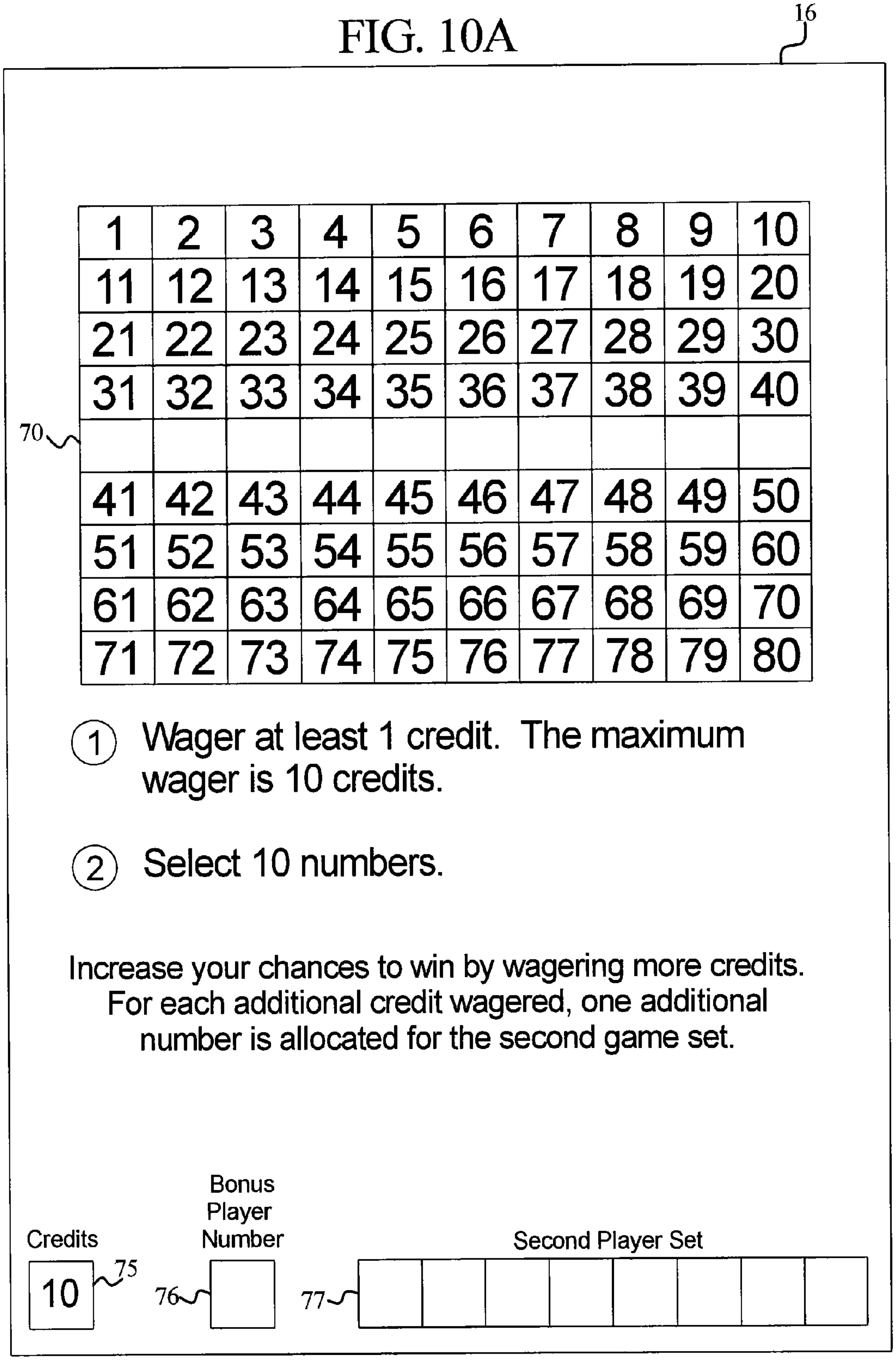
FIGS. 10A, 10B, and 10C illustrate various screens of a display device for one embodiment of the present disclosure having a designated award with a variable amount of player selections and a variable wager level described in connection with FIG. 5C.
Figure 10B:
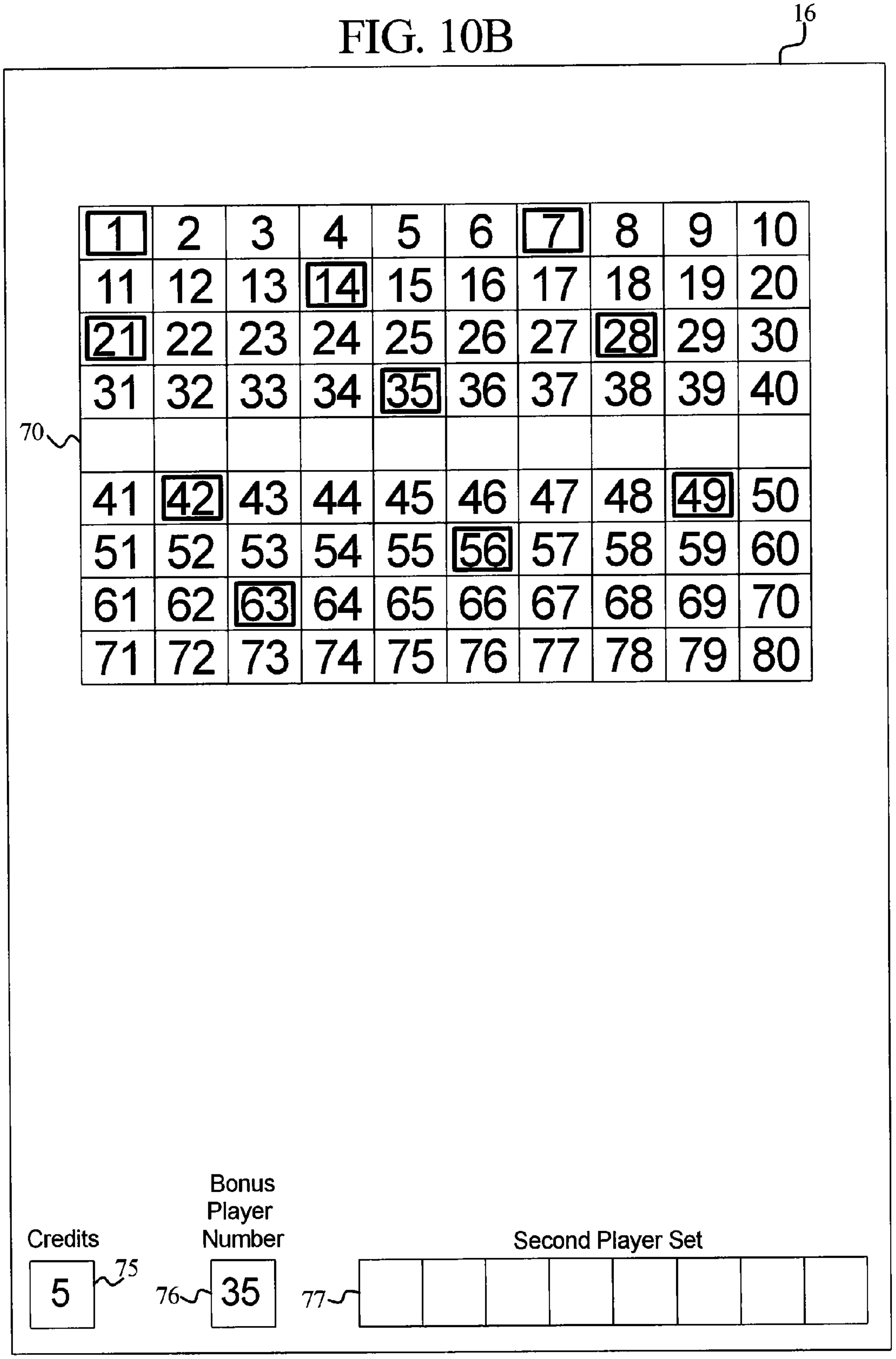
Figure 10C:
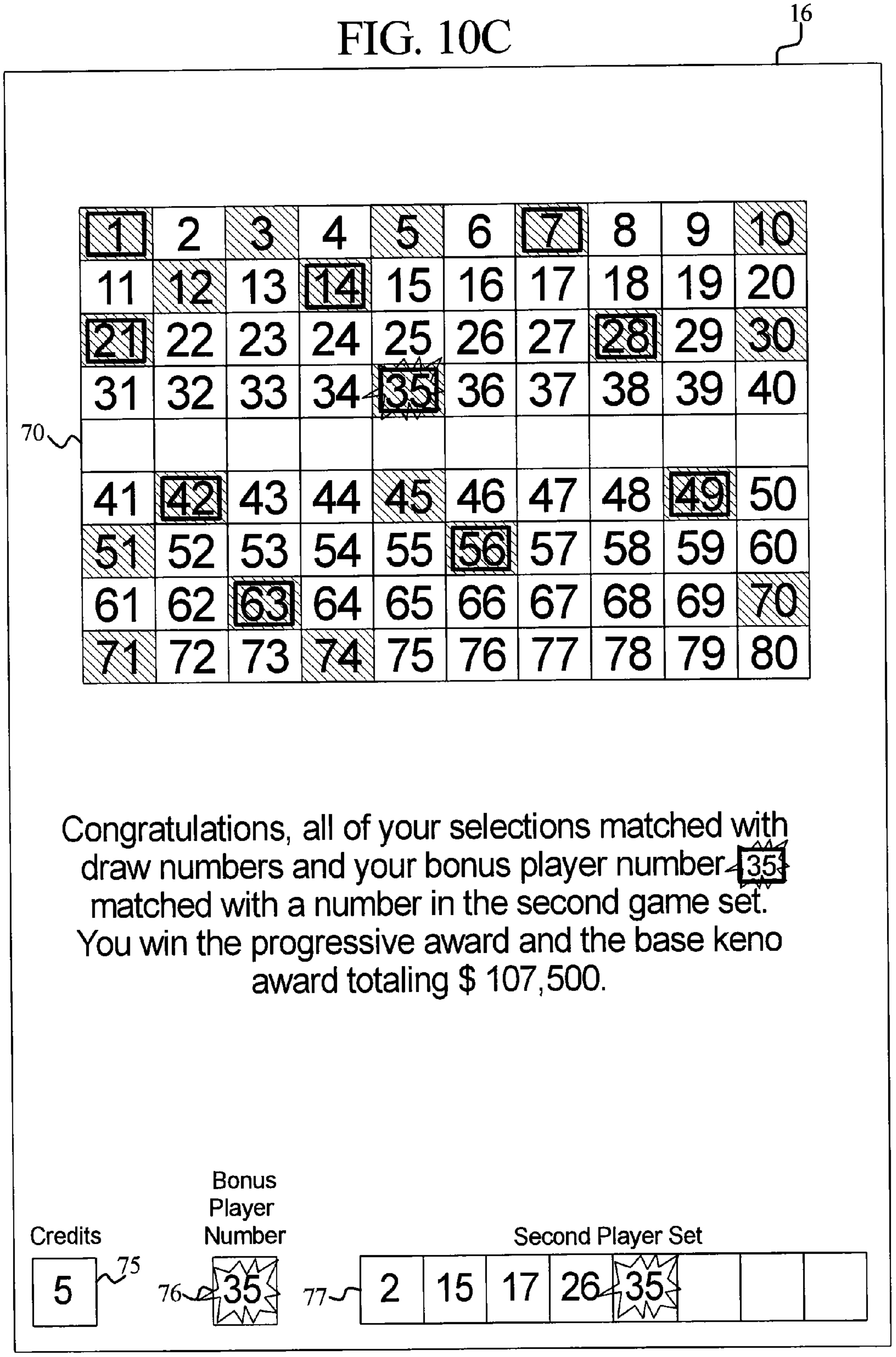

FIGS. 10A to 10C illustrate an enlarged view of screen 16 with another embodiment for the matching type game disclosed herein. This matching game provides a progressive award and/or a base award for creating a predetermined number of matches between player sets and processor selected sets. A player and/or processor selects from eighty numbers to form a plurality of player sets. The processor draws twenty numbers from the same eighty numbers to form the processor selected set. The player's sets are compared to the processor selected sets. The player wins at least one award if a predetermined quantity of specific matches is created between the player sets and the processor selected sets. It should be appreciated that while the game described below is readily implemented in connection with a Keno, Lotto, Bingo, or other matching-type game, the game is compatible with any suitable secondary or base game that employs a variable number of player selections and a variable wager level.

More specifically, FIG. 10A illustrates a fresh screen on video monitor 16 including player instructions and game progress indicators. FIG. 10B illustrates the same screen 16 with player selections and modified progress indicators. FIG. 10C illustrates the same screen 16 with a completed Keno game and an award message.

In this example beginning in FIG. 10A, the screen 16 instructs the player to wager at least one credit and that the maximum wager is ten credits. Screen 16 also instructs the player to select ten numbers from the Keno game board 70. All of the player selections form the initial player set. The numbers in the initial player set are displayed as bolded and bordered numbers on the Keno game board 70 as indicated in FIG. 10B. Screen 16 also displays current game progress indicators such as credit meter 75, a bonus player number indicator 76, and a second game set indicator 77. Credit meter 75 displays the player's available credits for wagering. The bonus player number indicator 76 displays the number selected for the bonus player number. The first number selected for the initial player set becomes the bonus player number. Alternatively, the bonus player number could be the last selected number from the initial player set or determined by other suitable algorithms. It should be appreciated that the bonus player number set size is predetermined and does not vary in relation to the player's wager level.

FIG. 10B illustrates the screen 16, wherein the player has made selections for the initial player set. The first player set is shown as bolded and bordered numbers on the Keno board 70. The player selected ten numbers. The player wagered five credits for his game selections, thus credit meter 75 has been decremented by five credits. The bonus player number indicator 76 depicts the player's first selected number thirty-five.

FIG. 10C illustrates the screen 16 with the completed Keno game. The processor randomly generated or drew twenty numbers to form a processor selected set. The drawn numbers are depicted with shading. The processor also designated the last five of the numbers in the processor selected set as the second game set. The values in the second game set are depicted in the second game set indicator. The quantity of n numbers in the second game set is variable, based on the amount of credits the player wagered. In the illustrated embodiment, the player wagered five credits, so n equals five. If the player had wagered more credits, the quantity of second game set numbers would have equaled the player's wager. Alternatively, the values and/or quantity of numbers in the second game set could be drawn based on other suitable algorithms such as those described in connection with FIG. 5C.

In one embodiment, the processor determines if the player wins the progressive award by comparing the first processor selected set with the initial player set, and the bonus player number with the second game set. The player wins the progressive award if processor determines that: (1) all of the numbers in the initial player set match with numbers in the processor selected set, and (2) the bonus player number matched with one of the second game set numbers. The gaming machine displays the numbers in the second game set and the bonus player number that match with additional indicators or markings as depicted in FIG. 10C. In this illustrated embodiment, the player had the required matches, thus the player won the progressive award and a base award.

If the player had not won the progressive award, the processor would have compared the initial player set to the first processor selected set to determine if any matches exist. The player would have won a base award if the comparison between the second player set and the processor selected set produced a predetermined number of matches. In one embodiment, the base award includes, but is not limited to, a typical Keno award that relates the quantity of player matches to the award amount as shown in video screen 18 of FIG. 3A.

Figure 11A:
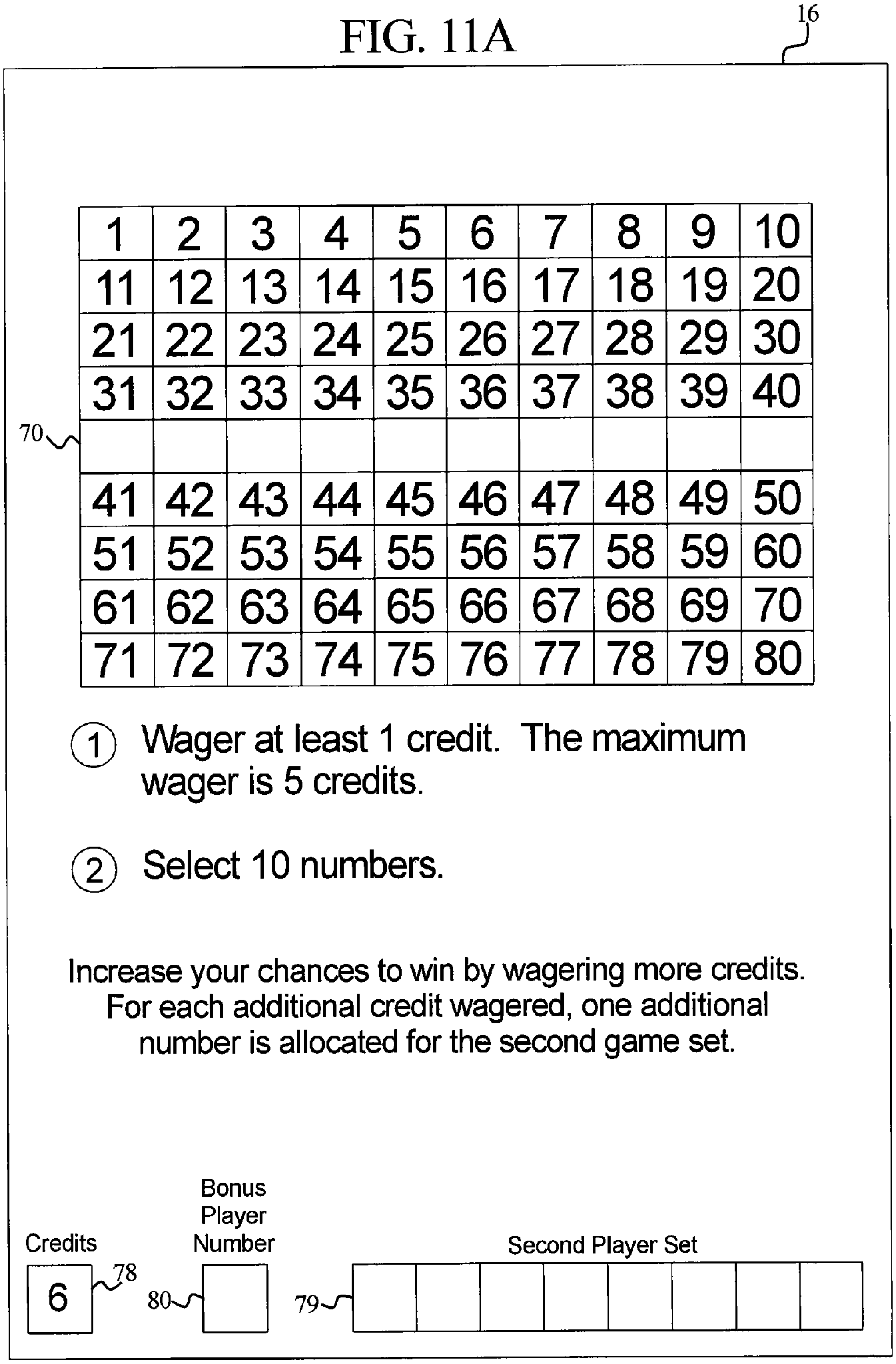
FIGS. 11A, 11B, and 11C illustrate various screens of a display device for one embodiment of the present disclosure having a designated award with a variable amount of player selections and a variable wager level described in connection with FIG. 5D.
Figure 11B:
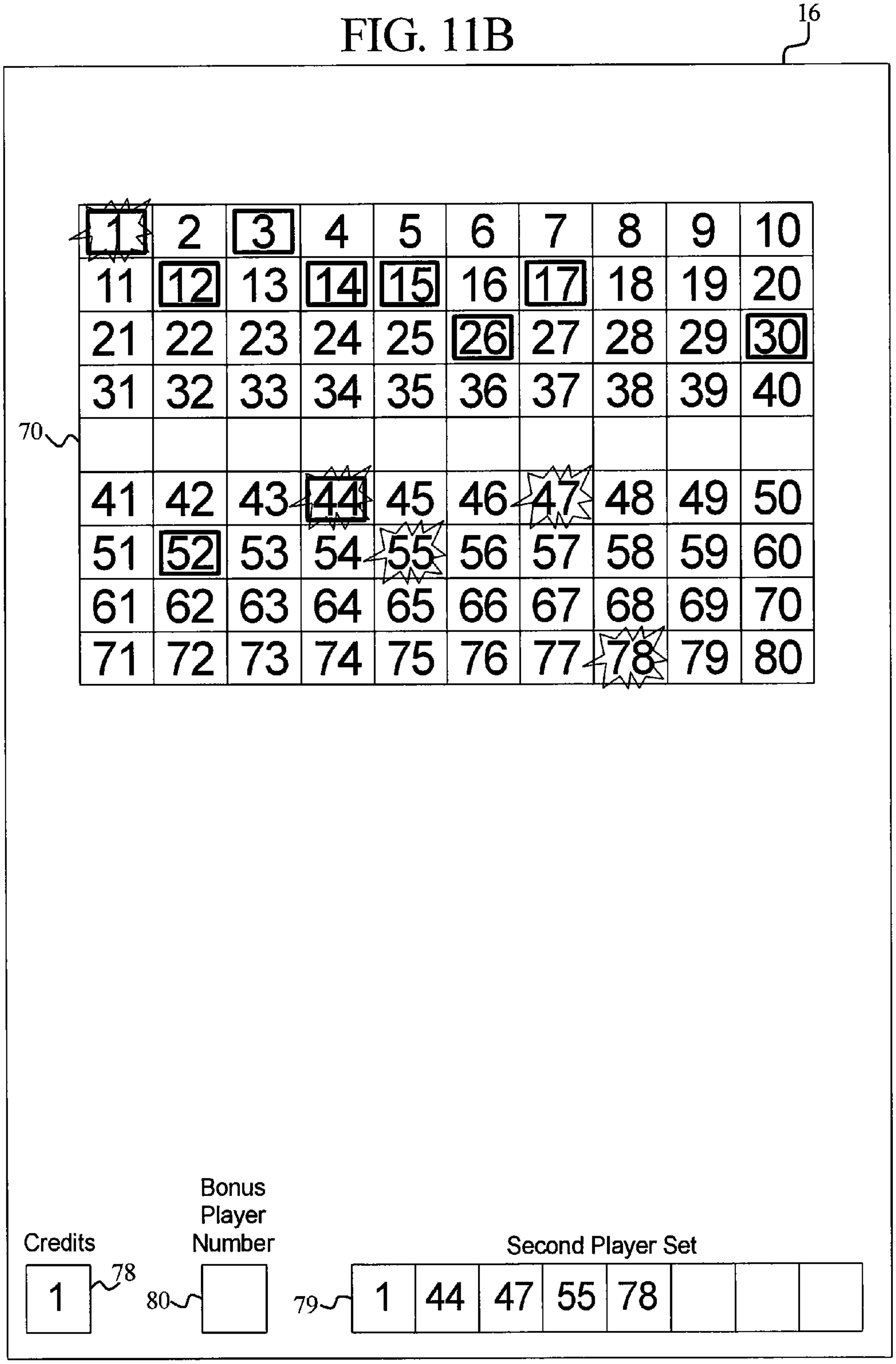
Figure 11C:
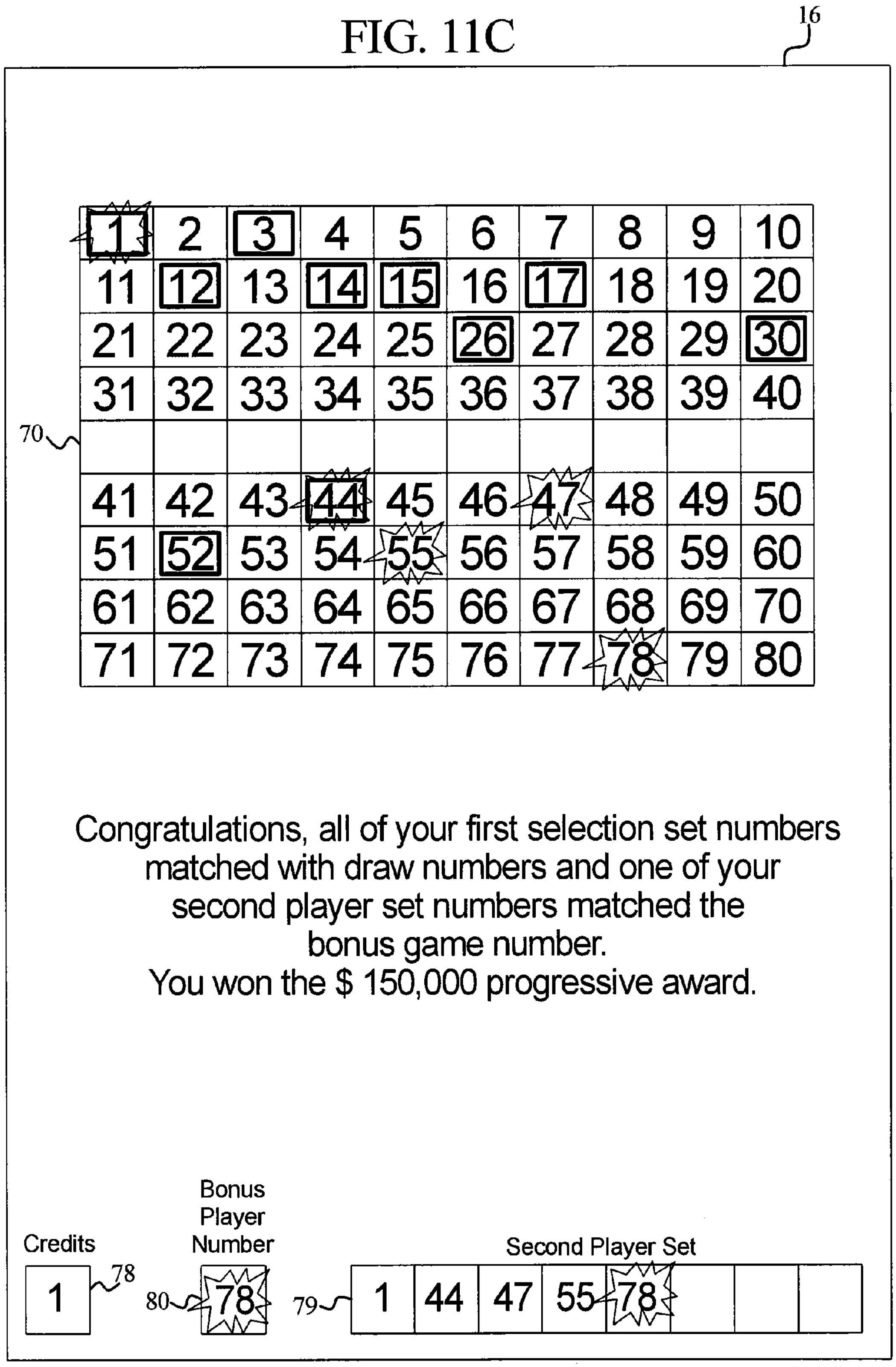

FIGS. 11A to 11C illustrate an enlarged view of screen 16 with another embodiment for the matching type game of the present disclosure.

In one embodiment, FIG. 11A illustrates a fresh screen on video monitor 16 including player instructions and game progress indicators. FIG. 11B illustrates the same screen 16 with player selections and modified game progress indicators. FIG. 11C illustrates the same screen 16 with a completed Keno game and an award message.

Beginning in FIG. 11A, screen 16 instructs a player to make a wager of at least one credit up to the maximum wager of five credits. Screen 16 also instructs the player to select ten numbers from the Keno game board 70. The initial player selections are used to form the initial player set. Screen 16 also displays current game progress indicators such as credit meter 78, the second player set indicator 79, and the bonus game number indicator 80. Credit meter 78 depicts the number of remaining credits a player has for wagering. The second player set indicator 79 shows the numbers selected for the second player set. The gaming machine randomly selects numbers for the second player set from any of the eighty Keno game board numbers. The quantity of numbers selected for the second player set is based on the level of the player's wager. In the illustrated embodiment, the quantity of numbers in the second player set is equal to the number of credits wagered by the player. The bonus game number indicator 80 displays the number selected for the bonus game number. It should be appreciated that the bonus game number set size is predetermined and does not vary in relation to the player's wager level.

FIG. 11B illustrates the screen 16 wherein the player made a number of selections shown as bolded and bordered numbers on Keno game board 70. Screen 16 also shows that credit meter 78 has been decremented by five credits because the player made a five credit wager for his game selections. Based on the five credit wager, the gaming machine randomly selected five numbers for the second player set from the eighty numbers. Second player set indicator 79 now depicts the player's five randomly selected numbers. The numbers in the second player set are displayed with additional indicators or markings. It should be appreciated that the second player set can also be calculated using various different algorithms as described in FIG. 5D.

FIG. 11C also illustrates the screen 16 with the completed Keno game. The processor has randomly generated or drawn twenty game numbers to form a first processor selected set. The numbers in the first processor set are indicated by at least an additional marking such as shading or a diagonal line through each of the numbers on Keno game board 70.

After the first processor selected set is drawn, the processor draws one bonus number from the first processor selected set. For illustration purposes, the bonus number is the last number drawn for the first processor selected set and is shown in bonus number indicator 80.

The processor determines if the player wins the progressive award by comparing the first processor selected set with the initial player set and comparing the bonus game number with the second player set. The player wins the progressive award if the processor determines that: (1) all of the numbers in the initial player set match with numbers in the first processor selected set, and (2) the bonus number matched with at least one number in the second player set. The gaming machine displays the numbers in the second player set that match the bonus number with additional markings or illumination as depicted in FIG. 9C. In the illustrated embodiment, the player had the required matches, and thus the player won the $150,000 progressive award. Alternatively, the player could have won both the progressive award and a base award.

If the player had not won the progressive award, the processor would have compared the initial player set to the first processor selected set to determine if any matches exist. The player could win a base award if the comparison between the initial player set and the first processor selected set produced a predetermined number of matches. The base award includes, but is not limited to, an award based on a Keno paytable.

Figure 12A:
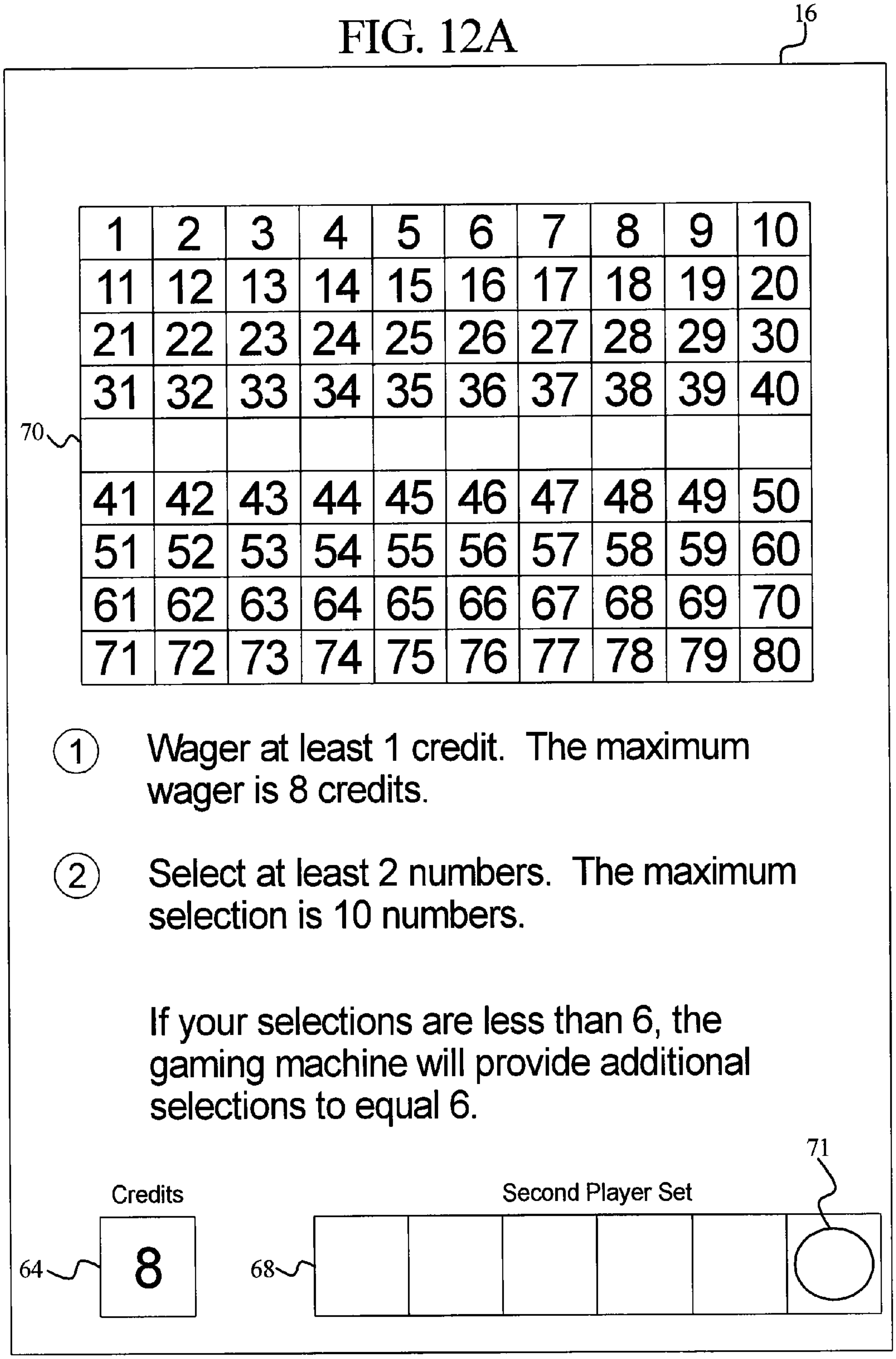
FIGS. 12A, 12B, and 12C illustrate various screens of a display device for one embodiment of the present disclosure having a designated award with a variable amount of player selections and a variable wager level described in connection with FIG. 5E.
Figure 12B:
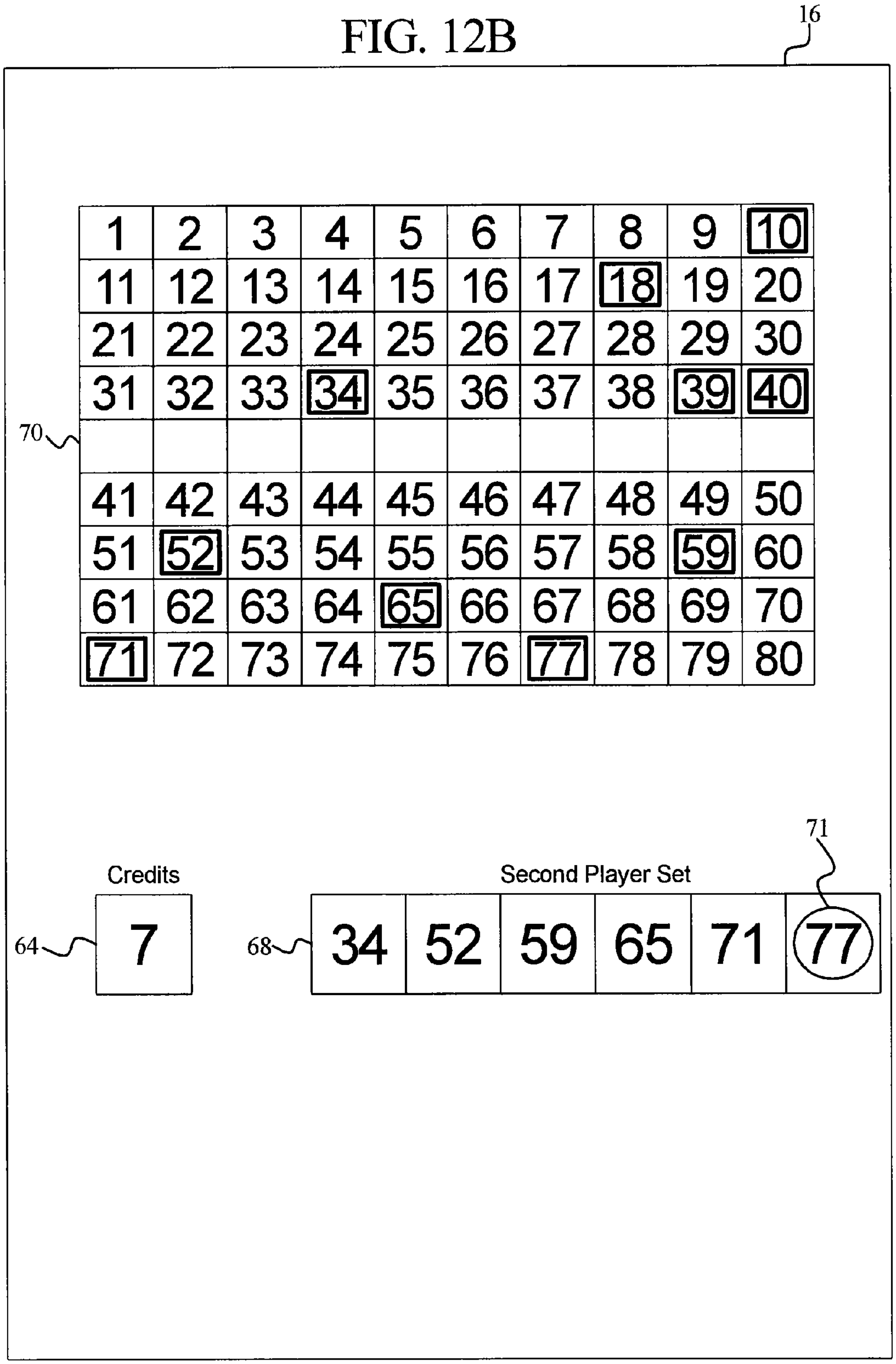
Figure 12C:
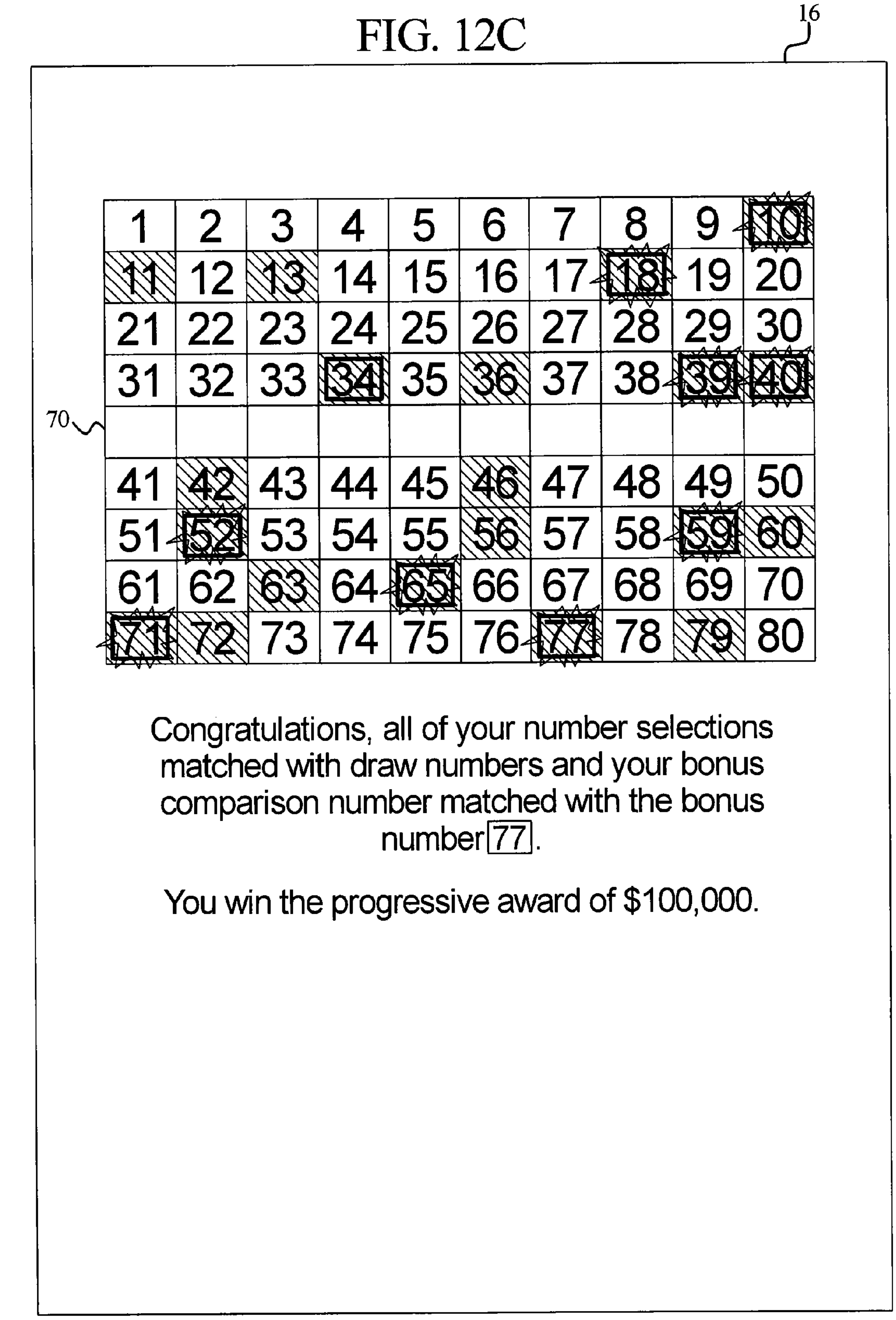

FIGS. 12A to 12C illustrate an enlarged view of screen 16 with another embodiment for the matching type game disclosed herein. This matching game provides a progressive award and/or a base award for creating a predetermined number of matches between player sets and processor selected sets. A player and/or processor selects from eighty numbers to form a plurality of player sets. The processor draws twenty numbers from the same eighty numbers to form the processor selected set. The player's sets are compared to the processor selected set. The player wins at least one award if a predetermined quantity of specific matches are created between the player sets and the processor selected set. It should be appreciated that while the game described below is readily implemented in connection with a Keno, Lotto, Bingo, or other matching-type game, the game is compatible with any suitable secondary or base game that employs a variable number of player selections and a variable wager level.

More specifically, FIG. 12A illustrates a fresh screen on video monitor 16 including player instructions and game progress indicators. FIG. 12B illustrates the same screen 16 with player selections and modified progress indicators. FIG. 12C illustrates the same screen 16 with a completed Keno game and an award message.

In this example beginning in FIG. 12A, the screen 16 instructs the player to wager at least one credit and that the maximum wager is eight credits. Screen 16 also instructs the player to select at least two numbers from the Keno game board 70 and that the maximum number of selections is ten numbers. All of the player selections form the initial player set. The numbers in the initial player set are displayed as bolded and bordered numbers on the Keno game board 70 as indicated in FIG. 12B. The game instructions further instruct that if the amount of player selections is less than six, the gaming machine will make supplemental random selections to equal at least six selections. Screen 16 also displays current game progress indicators such as credit meter 64 and a second player set indicator 68. Credit meter 64 displays the player's available credits for wagering. The second player set indicator 68 displays the numbers selected for the second player set. In one embodiment, the second player set also indicates a bonus comparison number indicator 71. The bonus comparison number indicator 71 is distinguished by a circle in the far right box of the second player set indicator 68. The last number selected for the second player set becomes the bonus comparison number.

FIG. 12B illustrates the screen 16, wherein the player has made selections for the initial player set. The first number set is shown as bolded and bordered numbers on the Keno board 70. The player selected the maximum ten numbers. Therefore, the gaming machine was not required to randomly select and provide supplemental numbers. The player made a one credit wager for his game selections, thus credit meter 64 has been decremented by one credit. The second player set indicator 68 depicts the player's last six selected numbers including the designated bonus comparison number seventy-seven.

If the player did not select the required six numbers, processor would have selected one or more supplemental symbols from the eighty numbers for the player. The processor selected supplemental symbols form a supplemental player set. Together, the initial player set and the supplemental player set form a total player set. The quantity of numbers in the total player set must equal the six numbers to be eligible to win the progressive award.

FIG. 12C illustrates the screen 16 with the completed Keno game. The processor randomly generated or drew twenty numbers to form a processor selected set. The processor also designated one of the numbers in the processor selected set as the bonus number. The drawn numbers are depicted with a slash-though. The processor designated the last n numbers in the draw as the bonus set. In one embodiment, the n number is a variable value that is based on the amount of credits the player wagered. In the illustrated embodiment, the player wagered one credit, so n equals one. Therefore, only the last drawn number formed the bonus set. If the player had wagered more credits, the quantity of bonus numbers would have equaled the player's wager. Alternatively, the bonus number(s) could be drawn based on other suitable algorithms such as those described in connection with FIG. 5E.

In one embodiment, the processor determines if the player wins the progressive award by comparing the first processor selected set with the total player set, first processor selected set with the second player set, and the bonus set with the bonus comparison number. The player wins the progressive award if processor determines that: (1) all of the numbers in the total player set and the second player set match with numbers in the processor selected set, and (2) one bonus number matched with the bonus comparison number. Gaming machine displays the numbers in the player sets that match the numbers in the processor selected set and bonus set with additional indicators or markings as depicted in FIG. 12C. In this illustrated embodiment, the player had the required matches, thus the player won the progressive award.

If the player had not won the progressive award, the processor would have compared the second player set to the first processor selected set to determine if any matches exist. The player could have won a base award if the comparison between the second player set and the processor selected set produced a predetermined number of matches. In one embodiment, the matches needed to win the base award cannot come from the supplemental player set.

Figure 13A:
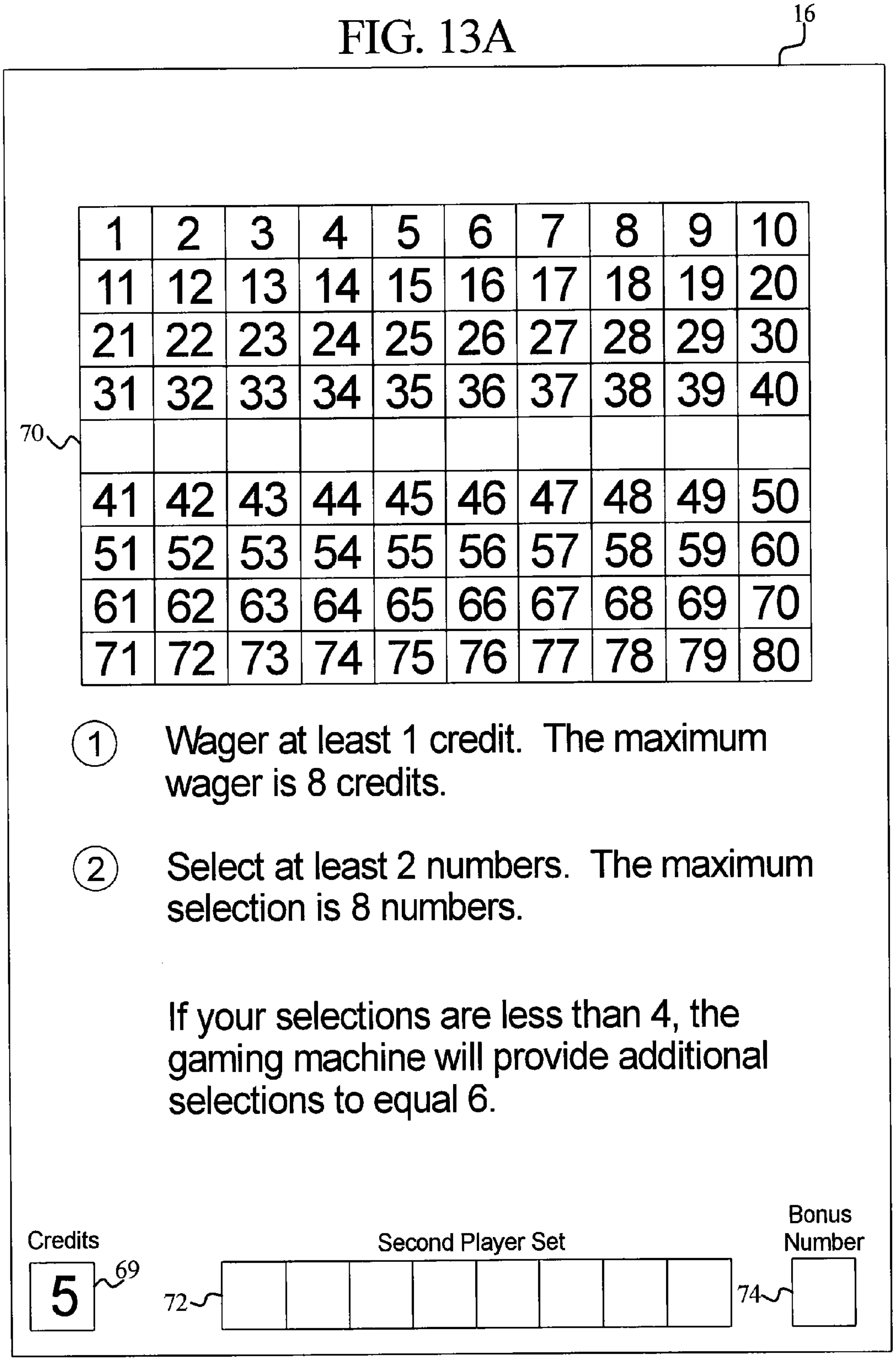
FIGS. 13A, 13B, and 13C illustrate various screens of a display device for one embodiment of the present disclosure having a progressive outcome with a variable amount of player selections and a variable wager level described in connection with FIG. 5E.
Figure 13B:
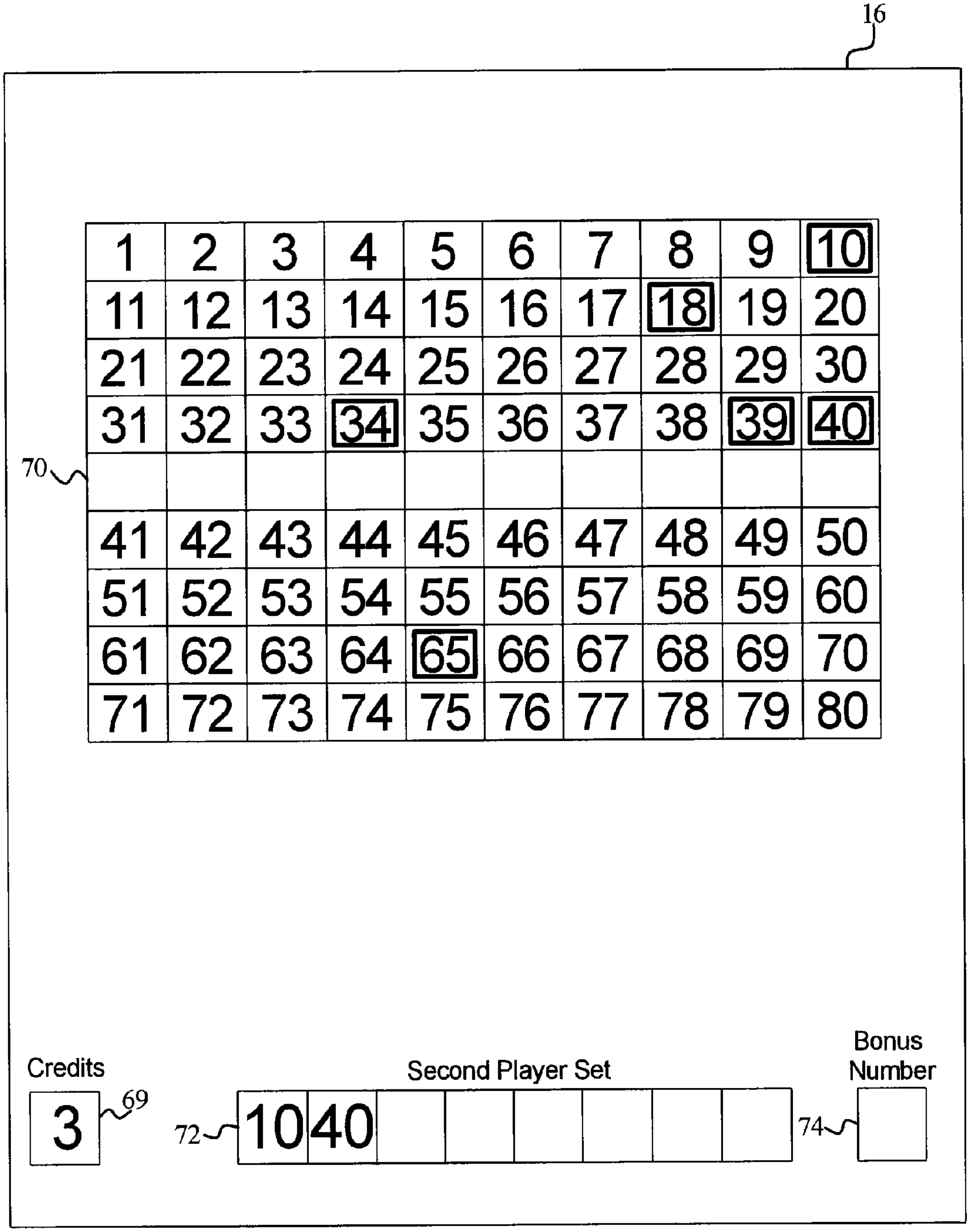
Figure 13C:
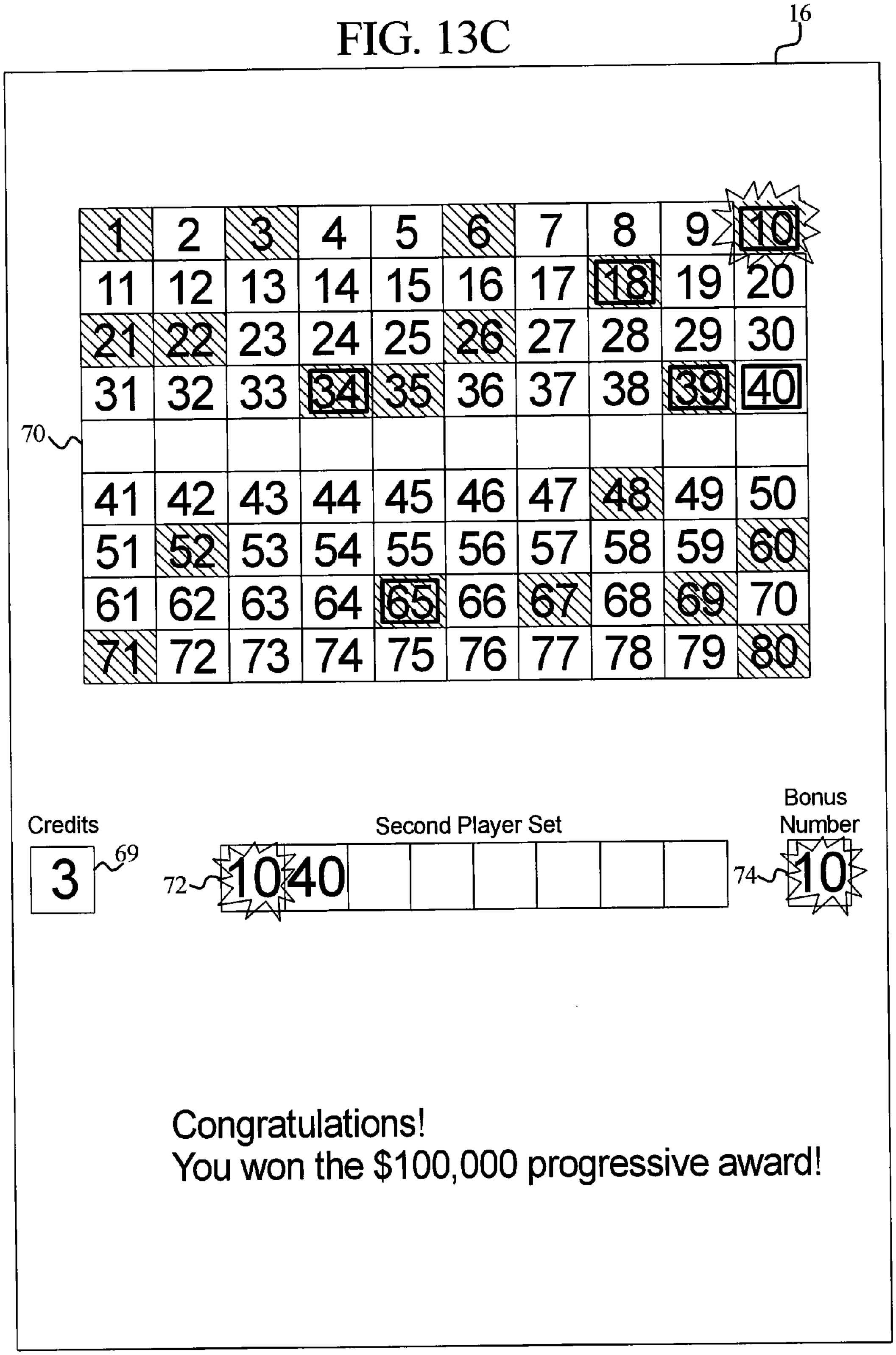

FIGS. 13A to 13C illustrate an expanded view of screen 16 with another embodiment for the matching type game of the present disclosure.

In one embodiment, FIG. 13A illustrates a fresh screen on video monitor 16 including player instructions and game progress indicators. FIG. 13B illustrates the same screen 16 with player selections and modified game progress indicators. FIG. 13C illustrates the same screen 16 with a completed Keno game and an award message.

In the example beginning in FIG. 13A, screen 16 instructs a player to make a wager of at least one credit up to the maximum wager of eight credits. Screen 16 also instructs the player to select at least two numbers from the eighty number Keno game board 70. The maximum player selection is eight numbers. The game instructions provide that if the quantity of player selections is less than four numbers, the processor will provide supplemental random selections to equal at least four selections. The initial player selections, excluding the supplemental processor selections, are used to form the initial player set. Screen 16 also displays current game progress indicators such as credit meter 64 and the second number set indicator 72. Credit meter 64 depicts the number of remaining credits a player has for wagering. The second player set indicator 72 shows the numbers selected for the second player set. The gaming machine randomly selects the numbers for the second player set wherein the quantity of numbers selected for the second player set is based on the level of a player's wager. In the illustrated embodiment, the quantity of numbers in the second player set is equal to the number of credits wagered by the player.

FIG. 13B illustrates the screen 16 wherein the player made a number of selections shown as bolded and bordered numbers on Keno game board 70. The player selected the minimum four numbers for the initial player set, and thus processor was not required to randomly select supplemental numbers to form the supplemental set. If the player did not select the required four numbers, processor would have selected one or more supplemental symbols from the eighty number for the player. The processor selected supplemental symbols form a supplemental player set. Together, the initial player set and the supplemental player set form a total player set. The quantity of numbers in the total player set must reach the four numbers to be eligible to win the progressive award.

Screen 16 also shows that credit meter 64 has been decremented by two credits because the player made a two credit wager for his game selections. Based on the two credit wager, the gaming machine randomly selected two numbers for the second player set from the remaining unselected eighty numbers. Second player set indicator 72 now depicts the player's two randomly selected numbers.

FIG. 13C also illustrates the screen 16 with the completed Keno game. The processor has randomly generated or drawn twenty game numbers to form a first processor selected set. The processor selected numbers are indicated by at least an additional marking such as a diagonal line through each of the numbers on Keno game board 70.

After the first processor selected set is drawn, the processor draws one bonus number from the first processor selected set. For illustration purposes, the bonus number is the last number drawn for the first processor selected set and is shown in bonus number indicator 74. Alternatively, the gaming machine can determine the bonus number using a suitable algorithm such as those discussed above in relation to FIG. 5D.

The processor determines if the player wins the progressive award by comparing first processor selected set with the total player set and comparing the bonus number with the second player set. The player wins the progressive award if the processor determines that: (1) all of the numbers in the total player set match with numbers in the first processor selected set, and (2) the bonus number matched with at least one number in the second player set. The gaming machine displays the numbers in the second player set that match the bonus number with additional markings or illumination as depicted in FIG. 13C. In the illustrated embodiment, the player had the required matches, and thus the player wins the $100,000 progressive award.

If the player had not won the progressive award, the processor would have compared the initial player set to the first processor selected set to determine if any matches exist. The player could win a base award if the comparison between the initial player set and the first processor selected set produced a predetermined number of matches. In one embodiment, the matches needed to win the base award cannot come from the supplemental player set. The base award includes, but is not limited to, an award based on a Keno paytable.

While the present invention has been described in connection with number matching, any of the embodiments described herein are applicable equally to symbol matching, i.e., using symbols other than or in combination with numbers. The eighty number Keno embodiment described above could instead use eighty different symbols, such as eighty different words. The matching games can use logos, such as sports team logos instead of numbers. In that embodiment, the player can play his or her favorite teams. The symbols can also relate to a theme of the game. For example, in the games described above, the symbols selected by the players could be animals, while the drawn numbers are displayed as bullets. The term symbol therefore includes number and any other suitable or theme related indicia used alternatively or additionally.

It should be understood that various changes and modifications to the present embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A gaming device operable under the control of a processor, said gaming device comprising:

a display device;

an input device; and a memory device which stores a plurality of instructions, which when executed by the processor, cause the processor to operate with the display device and the input device to:

(a) display a plurality of game symbols;

(b) cause a selection of a quantity of at least two of said game symbols to form an initial symbol set, wherein:

(i) if the quantity of game symbols selected for the initial symbol set is a first quantity, a base award has a first probability of being provided; and (ii) if the quantity of game symbols selected for the initial symbol set is a second, different quantity, the base award has a second, different probability of being provided;

(c) after the initial symbol set is selected, select a quantity of supplemental symbols from said game symbols to form a supplemental symbol set if the quantity of game symbols selected for the initial symbol set is less than a predetermined quantity, wherein the game symbols in the initial symbol set and any supplemental symbols in the supplemental symbol set form a total symbol set;

(d) draw a plurality of said game symbols to form a first processor selected set;

(e) provide a designated award if a predetermined number of the game symbols in the total symbol set correspond to the game symbols in the first processor selected set; and (f) provide the base award if a predetermined number of the game symbols in the initial symbol set correspond to the game symbols in the first processor selected set.

2. The gaming device of claim 1, wherein the initial symbol set is a player selected set.

3. The gaming device of claim 1, wherein the supplemental symbol set is a processor selected set.

4. The gaming device of claim 1, wherein the designated award is selected from one of a static award and a progressive award.

5. The gaming device of claim 1, which includes a plurality of base awards.

6. The gaming device of claim 5, wherein, if the designated award is not provided, when executed by the processor, the plurality of instructions cause the processor to provide one of the base awards if a predetermined number of the game symbols in the initial symbol set correspond to the game symbols in the first processor selected set.

7. The gaming device of claim 5, wherein the provided base award is determined by a Keno paytable.

8. The gaming device of claim 5, wherein the provided base award is variable and the base award increases as the number of game in the initial symbol set which correspond to the game symbols in the first processor selected set increases.

9. A gaming device operable under the control of a processor, said gaming device comprising:
a display device;
an input device; and
a memory device which stores a plurality of instructions, which when executed by the processor, cause the processor to operate with the display device and the input device, for each play of a game, to:
(a) display a plurality of game symbols;
(b) cause a selection of a plurality of said game symbols to form an initial symbol set, wherein a quantity of game symbols selected for the initial symbol set is predetermined;
(c) draw a plurality of said game symbols to form a first processor selected set, wherein a quantity of game symbols selected for the first processor selected set is predetermined;
(d) draw a plurality of said game symbols to form a second processor selected set, wherein:
(i) the draw of the plurality of game symbols which form the second processor selected set is independent from the draw of the plurality of game symbols which form the first processor selected set;
(ii) if a first amount is wagered on the play of the game, the second processor selected set includes a first quantity of game symbols, the first quantity of game symbols including at least one game symbol which has a first probability of corresponding to one of the game symbols in the initial symbol set; and
(iii) if a second, different amount is wagered on the play of the game, the second processor selected set includes a second quantity of game symbols different from the first quantity of game symbols, the second quantity of game symbols including at least one game symbol which has a second probability of corresponding to one of the game symbols in the initial symbol set, said second probability being different from said first probability; and
(e) provide a designated award if a predetermined number of the game symbols in the initial symbol set correspond to the game symbols in the second processor selected set.

10. The gaming device of claim 9, wherein the initial symbol set is a player selected set.

11. The gaming device of claim 9, wherein the initial symbol set is a processor selected set.

12. The gaming device of claim 9, wherein the first predetermined quantity of game symbols in the initial symbol set is one symbol.

13. The gaming device of claim 9, wherein the quantity of game symbols in the second processor selected set is selected from a group consisting of a determination based on static odds for each draw, a determination based on a static portion of the draw and a determination based on a static portion of the selectable numbers.

14. The gaming device of claim 9, wherein the designated award is selected from one of a static award and a progressive award.

15. The gaming device of claim 9, which includes a plurality of base awards.

16. The gaming device of claim 15, wherein, if the designated award is not provided, when executed by the processor, the plurality of instructions cause the processor to provide one of the base awards if a predetermined number of the game symbols in the initial symbol set correspond to the game symbols in the first processor selected set.

17. The gaming device of claim 16, wherein the provided base award is determined by a Keno paytable.

18. The gaming device of claim 16, wherein the provided base award is variable and the base award increases as the number of game symbols in the initial symbol set which correspond to the game symbols in the first processor selected set increases.

19. A gaming device operable under the control of a processor, said gaming device comprising:
a display device;
an input device; and
a memory device which stores a plurality of instructions, which when executed by the processor, cause the processor to operate with the display device and the input device, for each play of a game, to:
(a) display a plurality of game symbols;
(b) cause a selection of a quantity of said game symbols to form an initial symbol set, wherein:
(i) for a first wager amount, the quantity of said game symbols selected to form the initial symbol set is a first quantity, the first quantity of game symbols including at least one game symbol which is associated with a first probability of corresponding to any game symbol in a second processor selected set; and
(ii) for a second, different wager amount, the quantity of said game symbols selected to form the initial symbol set is a second quantity different from the first quantity, the second quantity of game symbols including at least one game symbol which is associated with a second probability of corresponding to any game symbol in said second processor selected set, said second probability being different from said first probability;
(c) draw a plurality of said game symbols to form a first processor selected set;
(d) draw at least one symbol to form said second processor selected set, wherein:
(i) a quantity of game symbols drawn for the second processor selected set is predetermined; and
(ii) the draw of the plurality of game symbols which form the second processor selected set is independent and distinct from the draw of the plurality of game symbols which form the first processor selected set; and
(e) provide a designated award if a predetermined number of the game symbols in the initial symbol set correspond to the game symbols in the second processor selected set.

20. The gaming device of claim 19, wherein the initial symbol set is a player selected set.

21. The gaming device of claim 19, wherein the initial symbol set is a processor selected set.

22. The gaming device of claim 19, wherein the predetermined quantity of game symbols in the second processor selected set is one symbol.

23. The gaming device of claim 19, wherein the game symbols in the initial symbol set are randomly selected before or after the start of the game.

24. The gaming device of claim 19, wherein the game symbols in the initial symbol set are selected from a group consisting of a determination based on a randomly selected cluster, group or pattern of numbers, a determination based on an interactive selection game where the cluster or pattern avoids the player's number selections and a determination based on a predetermined set of numbers.

25. The gaming device of claim 19, wherein the designated award is selected from one of a static award and a progressive award.

26. The gaming device of claim 19, which includes a plurality of base awards.

27. The gaming device of claim 26, wherein, if the designated award is not provided, when executed by the processor, the plurality of instructions cause the processor to provide one of the base awards if a predetermined number of the game symbols in the initial symbol set correspond to the game symbols in the first processor selected set.

28. The gaming device of claim 27, wherein the provided base award is determined by a Keno paytable.

29. The gaming device of claim 27, wherein the provided base award is variable and the provided base award increases as the number of game symbols in the initial symbol set which correspond to the game symbols in the first processor selected set increases.

30. A method for operating a gaming device including a plurality of instructions, said method comprising:

(a) causing a display device to display a plurality of game symbols;

(b) causing a processor to execute the plurality of instructions to select a quantity of at least two of said game symbols to form an initial symbol set, wherein:

(i) if the quantity of game symbols selected for the initial symbol set is a first quantity, a base award has a first probability of being provided; and (ii) if the quantity of game symbols selected for the initial symbol set is a second, different quantity, the base award has a second, different probability of being provided;

(c) causing the processor to execute the plurality of instructions to select a quantity of supplemental symbols from said game symbols to form a supplemental symbol set if the quantity of game symbols selected for the initial symbol set is less than a predetermined quantity, wherein the game symbols in the initial symbol set and any supplemental symbols in the supplemental symbol set form a total symbol set;

(d) causing the processor to execute the plurality of instructions to draw a plurality of said game symbols to form a first processor selected set;

(e) providing a designated award if a predetermined number of the game symbols in the total symbol set correspond to the game symbols in the first processor selected set; and (f) providing the base award if a predetermined number of the game symbols in the initial symbol set correspond to the game symbols in the first processor selected set.

31. The method of claim 30, which includes enabling a player to select a plurality of said game symbols to form the initial symbol set.

32. The method of claim 30, which includes causing the processor to execute the plurality of instructions to select at least one game symbol to form the supplemental symbol set.

33. The method of claim 30, which includes causing the processor to execute the plurality of instructions to select the designated award from one of a static award and a progressive award.

34. The method of claim 30, which includes, if the designated award is not provided, providing one of a plurality of base awards if a predetermined number of the game symbols in the initial symbol set correspond to the game symbols in the first processor selected set.

35. The method of claim 34, which includes causing the processor to execute the plurality of instructions to determine the provided base award from a Keno paytable.

36. The method of claim 34, which includes causing the processor to execute the plurality of instructions to increase the provided base award as the number of game symbols in the initial symbol set with correspond to the game symbols in the first processor selected set increases, wherein the provided base award is variable.

37. The method of claim 30, which is provided through a data network.

38. The method of claim 37, wherein the data network is an internet.

39. A method for operating a gaming device including a plurality of instructions, said method comprising:

(a) causing a display device to display a plurality of game symbols;

(b) causing a processor to execute the plurality of instructions to select a plurality of said game symbols to form an initial symbol set, wherein a quantity of game symbols selected for the initial symbol set is predetermined;

(c) causing the processor to execute the plurality of instructions to draw a plurality of said game symbols to form a first processor selected set, wherein a quantity of game symbols selected for the first processor selected set is predetermined;

(d) causing the processor to execute the plurality of instructions to draw a plurality of said game symbols to form a second processor selected set, wherein:

(i) the plurality of game symbols drawn to form the second processor selected set are drawn independent from the draw of the plurality of game symbols which form the first processor selected set;

(ii) if a first amount is wagered on the play of the game, the second processor selected set includes a first quantity of game symbols, the first quantity of game symbols including at least one game symbol which is associated with a first probability of corresponding to one of the game symbols in the initial symbol set; and (iii) if a second, different amount is wagered on the player of the game, the second processor selected set includes a second quantity of game symbols different from the first quantity of game symbols, the second quantity of game symbols including at least one game symbol which is associated with a second probability of corresponding to one of the game symbols in the initial symbol set, said second probability being different from said first probability; and (e) providing a designated award if a predetermined number of the game symbols in the initial symbol set correspond to the game symbols in the second processor selected set.

40. The method of claim 39, which includes enabling a player to select a plurality of said game symbols to form the initial symbol set.

41. The method of claim 39, which includes enabling a player to select or causing the processor to execute the plurality of instructions to select a plurality of the game symbols to form the initial symbol set.

42. The method of claim 39, which includes causing the processor to execute the plurality of instructions to select one game symbol for the predetermined quantity of game symbols in the initial symbol set.

43. The method of claim 39, wherein the quantity of game symbols in the second processor selected set is selected from a group consisting of a determination based on static odds for each draw, a determination based on a static portion of the draw and a determination based on a static portion of the selectable numbers.

44. The method of claim 39, which includes causing the processor to execute the plurality of instructions to select the designated award from one of a static award and a progressive award.

45. The method of claim 39, which includes, if the designated award is not provided, providing one of a plurality of base awards if a predetermined number of the game symbols in the initial symbol set correspond to the game symbols in the first processor selected set.

46. The method of claim 45, which includes causing the processor to execute the plurality of instructions to determine the provided base award from a Keno paytable.

47. The method of claim 45, which includes causing the processor to execute the plurality of instructions to increase the provided base award as the number of game symbols in the initial symbol set which correspond to the game symbols in the first processor selected set increases, wherein the provided base award is variable.

48. The method of claim 39, which is provided through a data network.

49. The method of claim 48, wherein the data network is an internet.

50. A method for operating a gaming device including a plurality of instructions, said method comprising:

(a) causing a display device to display a plurality of game symbols;

(b) causing a processor to execute the plurality of instructions to select a quantity of said game symbols to form an initial symbol set, wherein:

(i) for a first wager amount, the quantity of said game symbols selected to form the initial symbol set is a first quantity, the first quantity of game symbols including at least one game symbol which is associated with a first probability of corresponding to any game symbol in a second processor selected set; and (ii) for a second, different wager amount, the quantity of said game symbols selected to form the initial symbol set is a second quantity different from the first quantity, the second quantity of game symbols including at least one game symbol which is associated with a second probability of corresponding to any game symbol in said second processor selected set, said second probability being different from said first probability;

(c) causing the processor to execute the plurality of instructions to draw a plurality of said game symbols to form a first processor selected set;

(d) causing the processor to execute the plurality of instructions to draw a plurality of said game symbols to form said second processor selected set, wherein:

(i) a quantity of game symbols drawn for the second processor selected set is predetermined; and (ii) the draw of the plurality of game symbols which form the second processor selected set is independent and distinct from the draw of the plurality of game symbols which form the first processor selected set; and (e) providing a designated award if a predetermined number of the came symbols in the initial symbol set correspond to a the game symbols in the second processor selected set.

51. The method of claim 50, which includes enabling a player to select a plurality of said game symbols to form the initial symbol set.

52. The method of claim 50, which includes enabling a player to select or causing the processor to execute the plurality of instructions to select a plurality of the game symbols to form the initial symbol set.

53. The method of claim 50, which includes causing the processor to execute the plurality of instructions to select one game symbol for the predetermined quantity of game symbols in the second processor selected set.

54. The method of claim 50, which includes causing the processor to execute the plurality of instructions to randomly select the game symbols in the initial symbol set before or after the start of the game.

55. The method of claim 50, wherein the game symbols in the initial symbol set are selected from a group consisting of a determination based on a randomly selected cluster, group or pattern of numbers, a determination based on an interactive selection game where the cluster or pattern avoids the player's number selections and a determination based on a predetermined set of numbers.

56. The method of claim 50, which includes causing the processor to execute the plurality of instructions to select the designated award from one of a static award and a progressive award.

57. The method of claim 50, which includes, if the designated award is not provided, providing one of a plurality of base awards if a predetermined number of the game symbols in the initial symbol set correspond to the game symbols in the first processor selected set.

58. The method of claim 57, which includes causing the processor to execute the plurality of instructions to determine the provided base award from a Keno paytable.

59. The method of claim 57, which includes causing the processor to execute the plurality of instructions to increase the provided base award as the number of game symbols in the initial symbol set which correspond to the game symbols in the first processor selected set increases, wherein the provided base award is variable.

60. The method of claim 50, which is provided through a data network.

61. The method of claim 60, wherein the data network is an internet.

* * * * *

UNITED STATES PATENT AND TRADEMARK OFFICE

CERTIFICATE OF CORRECTION

PATENT NO. : 8,113,939 B2
APPLICATION NO. : 11/530285
DATED : February 14, 2012
INVENTOR(S) : Lee E. Cannon It is certified that error appears in the above-identified patent and that said Letters Patent is hereby corrected as shown below:

In Claim 6, Column 39, Line 6, replace “a” with --the--.

In Claim 8, Column 39, Line 13, between “game” and “in” insert --symbols--.

In Claim 12, Column 39, Line 64, between “one” and “symbol” insert --game--.

In Claim 13, Column 39, Line 65, replace the second instance of “the” with --a--.

In Claim 13, Column 40, Line 3, replace “selectable numbers” with --game symbols--.

In Claim 19, Column 40, Line 51, replace “symbol” with --of said game symbols--.

In Claim 19, Column 40, Line 55, replace “plurality” with --at least one--, and between “of” and “game” insert --said--.

In Claim 22, Column 41, Line 3, between “one” and “symbol” insert --game--.

In Claim 23, Column 41, Line 6, replace the first instance of “the” with --a--.

In Claim 32, Column 42, Line 3, between “one” and “game” insert --of the--, and replace the first instance of “symbol” with --symbols--.

In Claim 34, Column 42, Line 10, replace “a” with --the--.

In Claim 36, Column 42, Line 19, replace “with” with --which--.

In Claim 39, Column 42, Line 46, replace the first instance of “the” with --a--.

In Claim 39, Column 42, Line 53, replace “player” with --play--.

Signed and Sealed this
Twenty-ninth Day of May, 2012

David J. Kappos

David J. Kappos
*Director of the United States Patent and Trademark Office*

In Claim 43, Column 43, Line 9, replace the second instance of “the” with --a--.

In Claim 43, Column 43, Line 14, replace “selectable numbers” with --game symbols--.

In Claim 50, Column 44, Line 12, replace “came” with --game--.

In Claim 50, Column 44, Line 13, delete “a.”.

In Claim 54, Column 44, Line 29, replace “the start of the game” with “a start of a game.”